(12) United States Patent
Lehtovirta et al.

(10) Patent No.: US 9,986,431 B2
(45) Date of Patent: May 29, 2018

(54) METHOD AND APPARATUS FOR DIRECT COMMUNICATION KEY ESTABLISHMENT

(71) Applicant: Telefonaktiebolaget L M Ericsson (publ), Stockholm (SE)

(72) Inventors: Vesa Lehtovirta, Jorvas (FI); Katharina Pfeffer, Stockholm (SE); Vesa Torvinen, Turku (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 213 days.

(21) Appl. No.: 14/947,041

(22) Filed: Nov. 20, 2015

(65) Prior Publication Data

US 2017/0055149 A1    Feb. 23, 2017

Related U.S. Application Data

(63) Continuation of application No. 14/892,461, filed as application No. PCT/EP2015/068861 on Aug. 17, 2015.

(51) Int. Cl.
*H04L 29/06* (2006.01)
*H04W 12/04* (2009.01)
*H04W 76/02* (2009.01)

(52) U.S. Cl.
CPC ......... *H04W 12/04* (2013.01); *H04L 63/0435* (2013.01); *H04L 63/061* (2013.01); *H04W 76/023* (2013.01)

(58) Field of Classification Search
CPC ... H04L 63/061; H04L 63/0435; H04W 12/04
See application file for complete search history.

(56) References Cited

U.S. PATENT DOCUMENTS

2016/0205555 A1* 7/2016 Agiwal ................. H04W 12/04
                                                              713/168
2016/0295406 A1* 10/2016 Agiwal ................. H04W 12/04
(Continued)

OTHER PUBLICATIONS

"3rd Generation Partnership Project; Technical Specification Group Services and System Aspects; Generic Authentication Architecture (GAA); Generic Bootstrapping Architecture (GBA) Push function (Release 10)", 2011, pp. 1-23.*
(Continued)

*Primary Examiner* — Thaddeus J Plecha
(74) *Attorney, Agent, or Firm* — Baker Botts, LLP

(57) ABSTRACT

A method, performed by a User Equipment device, UE, for obtaining a key for direct communication with a device over an air interface, wherein the UE has previously acquired a transaction identifier received from a Bootstrapping Server Function, BSF, in a Generic Bootstrapping Architecture, GBA, procedure, is provided. The method comprises storing the transaction identifier, sending the transaction identifier to the device and requesting key generation for direct communication with the device. If the transaction identifier is invalid, the method further comprises receiving from the device a device identifier and key generation information, deriving a session shared key from at least the key generation information, and deriving a direct communication key from at least the session shared key and the device identifier.

24 Claims, 23 Drawing Sheets

(56) References Cited

U.S. PATENT DOCUMENTS

2017/0055152 A1* 2/2017 Zhang .................. H04W 12/04
2017/0339557 A1* 11/2017 Gopalan ............... H04W 12/04
2018/0013737 A1* 1/2018 Stojanovski ........ H04L 63/0428

OTHER PUBLICATIONS

"Universal Mobile Telecommunications System (UMTS); LTE; Proximity-based services (ProSe); Stage 2 (3GPP TS 23.303 version 12.2.0 Release 12)", 2014, pp. 1-62.*
"Security Mechanisms Using GBA", 2008, pp. 1-27.*
Abd-Elrahman et al. "D2D Group Communications Security", 2015, 6 pages (Year: 2015).*
PCT Notification of Transmittal of the International Search Report and the Written Opinion of the International Searching Authority, or the Declaration for International application No. PCT/EP2015/068861—dated Apr. 14, 2016.
3GPP TSG-SA WG3 Meeting #79; Nanjing, P.R. China; Source: Ericsson; Title: Updates on the solution for ProSe one-to-one security (S3-151371; revision of S3-15abcd)—Apr. 20-24, 2015.
3GPP TSG-SA WG3 Meeting #79; Nanjing, P.R. China; Source: Ericsson; Title: Updates on the solution for ProSe UE-to-network relay security (S3-15372; revision of S3-15abcd)—Apr. 20-24, 2015.
3GPP TSG-SA WG3 Meeting #78; Sorrento, Italy; Source: Ericsson; Title: One-to-one security for ProSe (S3-151102; revision of S3-15abcd)—Jan. 26-30, 2015.

* cited by examiner

METHOD AND APPARATUS FOR DIRECT COMMUNICATION KEY ESTABLISHMENT

PRIORITY

This application is a continuation, under 35 U.S.C. § 120, of U.S. application Ser. No. 14/892461 filed Nov. 19, 2015, which is a national stage filing under 35 U.S.C. § 371 of International Patent Application Serial No. PCT/EP2015/068861, filed Aug. 17, 2015, and entitled "Method And Apparatus For Direct Communication Key Establishment."

TECHNICAL FIELD

The present invention relates to methods for establishing a key for direct communication between a User Equipment device, UE, and a device. The present invention also relates to a UE, a device and a Direct Communication Element, and to a computer program configured to carry out methods for establishing a key for direct communication between a UE and a device.

BACKGROUND

Direct communication involves establishing a radio connection between two devices without transiting via an access network of a cellular communication network. Direct communication may be used to establish communication between two User Equipment Devices (UEs) which may or may not be out of network coverage, or may enable one device to act as a relay for another device, providing access to network services to a device which is out of network coverage. In the $3^{rd}$ Generation Partnership Project (3GPP), direct communication is enabled via Proximity Services (ProSe), as set out in TS 33.303 and other standard documents. The following discussion focuses on 3GPP ProSe but is equally applicable to other direct communication technologies.

ProSe consists of two main elements: ProSe Direct Discovery, involving the network assisted discovery of users with a desire to communicate who are in close physical proximity, and ProSe Direct Communication, in which direct communication between such users is facilitated with or without supervision from the network. The ProSe direct communication path may use Evolved UMTS Terrestrial Radio Access (E-UTRA) or Wireless Local Area Network direct (WLAN direct) radio technology.

FIG. 1 illustrates a reference ProSe architecture, according to which two ProSe-enabled UEs 2 may establish a direct communication path between them. Communication between the devices takes place over the PC5 interface, with each device able to communicate with a ProSe Function 4 in the cellular network over the PC3 interface, and with a ProSe application server 6 over a PC1 interface. ProSe direct communication may also involve a ProSe "UE-to-Network Relay", according to which a device, which may itself be a UE, may act as a relay between the E-UTRAN and a UE which is out of the coverage area of the E-UTRAN. This arrangement is illustrated in FIG. 2, with remote UE 2 obtaining access to the E-UTRAN via ProSe direct communication with a ProSe UE-to-Network Relay 8. ProSe direct communication is particularly advantageous for public safety communication, providing communication services for the emergency services and other public safety bodies. The example of FIG. 2 illustrates the ProSe enabled remote UE 2 communicating with a Public Safety Application Server 10 via the E-UTRAN and EPC, which the remote UE 2 can access via ProSe direct communication with the ProSe UE-to-Network Relay 8.

In order to secure communication between two devices using ProSe Direct Communication, a shared key may be used when communicating over the PC5 interface. Standard procedure is to pre-configure appropriate shared keys into ProSe enabled devices. However, pre-configuring appropriate shared keys to enable ProSe Direct Communication with every other device that an enabled device may wish to communicate with may be extremely challenging. A single ProSe enabled UE may wish to communicate with a range of different ProSe enabled UEs, and with many different UE-to-Network Relays serving different cells within the network. In addition, two ProSe enabled UEs, or a UE and UE-to-Network Relay, wishing to communicate may be served by different Home PLMNs, or one or both devices may roam into a new PLMN, further complicating the task of pre-configuring shared keys. Pre-configuring shared keys in all of the relevant ProSe enabled devices to enable all of the possible communication paths that may be desired is therefore an extremely complex process.

SUMMARY

According to an aspect of the present invention, there is provided a method, performed by a User Equipment device, UE, for obtaining a key for direct communication with a device over an air interface, wherein the UE has previously acquired a transaction identifier received from a Bootstrapping Server Function, BSF, in a Generic Bootstrapping Architecture, GBA, procedure, the method comprising, storing the transaction identifier, sending the transaction identifier to the device and requesting key generation for direct communication with the device, if the transaction identifier is invalid, the method further comprises, receiving from the device a device identifier and generation information, and deriving a direct communication key from at least the session shared key and the device identifier.

In some examples, the method may be conducted with the UE out of coverage of coverage of a communication network, such as an E-UTRAN.

According to examples of the invention, the direct communication key may be derived using additional inputs to the session shared key and the device identifier, including for example the UE identifier or other suitable identifiers. In some examples, the direct communication key may be derived using a Key Derivation Function (KDF), and the input parameters may be hashed or otherwise processed before they are used to derive the direct communication key. The KDF can be any standard function such as the KDF defined in 3GPP TS 33.220.

According to examples of the invention, the device may be a UE, a UE-to-network Relay, or may be a network node. According to examples of the invention, the interface may comprise a Proximity Services, ProSe, interface. The ProSe interface may comprise a PC5 interface.

According to examples of the invention, the invalid transaction identifier may be used as an identifier of the UE.

According to examples of the invention, the method may further comprise discovering the device through a discovery procedure.

In one embodiment, at least one of transaction identifier, the device identifier or the request for key generation is comprised within a discovery procedure message.

In another embodiment, the UE further sends a direct communication element identifier, direct key set identifier, DKSI, a list of security algorithms supported by the UE, and a nonce generated by the UE, to the device.

In one embodiment, the method may comprise receiving a Message Authentication Code, MAC, with the device identifier and key generation information, wherein the MAC is generated using the direct communication key or a key derived from the direct communication key.

According to some examples, the method may further comprise receiving the DKSI, lifetime, at least one security algorithm chosen by the device from the list of security algorithms, said list of security algorithms supported by the UE and a nonce generated by the device together with the MAC, device identifier and key generation information.

In one embodiment, the method may further comprising sending a confirmation message to the device indicating that the UE has derived the direct communication key.

In some examples, the method further comprises checking the MAC with the derived direct communication key or a key derived from the direct communication key, generating a confirmation MAC using the direct communication key or a key derived from the direct communication key, and sending the confirmation MAC with the confirmation message; wherein, if the check is successful, the confirmation message further indicates that the UE has successfully checked the MAC.

In one embodiment, the UE cannot initiate another GBA bootstrapping procedure.

In another embodiment, the UE does not comprise a valid shared secret with a Bootstrapping Server Function, BSF.

According to another aspect of the invention, there is provided a method, performed by a device, for obtaining a key for direct communication with a User Equipment device, UE, over an air interface, the method comprising, receiving from the UE an invalid transaction identifier and a request to obtain a direct communication key, sending to a Direct Communication Element the transaction identifier and a device identifier, and requesting the Direct Communication Element to provide the device with the direct communication key, receiving the direct communication key and key generation information from the Direct Communication Element, and sending the key generation information and the device identifier to the UE.

In one embodiment, the invalid transaction identifier is used as an identifier of the UE.

In another embodiment, the interface comprises a Proximity Services, ProSe, interface, and the Direct Communication Element comprises at least one of ProSe Function, a ProSe Key Management Function or a ProSe Key Management Server.

In one example, the method further comprises discovering the UE through a discovery procedure.

In another example, at least one of the transaction identifier, device identifier or the request for key generation is comprised within a discovery procedure message.

In one embodiment, the device further receives from the UE a direct communication element identifier, a direct key set identifier, DKSI, a list of security algorithms supported by the UE and a nonce generated by the UE.

In yet another embodiment, the device further sends to the UE the DKSI, a lifetime, at least one security algorithm chosen from the list of security algorithms supported by the UE, said list of security algorithms supported by the UE and a nonce generated by the device.

In one example, the method further comprises generating a Message Authentication Code, MAC, using the direct communication key or a key derived from the direct communication key, and sending the MAC to the UE with the key generation information and the device identifier.

In another example, the method further comprises receiving a confirmation message from the UE indicating that the UE has derived the direct communication key.

In one embodiment, the confirmation message further indicates that the UE has successfully checked the MAC.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device. A UE or device which is comprised within a communication network may for example comprise a UE or device which subscribes to the communication network.

According to examples of the invention, if the UE is comprised within a first communication network and the device is comprised within a second communication network, sending to and receiving from the Direct Communication Element may comprise sending to and receiving from the second sub-Element comprised within the second communication network.

According to a further aspect of the invention, there is provided a method, performed by a Direct Communication Element, for establishing a key for direct communication over an interface between a User Equipment device, UE, and a device, the method comprising, receiving from the device a transaction identifier, a device identifier, and a request to provide a direct communication key to the device, determining if the transaction identifier is invalid, if the transaction identifier is invalid, the method further comprises using the transaction identifier to identify the UE, sending a request to a bootstrapping server function, BSF, for key generation information and a session shared key from, and receiving said key generation information and session shared key from the BSF, deriving a direct communication key from at least the session shared key and the device identifier sending the direct communication key and the key generation information to the device.

In some examples, a BSF that is associated with a UE may be a BSF that is contained within the same communication network as the UE, for example the same PLMN.

According to examples of the invention, the device may be a UE, a UE-to-network Relay, or may be a network node.

According to examples of the invention, the direct communication key may be derived using additional inputs to the session shared key and the device identifier, including for example, the UE identifier or other suitable identifiers. In some examples, the direct communication key may be derived using a Key Derivation Function (KDF), and the input parameters may be hashed or otherwise processed before they are used to derive the direct communication key. The KDF may be any standard function such as the KDF defined in 3GPP TS 33.220.

In one embodiment, using the transaction identifier to identify the UE comprises the direct communication element matching the transaction identifier with a stored transaction identifier from a previous Generic Bootstrapping Architecture procedure.

In another embodiment, the method further comprises mapping the matched transaction identifier to a public UE identifier and sending the public UE identifier to the BSF.

If the direct communication element cannot match the transaction identifier with a stored transaction identifier, the method may further comprise sending the transaction identifier to the BSF and receiving the session shared key and the key generation information from the BSF.

In one embodiment, the interface comprises a Proximity Services, ProSe, interface, and the Direct Communication Element comprises at least one of a ProSe Function, a ProSe Key Management Function or a ProSe Key Management Server.

In another embodiment, the method further comprises checking that at least one of the device or the UE is authorised to establish direct communication.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device.

According to examples of the invention, if the UE is comprised within a first communication network and the device is comprised within a second communication network, checking that at least one of the device or the UE is authorised to establish direct communication may comprise checking that the UE is authorised to establish direct communication in the first sub-Element, and checking that the device is authorised to establish direct communication in the second sub-Element.

According to examples of the invention, if the UE is comprised within a first communication network and the device is comprised within a second communication network, sending to and receiving from at least one of the BSF or the device may comprise sending to and receiving from one of the first or second sub-Elements via the other of the first or second sub-Elements. In some examples, in which the sub-Elements comprise ProSe Functions in different PLMNs, the communication between sub-Elements may be over a PC6 interface.

According to examples of the invention, if the UE is comprised within a first communication network and the device is comprised within a second communication network, sending to and receiving from the BSF may comprise sending and receiving at the first sub-Element, and deriving the direct communication key may comprise deriving the direct communication key at the second sub-Element.

In any of the methods described above, the device may comprise at least one of a UE or a UE-to-Network Relay. The Direct Communication Element may be a functional element hosted on a server or other processing element. The key generation information may comprise Generic Bootstrapping Architecture Push Information, GPI. Furthermore, the transaction identifier may be a bootstrapping transaction identifier (B-TID).

In yet another aspect of the invention, there is provided a system for securing direct communication between a User Equipment device, UE, and a device over an interface, the system comprising a UE, a device and a Direct Communication Element; wherein the UE comprises means for sending an invalid transaction identifier to the direct communication element via the device, and the direct communication element comprises means for using the invalid transaction identifier to identify the UE, the direct communication element further comprises means for obtaining a session shared key and Generic Bootstrapping Architecture Push Information, GPI, deriving a direct communication key from at least the session shared key, and sending the direct communication key and the GPI to the device, wherein the device comprises means for sending the GPI to the UE, and wherein the UE comprises means for deriving the session shared key from at least the GPI and to derive the direct communication key from the session shared key.

In one embodiment, the Direct Communication Element and the UE comprise means for deriving the direct communication key from the session shared key and a device identifier.

According to one aspect to the invention, there is provided a User Equipment device, UE, for obtaining a key for direct communication with a device over an air interface, wherein the UE has previously acquired a transaction identifier received from a Bootstrapping Server Function, BSF, in a Generic Bootstrapping Architecture, GBA, procedure, the UE comprising storing means for storing the transaction identifier, communication means for sending the transaction identifier to the device and requesting key generation for direct communication with the device, if the transaction identifier is invalid, the communication means further comprises means for receiving from the device a device identifier and key generation information, key means for deriving a session shared key from at least the key generation information, and for deriving a direct communication key from at least the session shared key and the device identifier.

According to another aspect of the invention, there is provided a device, for obtaining a key for direct communication with a User Equipment device, UE, over an air interface, the device comprising communication means for receiving from the UE an invalid transaction identifier and a request to obtain a direct communication key, sending to a Direct Communication Element the transaction identifier and a device identifier, and requesting the Direct Communication Element to provide the device with the direct communication key; and receiving the direct communication key and key generation information from the Direct Communication Element; and sending the key generation information and the device identifier to the UE.

According to yet another aspect of the invention, there is provided a Direct Communication Element, for establishing a key for direct communication over an interface between a User Equipment device, UE, and a device, the Direct Communication Element comprising communication means for receiving from the device a transaction identifier, a device identifier, and a request to provide a direct communication key to the device, authorizing means for determining if the transaction identifier is invalid, if the transaction identifier is invalid, the authorizing means further comprises means for using the transaction identifier to identify the UE, the communication means further comprising means for sending a request to a bootstrapping server function, BSF, for key generation information and a session shared key from, and receiving said key generation information and session shared key from the BSF, key means for deriving a direct communication key from at least the session shared key and the device identifier the communication means further comprising means for sending the direct communication key and the key generation information to the device.

According to an aspect of the invention, there is provided a User equipment device, UE, for obtaining a key for direct communication with a device over an interface, the UE comprising a processor and a memory, said memory containing instructions that when executed cause the UE to store a transaction identifier obtained from a Generic Bootstrapping Architecture, GBA, procedure, send the transaction identifier to the device and requesting key generation for direct communication with the device, if the transaction identifier is invalid, the memory contains further instructions that when executed cause the EU to, receive from the device a device identifier and key generation information, derive a session shared key from at least the key generation information, and derive a direct communication key from at least the session shared key and the device identifier.

In one embodiment, the memory further contains instructions that when executed cause the UE to carry out the method as claimed in any of appended claims 2 to 12

According to another aspect of the invention, there is provided a device configured for obtaining a key for direct communication with a User Equipment, UE, over an interface, the device comprising a processor and a memory, said memory containing instructions that when executed cause the device to receive from the UE an invalid transaction identifier and request to obtain a direct communication key, send to a direct communication element the transaction identifier and a device identifier, and request the direct communication element to provide the device with the device communication key, receive the direct communication key and key generation information from the direct communication element; and send the key generation information and the device identifier to the UE.

In one embodiment, the memory further contains instructions that when executed causes the device to carry out the method as claimed in any of appended claims 13 to 22.

According to yet another aspect of the invention, there is provided a Direct Communication Element configured for establishing a key for direct communication over an interface between a User Equipment device, UE and a device, the Direct communication element comprising a processor and a memory, said memory containing instructions that when executed cause the Direct Communication Element to receive from the device a transaction identifier, a device identifier, and a request to provide a direct communication key to the device, determine if the transaction identifier is invalid, if the transaction identifier is invalid, the memory further contains instructions that when executed causes the Direct Communication element to use the transaction identifier to identify the UE, send a request to a bootstrapping server function, BSF, for key generation information and a session shared key from, and receive said key generation information and session shared key from the BSF, derive a direct communication key from at least the session shared key and the device identifier send the direct communication key and the key generation information to the device.

In one embodiment, the memory further contains instructions that when executed causes the device to carry out the method as claimed in any of appended claims 24 to 28.

According to another aspect of the invention, there is provided a method, performed by a User Equipment device, UE, for obtaining a key for direct communication with a device over an air interface, the method comprising sending to the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and requesting key generation for direct communication with the device, receiving from the device a device identifier and key generation information, deriving a session shared key from at least the key generation information, and deriving a direct communication key from at least the session key and the device identifier.

In some examples, the method may be conducted with the UE out of coverage of coverage of a communication network, such as an E-UTRAN.

According to examples of the invention, the direct communication key may be derived using additional inputs to the session shared key and the device identifier, including for example the UE identifier or other suitable identifiers. In some examples, the direct communication key may be derived using a Key Derivation Function (KDF), and the input parameters may be hashed or otherwise processed before they are used to derive the direct communication key. The KDF can be any standard function such as the KDF defined in 3GPP TS 33.220.

According to examples of the invention, the device may be a UE, a UE-to-network Relay, or may be a network node. According to examples of the invention, the interface may comprise a Proximity Services, ProSe, interface. The ProSe interface may comprise a PC5 interface.

The method may comprise discovering the device through a discovery procedure.

In some examples, at least one of the UE identifier, the device identifier or the request for key generation is comprised within a discovery procedure message.

In one embodiment, the UE further sends to the device, a direct communication element identifier, direct key set identifier, DKSI, a list of security algorithms supported by the UE, and a nonce generated by the UE.

In another embodiment, the method comprises receiving a Message Authentication Code, MAC, with the device identifier and key generation information, wherein the MAC is generated using the direct communication key or a key derived from the direct communication key.

In yet another embodiment, the method comprises receiving the DKSI, a lifetime, at least one security algorithm chosen by the device from the list of security algorithms, said list of security algorithms supported by the UE, together with the MAC, device identifier and key generation information.

In one example, the method comprises sending a confirmation message to the device indicating that the UE has derived the direct communication key.

In another example, the method comprises checking the MAC with the derived direct communication key or a key derived from the direct communication key, generating a confirmation MAC using the direct communication key or a key derived from the direct communication key, sending the confirmation MAC with the confirmation message; wherein, if the check is successful, the confirmation message further indicates that the UE has successfully checked the MAC.

In one embodiment, the method comprises, as a preceding step, requesting key generation for direct communication with the device, and in response receiving from the device a Generic Bootstrapping Architecture, GBA, renegotiation request.

The UE may not be able to initiate a Generic bootstrapping architecture, GBA, procedure. The UE may not comprise a valid shared secret with a Bootstrapping Server Function, BSF.

The method may comprise, as a preceding step, sending a temporary key to the device and receiving in response a request for a new temporary key, and then sending the UE identifier instead of a new temporary key.

In another embodiment, the method comprises, as a preceding step, receiving the ProSe UE ID, ProSe Relay UE ID, ProSe Discovery UE ID, ProSe Application code or ProSe Restricted code from the Direct Communication element.

According to another aspect of the invention, there is provided a method, performed by a device, for obtaining a key for direct communication with a User Equipment device, UE, over an air interface, the method comprising, receiving from the UE a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and a request to obtain a direct communication key, sending to a Direct Communication Element the UE identifier and a device identifier of the device, and requesting the Direct Communication Element to provide the device with the direct communication key; and receiving the direct communication key and key generation information from the Direct Communication Element, and sending the key generation information and the device identifier to the UE.

According to examples of the invention, the device may be a UE, a UE-to-network Relay, or may be a network node.

According to examples of the invention, the Direct Communication Element may be a functional element hosted on a server or other processing element.

In one embodiment, the interface comprises a Proximity Services, ProSe, interface, and the Direct Communication Element comprises at least one of ProSe Function, ProSe Key Management Server, a ProSe Key Management Function.

In one embodiment, the method further comprises discovering the UE through a discovery procedure.

In one example, at least one of the UE identifier, device identifier and the request for key generation are comprised within a discovery procedure message.

In one example, the method further comprises receiving a direct communication element identifier, a direct key set identifier, a list of security algorithms supported by the UE and a nonce generated by the UE.

In one embodiment, the method comprises sending to the UE the DKSI, a lifetime, at least one security algorithm chosen by the device from the list of security algorithms supported by the UE, said list of algorithms supported by the UE, and a nonce generated by the device.

In another embodiment, the method further comprises generating a Message Authentication Code, MAC, using the direct communication key or a key derived from the direct communication key and sending the MAC to the UE with the key generation information and the device identifier.

In one embodiment, the method comprises receiving a confirmation message from the UE indicating that the UE has derived the direct communication key.

In one example, the confirmation message further indicates that the UE has successfully checked the MAC.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device. A UE or device which is comprised within a communication network may for example comprise a UE or device which subscribes to the communication network.

According to examples of the invention, if the UE is comprised within a first communication network and the device is comprised within a second communication network, sending to and receiving from the Direct Communication Element may comprise sending to and receiving from the second sub-Element comprised within the second communication network.

According to another aspect of the invention, there is provided a method, performed by a Direct Communication Element, for establishing a key for direct communication over an interface between a User Equipment device, UE, and a device, the method comprising receiving from the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code, a device identifier, and a request to provide a direct communication key to the device, identifying the UE from the UE identifier, sending a request to a bootstrapping server function, BSF, for key generation information and a session shared key, and receiving from the BSF said key generation information and session shared key, deriving the direct communication key from at least the session shared key and the device identifier, sending the direct communication key and the key generation information to the device.

In some examples, a BSF that is associated with a UE may be a BSF that is contained within the same communication network as the UE, for example the same PLMN.

According to examples of the invention, the device may be a UE, a UE-to-network Relay, or may be a network node.

According to examples of the invention, the direct communication key may be derived using additional inputs to the session shared key and the device identifier, including for example, the UE identifier or other suitable identifiers. In some examples, the direct communication key may be derived using a Key Derivation Function (KDF), and the input parameters may be hashed or otherwise processed before they are used to derive the direct communication key. The KDF may be any standard function such as the KDF defined in 3GPP TS 33.220.

According to examples of the invention, the Direct Communication Element may be functional element hosted on a server or other processing element.

In one embodiment, the method further comprises mapping the identified UE to a public UE identifier and sending the public UE identifier to the BSF.

In one embodiment, the interface comprises a Proximity Services, ProSe, interface, and the Direct Communication Element comprises at least one of a ProSe Function, a ProSe Key Management Function or a ProSe Key Management Server.

In another embodiment, the method further comprises checking that at least one of the device or the UE is authorised to establish direct communication.

In one example, the method further comprises, as a preceding step, generating a ProSe UE ID, ProSe Relay UE ID, ProSe Discovery UE ID, ProSe Application code or ProSe Restricted code and providing it to the UE.

In any of the methods described above, the device may comprise at least one of a UE or a UE-to-Network Relay. The key generation information may comprise Generic Bootstrapping Architecture Push Information, GPI.

According to examples of the invention, if the UE is comprised within a first communication network and the device is comprised within a second communication network, the Direct Communication Element may comprise a first sub-Element in the first communication network and a second sub-Element in the second communication network. In some examples, the first sub-Element may be a ProSe Function or ProSe KMS in a home PLMN of the UE and the second sub-Element may be a ProSe Function or ProSe KMS in a home PLMN of the device.

According to examples of the invention, if the UE is comprised within a first communication network and the device is comprised within a second communication network, checking that at least one of the device or the UE is authorised to establish direct communication may comprise checking that the UE is authorised to establish direct communication in the first sub-Element, and checking that the device is authorised to establish direct communication in the second sub-Element.

According to examples of the invention, if the UE is comprised within a first communication network and the device is comprised within a second communication network, sending to and receiving from at least one of the BSF or the device may comprise sending to and receiving from one of the first or second sub-Elements via the other of the first or second sub-Elements. In some examples, in which the sub-Elements comprise ProSe Functions in different PLMNs, the communication between sub-Elements may be over a PC6 interface.

According to examples of the invention, if the UE is comprised within a first communication network and the device is comprised within a second communication network, sending to and receiving from the BSF may comprise sending and receiving at the first sub-Element, and deriving the direct communication key may comprise deriving the direct communication key at the second sub-Element.

According to an aspect of the invention, there is provided a system for securing direct communication between a User Equipment device, UE, and a device over an interface, the system comprising a UE, a device and a Direct Communication Element; wherein the UE comprises means for sending a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code, to the direct communication element via the device, and the direct communication element comprises means for identifying the UE using the UE identifier, obtaining a session shared key and Generic Bootstrapping Architecture Push Information, GPI, deriving a direct communication key from at least the session shared key, and sending the direct communication key and the GPI to the device, wherein the device comprises means for sending the GPI to the UE, and wherein the UE comprises means for deriving the session shared key from at least the GPI and to derive the direct communication key from the session shared key.

In one embodiment, the Direct Communication Element and the UE are configured to derive the direct communication key from the session shared key and a device identifier.

According to one aspect of the invention, there is provided a User Equipment device, UE, for obtaining a key for direct communication with a device over an air interface, the UE comprising communication means for sending to the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and requesting key generation for direct communication with the device, the communication means further comprising means for receiving from the device a device identifier and key generation information, key means for deriving a session shared key from at least the key generation information, and deriving a direct communication key from at least the session key and the device identifier.

According to another aspect of the invention, there is provided, a device, for obtaining a key for direct communication with a User Equipment device, UE, over an air interface, the device comprising communication means for receiving from the UE a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and a request to obtain a direct communication key, sending to a Direct Communication Element the UE identifier and a device identifier of the device, and requesting the Direct Communication Element to provide the device with the direct communication key, and receiving the direct communication key and key generation information from the Direct Communication Element, and sending the key generation information and the device identifier to the UE.

According to yet another aspect of the invention, there is provided a Direct Communication Element, for establishing a key for direct communication over an interface between a User Equipment device, UE, and a device, the Direct Communication Element comprising communication means for receiving from the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code, a device identifier, and a request to provide a direct communication key to the device, authorizing means for identifying the UE from the UE identifier, the communication means further comprising means for sending a request to a bootstrapping server function, BSF, for key generation information and a session shared key, and receiving from the BSF said key generation information and session shared key, key means for deriving the direct communication key from at least the session shared key and the device identifier, and sending the direct communication key and the key generation information to the device.

According to another aspect of the invention, there is provided a User Equipment device, UE, for obtaining a key for direct communication with a device over an interface, the UE comprising a processor and a memory, said memory containing instructions that when executed cause the UE to carry out a method to send to the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and request key generation for direct communication with the device, receive from the device a device identifier and key generation information, derive a session shared key from at least the key generation information, and derive a direct communication key from at least the session key and the device identifier.

In one embodiment, the memory further contains instructions that when executed cause the UE to carry out the method as claimed in any of appended claims 35 to 47.

According to a further aspect of the invention, there is provided a device configured for obtaining a key for direct communication with a User Equipment, UE, over an interface, the device comprising a processor and a memory, said memory containing instructions that when executed cause the device to receive from the UE a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code and a request to obtain a direct communication key, send to a Direct Communication Element the UE identifier and a device identifier of the device, and request the Direct Communication Element to provide the device with the direct communication key, and receive the direct communication key and key generation information from the Direct Communication Element, and send the key generation information and the device identifier to the UE.

In one embodiment, the memory further contains instructions that when executed causes the device to carry out the method as claimed in any of appended claims 49 to 56.

According to yet another aspect of the invention, there is provided a Direct Communication Element configured for establishing a key for direct communication over an interface between a User Equipment device, UE and a device, the Direct communication element comprising a processor and a memory, said memory containing instructions that when executed cause the direct communication element to receive from the device a UE identifier comprising any of ProSe UE ID, international mobile subscriber identity, IMSI, mobile station international subscriber directory number, MSISDN, ProSe Relay UE ID, ProSe Discovery UE ID, ProSe Application code or ProSe Restricted code, a device identifier, and a request to provide a direct communication key to the device, identify the UE from the UE identifier, send a request to a bootstrapping server function, BSF, for key generation information and a session shared key, and receive from the BSF said key generation information and session shared key, derive the direct communication key from at least the session shared key and the device identifier, send the direct communication key and the key generation information to the device.

In one embodiment, the memory further contains instructions that when executed causes the device to carry out the method as claimed in any of appended claims 58 to 61.

According to another aspect of the invention, there is provided a computer program which, when run on a computer, causes the computer to carry out a method according to any one of the appended claims 1 to 31 and 34 to 63.

According to yet another aspect of the invention, there is provided a computer program product comprising readable storage medium and a computer program according to the preceding aspect of the present invention stored on the computer readable storage.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

To avoid having to pre-configuring shared keys in all of the relevant ProSe enabled devices to enable all of the possible communication paths that may be desired as discussed in the introduction, it has been suggested in application number PCT/EP2015/050864 to use Generic Bootstrapping Architecture (GBA) procedures to establish a shared key. However, such procedures require the ProSe enabled UE to be within E-UTRAN coverage at least to perform initial bootstrapping procedures, after which the UE may move outside of network coverage. If the ProSe enabled UE is not within E-UTRAN coverage, or is unable to perform bootstrapping procedures while in E-UTRAN coverage, then pre-configuring shared keys, with the associated challenges discussed above, remains the only option.

Thus, it is an aim of the present invention to provide methods, apparatus and computer readable media which at least partially address one or more of the challenges discussed above. Thus, embodiments of the present invention enable the establishment of a Direct Communication Key for securing communication between a UE and a device, which may itself be a UE or may be a UE-to-Network Relay, when the UE does not have a valid shared secret and/or GBA procedures are not available. This may be achieved using Generic Bootstrapping Architecture (GBA) Push procedure in 3GPP networks.

Before describing aspects of the invention, GBA and GBA Push will first be discussed.

Figure 1:
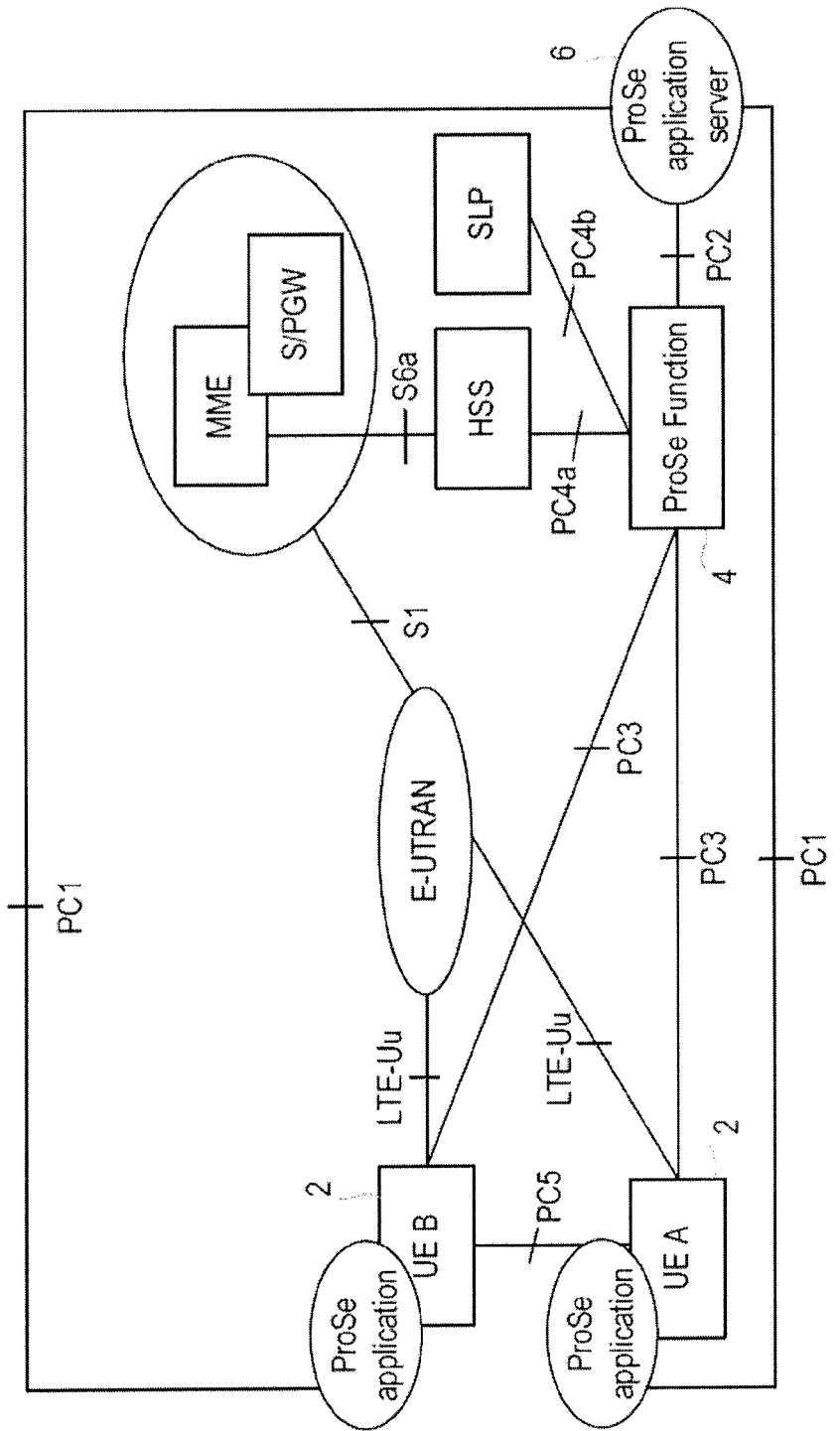
FIG. 1 is a schematic representation of a Proximity Services (ProSe) architecture.
Figure 2:
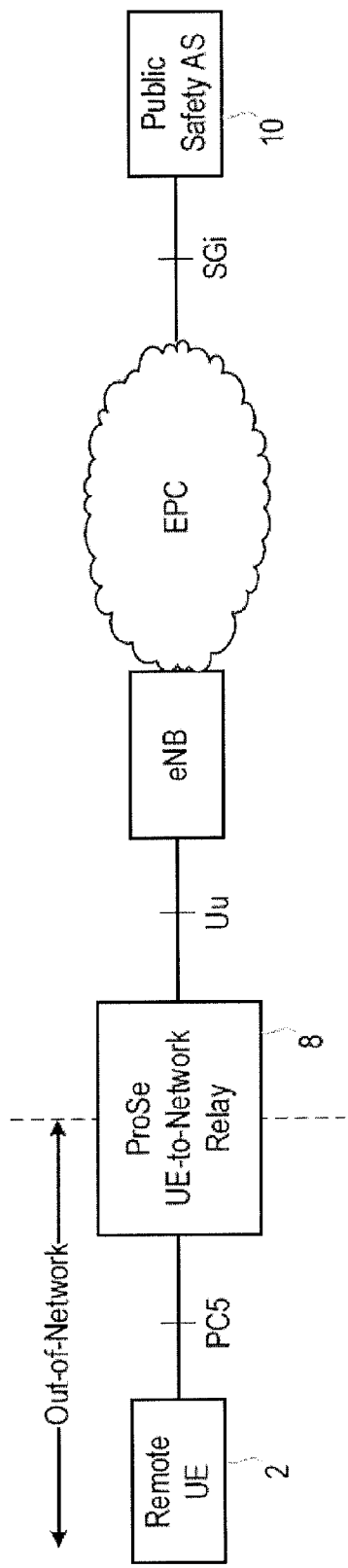
FIG. 2 is a representation of ProSe including a UE-to-Network Relay.
Figure 3:
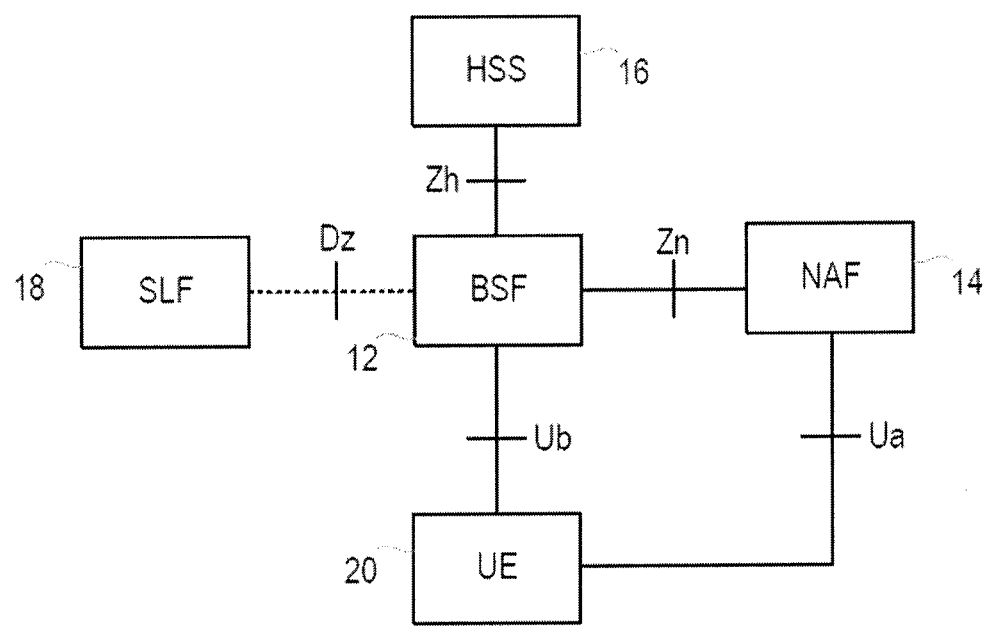
FIG. 3 is a schematic representation of a Generic Bootstrapping Architecture (GBA)

Referring now to FIG. 3, this figure illustrates a reference GBA architecture. GBA is a framework which uses network operator controlled credentials, such as 3GPP Authentication and Key Agreement (AKA) credentials, in the Universal Integrated Circuit Card (UICC) of devices to provide keys for application security. The reference GBA architecture comprises a UE 20, a Bootstrapping Server Function (BSF) 12, a Network Application Function (NAF) 14, a Home Subscription Server (HSS) 16 and a Subscriber Location Function (SLF) 18. Exchanges between the BSF 12 and UE 20 through the reference point Ub enable the establishing of key material Ks in both the BSF 12 and UE 20. The BSF 12 and UE 20 may then each independently generate a NAF specific key, for example a Ks_NAF, which will be used to secure the reference point Ua between the UE 20 and the NAF 14. Ks_NAF is generated using a Key Derivation Function (KDF) with inputs including the key material Ks, the IMPI of the UE 20 and an identification of the NAF 14. The BSF 12 supplies the UE with a Bootstrapping Transaction Identifier (B-TID) corresponding to the exchange as well as a lifetime of the key material Ks. The UE 20 may then supply the B-TID to the NAF 14, enabling the NAF 14 to request the key corresponding to the B-TID from the BSF 12. In response to the request, the BSF 12 supplies Ks_NAF to the NAF 14, meaning the UE 20 and NAF 14 may communicate securely through the reference point Ua using Ks_NAF.

Figure 4:
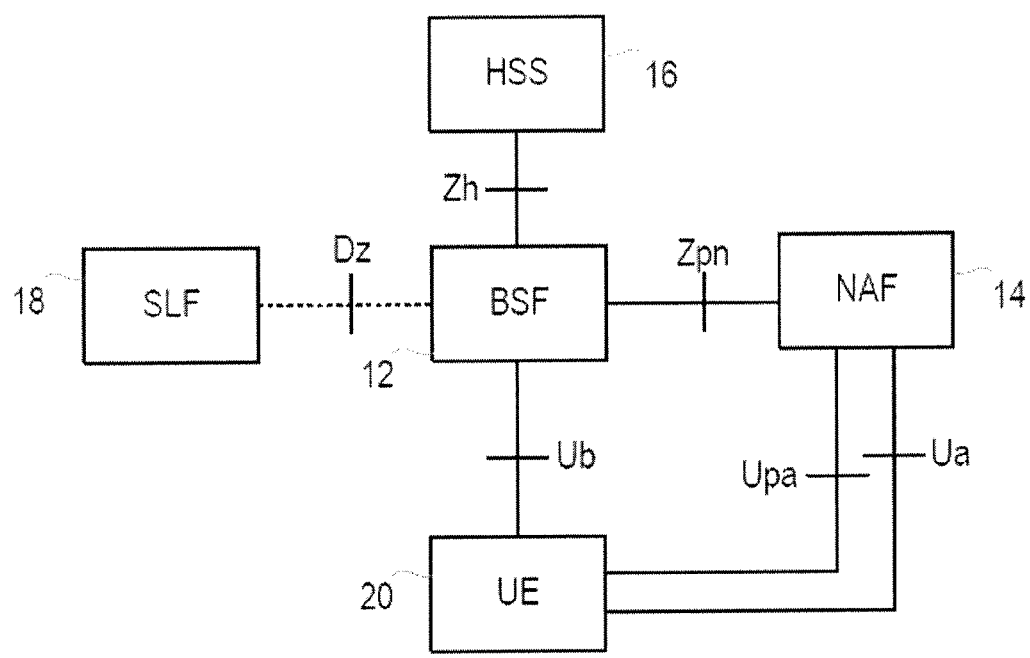
FIG. 4 is a schematic representation of a Generic Bootstrapping Architecture Push GBA Push.

FIG. 4 illustrates a reference architecture for GBA Push. GBA Push is closely related to GBA as described above and in TS 33.220, however it differs from GBA in that it is a mechanism to bootstrap the security between a Network Application Function (NAF) and a UE, without requiring the UE to contact a Bootstrapping Server Function (BSF) in the network to initiate the bootstrapping. Referring to FIG. 4 where like for like reference numerals are retained when referring to the same features as in FIG. 3, the reference architecture comprises a UE 20, a Bootstrapping Server Function (BSF) 12, a Network Application Function (NAF) 14, a Home Subscription Server (HSS) 16 and a Subscriber Location Function (SLF) 18. A NAF 14 seeking to establish secure communication with a UE 20 registered for Push services requests information needed to establish a session shared key from the BSF 12. This information, known as GBA Push Information (GPI) is provided to the NAF 14 by the BSF 12 over the Zpn reference point, together with the session shared key. The NAF 14 stores the session shared key and forwards the GPI to the UE 20 over the Upa reference point. The UE 20 then processes the GPI to obtain the session shared key. The UE 20 and NAF 14 are then both in possession of the session shared key which may be used to secure communication over the Ua reference point.

Aspects of the present invention employ the reference GBA Push architecture, with enhanced functionality in the NAF, to establish a shared key between a UE and a device, which key may be used over a direct communication interface such as a ProSe PC5 interface. In particular, GBA Push is used as a fall back option when the UE does not have a valid shared secret for establishing a shared key and GBA is not available for the UE to retrieve a valid shared secret from the BSF. An example of when GBA is not available may be when the UE is out of network coverage.

In brief, in one embodiment when the UE has previously run GBA with its BSF but the shared secret is no longer valid and GBA is not available, the UE uses the B-TID from the previous GBA procedure as a temporary ID or shared secret to run GBA Push. In this embodiment, the UE contacts the device and indicates its identity in the form of its B-TID from the previous GBA procedure. The device then contacts a Direct Communication Element, which may be a ProSe Function, ProSe Key Management Function (KMF) or ProSe Key Management Server (KMS), which then acts as a NAF for the purposes of GBA Push. The device indicates the B-TID received from the UE and its own identity to the NAF. If the NAF considers that the B-TID is invalid (for example it has expired or it is too old for the policy of the NAF), it checks if it matches one of its stored B-TIDs from previous GBA procedures. If the B-TID does match, the NAF can identify the UE and contacts a BSF in the UE's home PLMN to retrieve GPI and a session shared key (NAF key which may be Ks_NAF, Ks_int_NAF or Ks_ext_NAF) corresponding to the UE identity from the BSF. The NAF then derives a Direct Communication key K_DC (ProSe Direct Key) from the NAF key and provisions both the Direct Communication key K_DC and the GPI to the device.

The device then sends the GPI and its own identity to the UE. The UE processes the GPI to obtain the session shared key (NAF specific key), which may for example be a Ks_NAF, Ks_int_NAF or Ks_ext_NAF. The UE then derives the Direct Communication key K_DC (ProSe Direct Key) in the same manner as the NAF. The Direct Communication key K_DC is then available in both the UE and the device for use on a direct communication interface such as the ProSe PC5 interface between the UE and the device.

In the above embodiment, it is a prerequisite that the UE and the DCE have both stored the B-TID from the previous GBA procedure although it is or has since then become invalid. (An invalid B-TID or shared secret should be understood to mean herein that it has expired or it is too old for the policy of the NAF.) The B-TID is used to identify the UE so that the DCE can apply GBA Push to obtain GPI and a session shared key.

The NAF involved in the provisioning of the Direct Communication key may be operated by a 3GPP operator or a third party operator, for example a National Security or Public Safety organisation having an agreement with the 3GPP operator running the BSF. The device with which the UE communicates may be another UE for one-to-one communication or may be a UE-to-Network Relay.

Figure 5A:
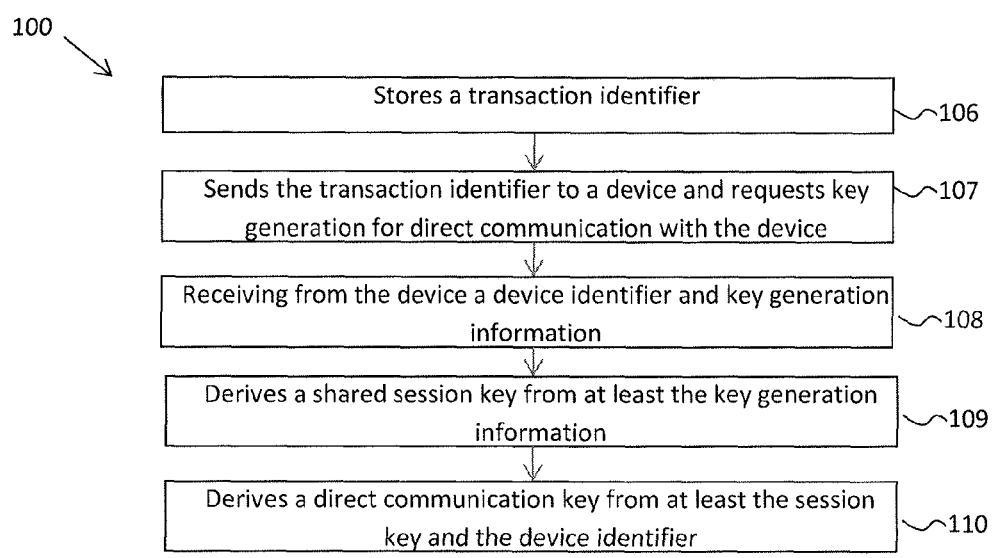
FIG. 5a is a flow chart illustrating process steps in a method performed by a UE for obtaining a key for direct communication with a device over an interface.
Figure 5B:
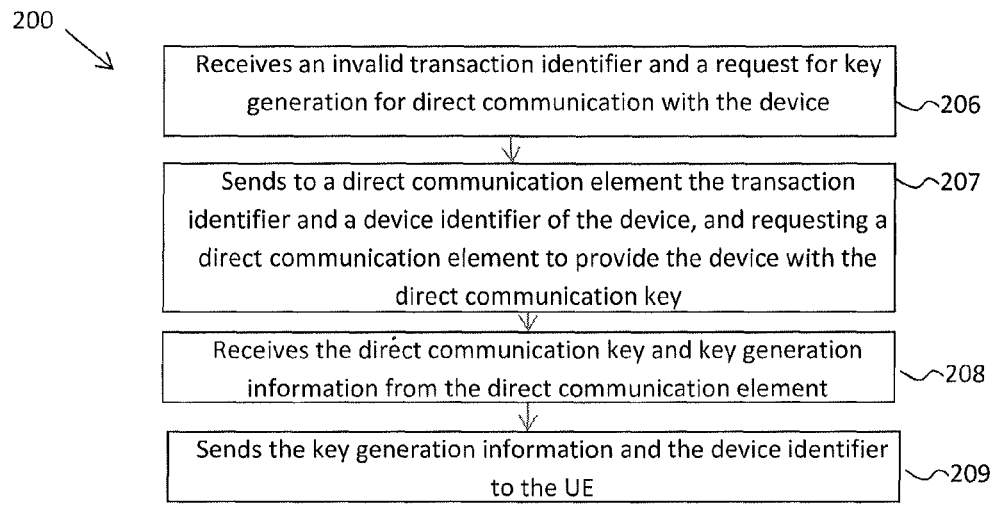
FIG. 5b is a flow chart illustrating process steps in a method performed by a device for obtaining a key for direct communication with a UE over an interface.
Figure 6:
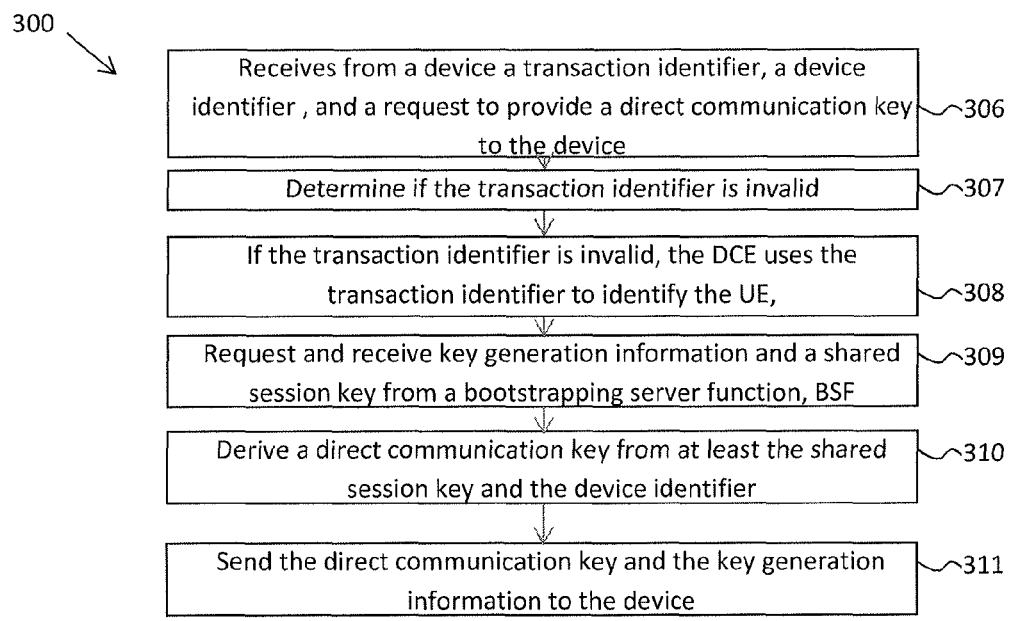
FIG. 6 is a flow chart illustrating process steps in a method performed by a Direct Communication Element for establishing a key for direct communication over an interface between a UE and a device.

FIGS. 5a, 5b and 6 illustrate methods according to aspects of the present invention performed in each of the UE, the device and the Direct Communication Element. Actions at each entity are described below with reference to FIGS. 5a, 5b and 6.

FIG. 5a illustrates steps in a method 100 carried out at a UE for obtaining a key for direct communication with a device, which device may be another UE or may be a UE-to-Network Relay. Referring to FIG. 5a, in a first step 106, the UE stores a transaction identifier received from a bootstrapping server function, BSF, in a previous session. The UE then sends to the device a transaction identifier (which may be a B-TID) and requests key generation for direct communication with the device, step 107. In step 108, if the transaction identifier is invalid, the UE receives from the device a device identifier and key generation information. The key generation information may for example be GBA Push Information, (GPI). The UE then derives a session shared key from at least the key generation information in step 109, and derives a direct communication key K_DC from at least the session shared key and the device identifier in step 110.

Optional steps of method 100 will now be described. The method may further comprise discovering the device through a discovery procedure. A least one of transaction identifier, the device identifier or the request for key generation may be comprised within a discovery procedure message. The UE may further send a direct communication element identifier, direct key set identifier, DKSI, a list of security algorithms supported by the UE, and a nonce generated by the UE, to the device. The UE may also receive the DKSI, a lifetime, at least one security algorithm chosen by the device from the list of security algorithms, said list of security algorithms supported by the UE and a nonce generated by the device together with a Message Authentication Code, MAC, device identifier and key generation information.

The UE may send a confirmation message to the device indicating that the UE has derived the direct communication key. The MAC may be generated using the direct communication key or a key derived from the direct communication key. If so, the UE may check the MAC with the derived direct communication key or a key derived from the direct communication key, generate a confirmation MAC using the direct communication key or a key derived from the direct communication key, and send the confirmation MAC with the confirmation message, wherein, if the check is successful, the confirmation message further indicates that the UE has successfully checked the MAC.

The invalid transaction identifier may be used as an identifier of the UE. The interface comprises a Proximity Services, ProSe, interface. The UE may not be able to initiate another GBA bootstrapping procedure. The UE may not comprise a valid shared secret with a Bootstrapping Server Function, BSF.

FIG. 5b illustrates steps in a method 200 performed by a device for obtaining a key for direct communication with a UE. The device may be a UE, a UE-to-network Relay, or may be network node. Referring to FIG. 5b, in a first step 206, the device receives from the UE an invalid transaction identifier of the UE and a request for key generation for direct communication with the device. The device then sends to a Direct Communication Element the transaction identifier and an identifier of the device, and requests the Direct Communication Element to provide the device with a direct communication key in step 207. The Direct Communication Element may for example be a ProSe Function or ProSe KMS or ProSe KMF. In step 208, the device receives from the Direct Communication Element the direct communication key and key generation information. Finally in step 209, the device sends the key generation information and the device identifier to the UE.

Optional steps of method 200 will now be described. The method may further comprise discovering the UE through a discovery procedure. At least one of the transaction identifier, device identifier or the request for key generation may be comprised within a discovery procedure message. The device may further receive from the UE a direct communication element identifier, a direct key set identifier, DKSI, a list of security algorithms supported by the UE and a nonce generated by the UE. The device may then send to the UE the DKSI, a lifetime, at least one security algorithm chosen from the list of security algorithms supported by the UE, said list of security algorithms supported by the UE and a nonce generated by the device. The device may also generate a Message Authentication Code, MAC, using the direct communication key or a key derived from the direct communication key, and sending the MAC to the UE with the key generation information and the device identifier. The device may further receive a confirmation message from the UE indicating that the UE has derived the direct communication key. The confirmation message may indicate that the UE has successfully checked the MAC The invalid transaction identifier may be used as an identifier of the UE. The interface may comprise a Proximity Services, ProSe, interface, and the Direct Communication Element comprises at least one of ProSe Function, a ProSe Key Management Function or a ProSe Key Management Server.

FIG. 6 illustrates steps in a method 300 performed by a Direct Communication Element (DCE) for establishing a key for direct communication over an interface between a UE and a device. The DCE may be a ProSe Function or a ProSe KMS or ProSe KMF, and the device may be a UE, a UE-to-network Relay, or a Network node. Referring to FIG. 6, in a first step 306, the DCE receives from the device a transaction identifier, an identifier of the device and a request to provide a direct communication key to the device. In step 307, the DCE determines if the transaction identifier is invalid. If the transaction identifier is invalid, the DCE uses the transaction identifier to identify the UE, step 308. The DCE then fetches key generation information and a session shared key from a bootstrapping server function, BSF, step 309. In the next step, 310, the DCE derives a direct communication key from at least the session shared key and the device identifier. Then in a final step, 311, the DCE sends the direct communication key and the key generation information to the device.

Optional method steps of method 300 will now be described. The method may further comprise using the transaction identifier to identify the UE by the direct communication element matching the transaction identifier with a stored transaction identifier from a previous Generic Bootstrapping Architecture procedure. The direct communication element may further map the matched transaction identifier to a public UE identifier and sending the public UE identifier to the BSF. If the direct communication element cannot match the transaction identifier with a stored transaction identifier, the method may further comprise sending the transaction identifier to the BSF and receiving the session shared key and the key generation information from the BSF. The method may further comprise checking that at least one of the device or the UE is authorised to establish direct communication.

The interface may comprise a Proximity Services, ProSe, interface, and the Direct Communication Element comprises at least one of a ProSe Function, a ProSe Key Management Function or a ProSe Key Management Server.

In any of methods 100, 200 and 300 the device may comprise at least one of a UE or a UE-to-Network Relay, and the key generation information may comprise Generic Bootstrapping Architecture Push Information, GPI. Furthermore, the transaction identifier may be a bootstrapping transaction identifier (B-TID).

The step of deriving the direct communication key, performed in the UE according to method 100 and in the DCE according to method 300, may be achieved in a range of different ways. In some examples, the direct communication key may be derived using a Key Derivation Function (KDF), which may be any standard function such as the KDF defined in 3GPP TS 33.220. Additional parameters to the session shared key and the device ID mentioned above may be input to the KDF. Example additional input parameters include B-TID, NAF-ID, KMS-ID, ProSe UE-ID, CK||IK and other inputs. The order of the input parameters may also be varied. The selection of additional parameters and the variation in their order may in some examples result in a more secure generation function. In addition, the input parameters may be transformed, hashed or otherwise processed before they are input to the KDF to derive the direct communication key. For example, a Ks_NAF could be transformed by first being run through another (or the same) key derivation function and the result input to the KDF, or another character sting could be used as input. In the following description, references to the derivation of a direct communication key include the above disclosed options for additional inputs and KDFs.

Figure 7:
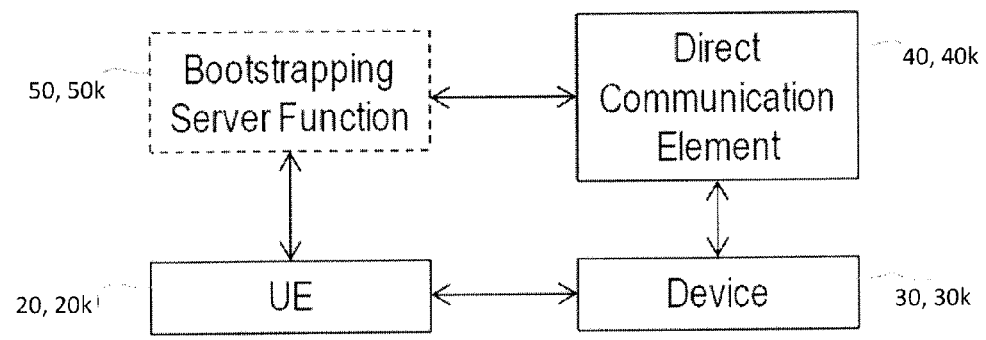
FIG. 7 is a schematic representation of a system for securing direct communication between a User Equipment device, UE, and a device over an interface.

The above described methods 100, 200, 300 may be performed by elements cooperating to form a system for securing direct communication between a UE and a device over an interface. Such a system is illustrated in FIG. 7 and comprises a UE 20, a device 30 and a Direct Communication Element (DCE) 40. The UE comprises means for sending an invalid transaction identifier to the direct communication element via the device, and the direct communication element comprises means for using the invalid transaction identifier to identify the UE. The direct communication element further comprises means for obtaining a session shared key and Generic Bootstrapping Architecture Push Information, GPI, deriving a direct communication key from at least the session shared key, and sending the direct communication key and the GPI to the device. Furthermore, the device comprises means for sending the GPI to the UE, and the UE comprises means for deriving the session shared key from at least the GPI and to derive the direct communication key from the session shared key.

The following discussion illustrates further examples of the invention with reference to ProSe communication as supported by a 3GPP network. However it will be appreciated that the invention is equally applicable to other direct communication technologies.

As previously discussed, aspects of the invention are particularly suited to establishing a shared key for use by a UE already comprising or possessing an invalid shared key from a previous GBA procedure but that has gone out of network coverage. However it should be understood that the UE 20 may not be limited to a remote UE that is out of network coverage that wishes to secure one-to-one communication with another UE, or secure E-UTRAN access via a device acting as a UE-to-Network Relay, the present invention may also be applied to establish a shared key for use by a UE which is within network coverage, but where GBA procedure is not available for some other reason or GBA Push is preferred over GBA.

As also discussed above, the device 30, at which the method 200 is performed, may be a UE, a UE-to-network Relay, or may be a network node. Furthermore, any reference herein to remote UE which is out of network coverage may use direct communication protocols to communicate not only with a dedicated UE-to-Network Relay but also with a direct communication enabled UE which may act as a UE-to-Network Relay. It will therefore be appreciated that while a device in the form of a UE-to-Network Relay is discussed in the following examples for the purposes of illustration, aspects of the invention are applicable to use for key establishment between a UE and other forms of device, for example a device in the form of a second UE. In either case it is assumed that both the UE and the device have a UICC and are enabled for ProSe.

Regardless of the nature of the device, it is possible that the UE and device may belong to the same Home PLMN or may belong to different Home PLMNs. Example applications of methods according to the present invention are described below for both these scenarios. The following example applications illustrate different ways in which the steps of the methods 100, 200, 300 described above may be implemented to achieve the above discussed functionality.

EXAMPLE i

UE and Device in Same HPLMN

Figure 8:
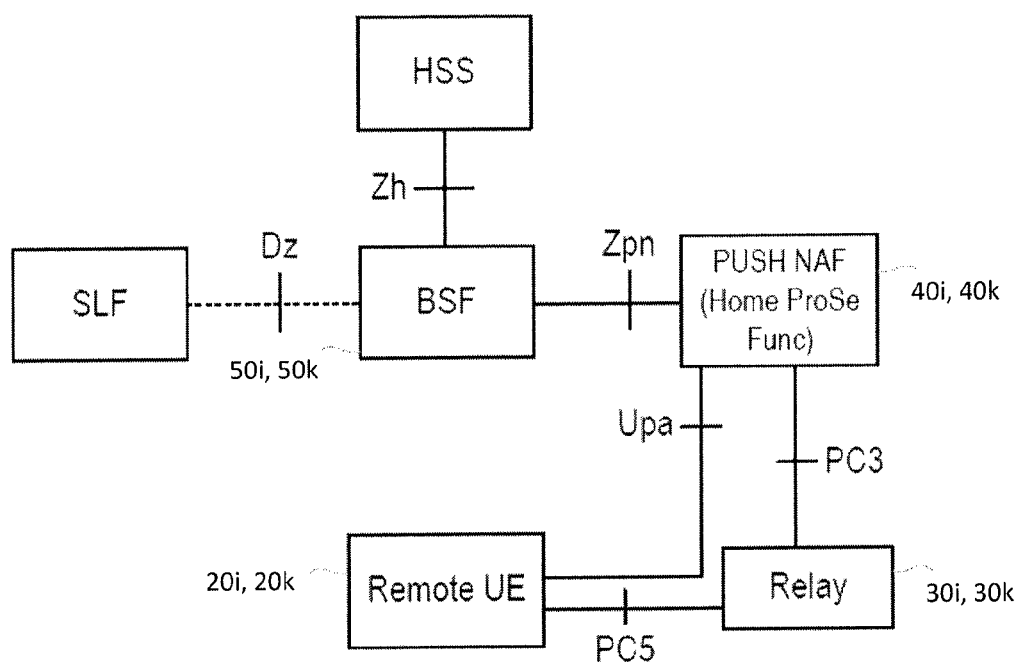
FIG. 8 is a representation of an example architecture for conducting the methods of FIGS. 5a to 6 and 14 to 16.
Figure 9:
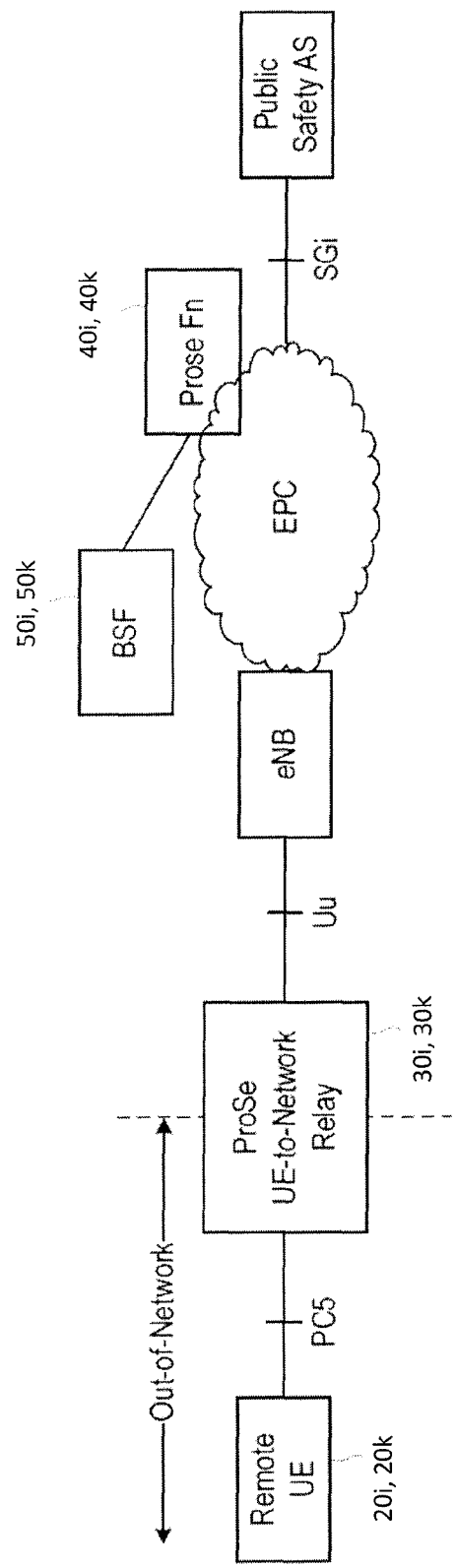
FIG. 9 is a representation of an example architecture for conducting the methods of FIGS. 5a to 6 and 14 to 16 over ProSe.

The GBA Push and ProSe architecture for this example are illustrated in FIGS. 8 and 9. According to this example, the UE, referred to as Remote UE 20i, and the device, referred to as Relay 30i, both belong to the same Home PLMN (HPLMN). This example describes the device as a ProSe UE-to-Network Relay however the example is also applicable to one-to-one communication. Furthermore, in the following examples, the DCE is a ProSe function acting as a NAF, but it will be appreciated that this is merely for the purposes of illustration. The DCE may alternatively be a ProSe KMS or a ProSe KMF.

As a preceding step, the Remote UE 20i has performed a GBA procedure with a BSF 50i whilst in network coverage and obtained a shared secret such as a B-TID and related session shared key ((NAF key which may be Ks_NAF, Ks_int_NAF or Ks_ext_NAF). It has also identified itself with its ProSe function 40i, for example through a previous session, such that the ProSe function 40i has stored the B-TID and its association to the remote UE.

The Relay 30i has E-UTRAN network coverage and is connected to the network. The Relay 30i uses ProSe Direct Discovery procedures to allow UEs in the vicinity to discover it. The Remote UE 20i discovers the Relay 30i using ProSe Direct Discovery procedures on the PC5 interface, for example having moved into the cell in which the Relay 30i is located. In some examples of the invention, discovery may be completed before the methods according to the present invention are carried out. In other examples, certain method steps may take place during the discovery procedure.

The Remote UE 20i sends its B-TID (transaction identifier) to the Relay 30i and requests a direct communication key for use with the Relay 30i. On receipt of this request, the Relay 30i sends a request over the PC3 interface to its ProSe Function 40i, which in the present example is the ProSe Function in the Home PLMN of both the Remote UE 20i and the Relay 30i. The ProSe Function acts as a NAF 40i for GBA Push. The ProSe Function 40i checks whether the B-TID matches one of its stored B-TIDs and if it is valid. If the ProSe Function 40*i* finds that the B-TID is invalid but that the B-TID matches one of its stored B-TIDs from previous sessions, then the ProSe Function 40*i* uses the B-TID to identify the UE 20*i*. Having identified the remote UE 20*i*, the ProSe Function 40*i* obtains GBA Push Information (GPI) and a session shared key from the BSF 50*i* in the Home PLMN. The session shared key is referred to in the present and following examples as a Ks_NAF for the purposes of illustration. However it will be appreciated that the session shared key may also or alternatively comprise other NAF specific keys such as Ks_int_NAF and Ks_ext_NAF. The ProSe Function 40*i* then derives the required direct communication key, DC_K, from the session shared key Ks_NAF and the identity of the Relay 30*i*. The ProSe Function 40*i* then sends both the GPI and the direct communication key DC_K to the Relay 30*i*. The Relay 30*i* stores the direct communication key DC_K and forwards the GPI to the Remote UE 20*i*. On receipt of the GPI, the Remote UE 20*i* derives the session shared key Ks_NAF from the GPI and then derives the direct communication key DC_K from the session shared key Ks_NAF and the identity of the Relay 30*i*. The direct communication key DC_K is then available in both the Remote UE 20*i* and the Relay 30*i*.

Should the ProSe Function 40*i* not successfully match the invalid B-TID received from the relay 30*i*, then it may forward it to the BSF 50*i* and request a session shared key (NAF key), for the BSF to identify the remote UE 20*i* using the invalid B-TID. If the BSF successfully identifies the remote UE 20*i*, then it sends the session shared key and GPI to the ProSe Function 40*i*, and the ProSe Function 40*i* then proceeds as described above.

The above steps are described in greater detail below with reference to the messaging flow diagram in FIG. 10.

Figure 10:
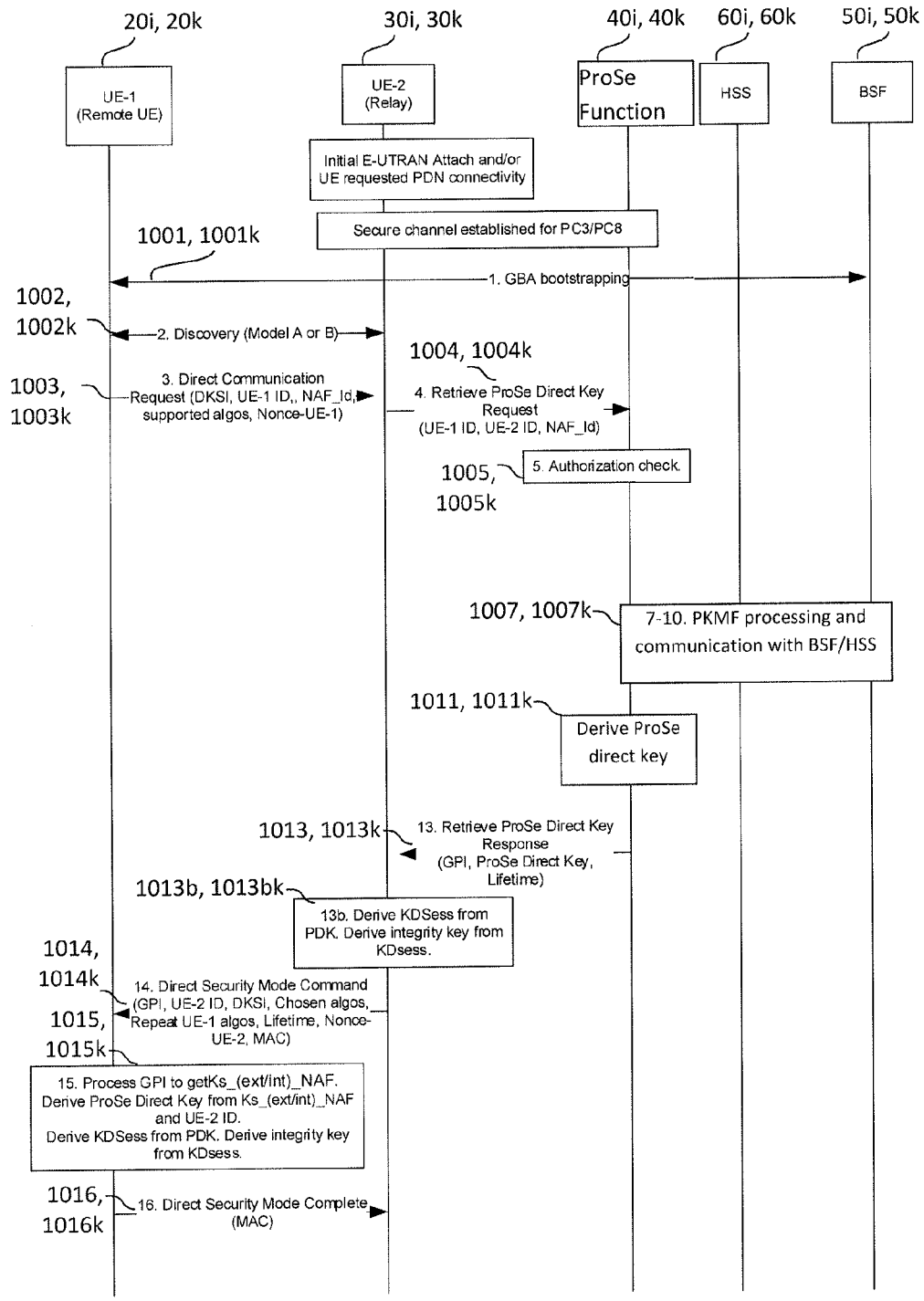
FIG. 10 is a message flow illustrating an example implementation of the methods of FIGS. 5a to 6 and 14 to 16 over ProSe.

Referring to FIG. 10, Relay 30*i* initially connects to the E-UTRAN, which connection may take place at any time before the following method steps. The Relay 30*i* establishes a secure channel over PC3 when the ProSe Function (DCE) acts as NAF or over PC8 when the ProSe KMF or ProSe KMS (DCE) acts as NAF. The Remote UE 20*i* then performs GBA procedure with the BSF whilst in network coverage, as represented by message exchange 1001. During the GBA procedure, the Remote UE 20*i* obtains a shared secret comprising a transaction identifier (B-TID) and a session shared key. It also identifies itself with its ProSe Function 40*i* acting as a NAF, for example through a (unillustrated) session, where it sends the B-TID to the ProSe Function 40*i*. The ProSe Function 40*i* then stores the B-TID and its association with the remote UE. The Remote UE 20*i* and Relay 30*i* then discover each other through Direct Discovery procedures using Direct Discovery Model A or Direct Discovery Model B, step 1002.

Discovery may be initiated by either the Remote UE 20*i* or the Relay 30*i*. In the illustrated example, discovery is initiated by the Relay 30*i*. Step 1002 comprises the Relay 30*i* issuing a discovery procedure message, which may be a Direct Discovery broadcast according to ProSe Model A or a Direct Discovery request message according to ProSe Model B. The discovery procedure message includes an identity of the Relay 30*i*. The Remote UE 20*i* receives the discovery procedure message and may respond, for example with a discovery procedure message comprising a request message sent in response to a Direct Discovery broadcast according to ProSe Model A or a Direct Discovery response message in response to a Direct Discovery request message according to ProSe Model B. In the illustrated example, the discovery procedure is completed before the subsequent method steps. However, in alternative examples, subsequent method steps may be combined with the discovery procedure, as discussed below.

In message 1003, the Remote UE 20*i* sends a direct communication set up request message over PC5 to the Relay 30*i*. The request includes the B-TID (acting as UE identifier) and a request for secure communication. The request may explicitly request generation of a key for direct communication, or an indication that secure communication is required may be contained within the Remote UE identity. In some embodiments, the request message also comprises direct key set identifier (DKSI) for identifying any keys resulting from the direct communication key, NAF-ID identifying which ProSe Function of the Remote UE 20*i* that is acting as NAF, a list of security algorithms supported by the Remote UE 20*i* and a nonce generated by the Remote UE 20*i* (Nonce-UE-remote) used for authentication as seen below. A nonce may for example be a sequence number, a random value or a timestamp.

In some examples of the invention (not illustrated) the direct communication set up request message 1003 may be included in a discovery procedure message such as a discovery response message as discussed above.

The Relay 30*i* receives the request from the Remote UE 20*i* and then, at step 1004, the Relay sends a Retrieve ProSe Direct Key request over the PC3 or PC8 interface to the ProSe Function 40*i* acting as a NAF. In the present example, both the Remote UE 20*i* and the Relay 30*i* are in the same PLMN and so the ProSe Function is the Home ProSe Function for the Relay 30*i*. The request to the ProSe Function includes at least the B-TID and the identity of the Relay 30*i* and requests to provide a key for direct communication between the Remote UE 20*i* and the Relay 30*i*.

Upon receiving the request, the ProSe Function 40*i* first checks whether or not a UE associated with the NAF-ID is authorized to set up secure communication over the PC5 interface by checking a database with a list of authorized identities at message exchange 1005. This database may be local and supported by the DCE 40*i* or may be implemented in a different network server. If the authorization is successful, the ProSe Function 40*i* checks if the B-TID is valid and if it has any associated session shared keys. Here, there are a few possible outcomes as represented by message exchange 1007;

If the B-TID and the associated session shared key is found at the ProSe Function and are valid, then the ProSe Function 40*i* checks if the Remote UE 20*i* associated with the B-TID is authorized to set up security over PC5 with a UE belonging to the same HPLMN. If authorization is successful, the ProSE Function proceeds with step 1011 as described below.

If the B-TID and associated session shared key are found, but they are invalid, (i.e. a match is found between an invalid B-TID and a stored B-TID from a previous GBA session), the ProSe Function proceeds with identifying the Remote UE 20*i* based on the B-TID and then checks if it is authorized to set up security over PC5 with a UE belonging to the same HPLMN. If authorization is successful, the process continues and the ProSe Function 40*i* sends a GPI request to the BSF 50*i*. The identity of the Remote UE 20*i* is included in the message, as this identity will be used as the public identity to obtain the correct subscription and GPI according to the GBA push procedures defined in TS 33.223. Upon receiving the GPI and the session shared key, the ProSe Function proceeds with step 1011 as described below.

If the ProSe Function cannot find the B-TID and associated session shared key, (i.e. a match between an invalid B-TID and a stored B-TID as not been successful), then the ProSe Function sends the B-TID to the BSF 50*i* and requests a session shared key. If the BSF can identify the Remote UE 20*i* based on the B-TID, then the BSF sends a session shared key and GPI to the ProSe Function 40*i*. The ProSe Function 40*i* then checks if the Remote UE 20*i* is authorized to set up security over PC5 with a UE belonging to the same HPLMN. The ProSe Function 40*i* then proceeds with step 1011. Should the BSF not successfully identify the Remote UE 20*i*, then it notifies the ProSe Function which in turn sends a bootstrapping renegotiation request to the Remote UE. The Remote UE 20*i* may in return provide a new B-TID or a new UE identifier such as a ProSe UE ID, international mobile subscriber identity, IMSI, mobile station international subscriber directory number, MSISDN, ProSe Relay UE ID, ProSe Discovery UE ID, ProSe Application code or ProSe Restricted code as described below. However, briefly, should the ProSe Function 40*i* receive a ProSe UE-ID, IMSI, MSISDN, ProSe Relay UE ID, ProSe Discovery UE ID, ProSe application code or ProSe Restricted code then the ProSe Function 40*i* checks either of these against a list to identify the Remote UE 20*i*. The ProSe UE-ID, IMSI, MSISDN, ProSe Relay UE ID, ProSe Discovery UE ID, ProSe application code or ProSe Restricted code is then translated or mapped to an appropriate public user identity if needed. The ProSe Function 40*i* then proceeds with requesting session shared key and GPI from the BSF.

In any of the above scenarios wherein the Remote UE 20*i* has been successfully authorized, the BSF 50*i* contacts the HSS 60*i* to fetch appropriate authentication vectors and GBA User Security Settings (GUSS) according to TS 33.223, this is also represented by step 1007 in FIG. 10. The BSF 50*i* prepares the GPI and session shared key Ks_NAF according to the GBA push procedures defined in TS 33.223 and sends the GPI and Ks_NAF to the ProSe Function 40*i*.

Upon receiving the GPI and Ks_NAF, the ProSe Function 40*i* derives the direct communication key DC_K to be provisioned to the Relay 30*i*. The ProSe Function 40*i* may further derive a lifetime for the direct communication key. The ProSe Function 40*i* calculates the direct communication key DC_K at message exchange 1011 from the session shared key Ks_NAF and the Relay 30*i* identity as follows:

DC_K=KDF(Ks_NAF, Relay ID, . . . )

As discussed above, KDF is a key derivation function having as inputs at least Ks_NAF (session shared key) and the Relay 30*i* identity. Additional inputs may be included such as the Remote UE identity, and processing of the inputs before inputting to the KDF may take place.

In message 1013, the ProSe Function sends a retrieve ProSe direct key response comprising the GPI and the direct communication key DC_K to the Relay 30*i* over the PC3 interface. The ProSe Function 40*i* may also send the lifetime of the direct communication key if generated in message exchange 1011.

The Relay 30*i* stores the direct communication key DC_K and sends a direct security mode command message to the Remote UE 20*i* over PC5, message 1014. This message comprises at least the GPI and the identity of the Relay 30*i*. In a preceding message exchange 1013*b* the Relay may also generate a session key (SK) from the direct communication key DC_K, Nonce-UE-remote and a nonce generated by the Relay 30*i* (Nonce-UE-relay) as follows;

SK=KDF(DC_K, Nonce-UE-remote, Nonce-UE-relay, . . . )

The Relay 30*i* may then further generate confidentiality key CK and integrity key IK from session key KS and store them together with the DKSI and the lifetime in message exchange 1013*b*. The confidentiality key CK and the integrity key IK may be calculated as follows;

CK=KDF(SK, . . . )

IK=KDF(SK, . . . )

In this case, the direct security mode command message 1014 may further comprise the DKSI, lifetime, security algorithms chosen from the list of security algorithms received from the Remote UE 20*i*, the list of security algorithms initially received from the Remote UE 20*i*, and Nonce-UE-remote. In the illustrated example, the message also contains a Message Authentication Code (MAC). The method 200 performed at the Relay may thus further comprise a step of generating a MAC using the integrity key. In an alternative embodiment, the MAC is generated using the direct communication key or another key derived from the direct communication key.

Having received the GPI and Relay 30*i* identity and optionally the DKSI, lifetime, security algorithms chosen by the Relay 30*i* from the list of security algorithms supported by the Remote UE 20*i*, the list of security algorithms itself, and Nonce-UE-remote, protected by the MAC, the Remote UE 20*i* derives the direct communication key DC_K in message exchange 1015. This comprises processing the GPI to obtain the session shared key Ks_NAF before then deriving the direct communication key DC_K from the session shared key Ks_NAF and the Relay 30*i* identity in a similar manner to the ProSe Function 40*i*. The Remote UE 20*i* thus calculates the direct communication key according to:

DC_K=KDF(Ks_NAF, Relay ID, . . . )

As discussed above, KDF is a key derivation function having as inputs at least Ks_NAF and Relay ID. Additional inputs may be included, and processing of the inputs before inputting to the KDF may take place.

The Remote UE 20*i* further derives session key (SK) from the direct communication, Nonce-UE-remote and Nonce-UE-relay, and confidentiality and integrity keys from session key KS, similarly to the Relay 30*i*. Again, additional inputs may be included, and processing of the inputs before inputting to the KDF may take place. The Remote UE 20*i* thus calculate the session key SK and the confidentiality key CK and integrity key IK as follows;

SK=KDF(DC_K, Nonce-UE-remote, Nonce-UE-relay, . . . )

CK=KDF(SK, . . . )

IK=KDF(SK, . . . )

In message exchange 1015, the Remote UE 20*i* checks the MAC received from the Relay 30*i* in the direct security mode command message 1014. If the MAC was generated using the integrity key IK, then the MAC may be checked by the Remote UE 20*i* using the integrity key IK which the Remote UE 20*i* has just derived. If the MAC was generated using a different key, for example the direct communication key DC_K, then that key may be used to check the MAC. If the check is successful, then the Remote UE 20*i* responds with a direct security mode complete message (or a confirmation message) to the Relay 30*i* indicating that the check was successful and protects the response message with a MAC using integrity key IK, message exchange 1016.

Although not illustrated in FIG. 10, the Relay 30*i* checks the MAC received in message 1016 using integrity key IK. If the check is successful, then the Relay 30*i* knows that the Remote UE 20*i* shares the same direct communication key DC_K as the Relay 30*i*. The Relay 30*i* can now use the direct communication key DC_K for direct communication on the PC5 interface with the Remote UE 20*i*.

As described above Nonce-UE-remote and Nonce-UE-relay are included in generation of the session key KS. The Nonce-UE-remote and Nonce-UE-relay are generated by the Remote UE 20*i* and the Relay 30*i*, respectively, and are used for mutual authentication. A nonce may for example be a sequence number, a random value or a timestamp. As the MACs described above are generated using integrity key IK based on at least the Nonce-UE-remote and Nonce-UE-relay, in practice this means that Remote UE 20*i* and the Relay 30*i* authenticate one another.

EXAMPLES ii

UE and Device in Different HPLMNs

This embodiment is similar to that wherein the UE and Device belong to the same HPLMN, however additional messages are exchanged between the DCE of the Remote E and the Relay. The DCE 40A*ii* of the Remote UE and the DCE 40B*ii* of the Relay may comprise a ProSe function, a ProSe KMS or ProSe KMF of the relevant PLMN. The DCE 40A*ii* of the Remote UE acts as a NAF. In the following examples, the DCE is a ProSe function, but it will be appreciated that this is merely for the purposes of illustration. In some examples, the DCE may comprise a ProSe Function in each of the PLMNs, each Function or server acting as a sub-Element of the Direct Communication Element. For example, a ProSe Function in the Remote UE PLMN may act as a NAF for the bootstrapping procedure, as a first sub-Element, with a ProSe Function in the device PLMN delivering messages to and from the Relay, as a second sub-Element. Each ProSe Function may also authorize the entity (Remote UE or Relay) in its own PLMN.

Figure 11:
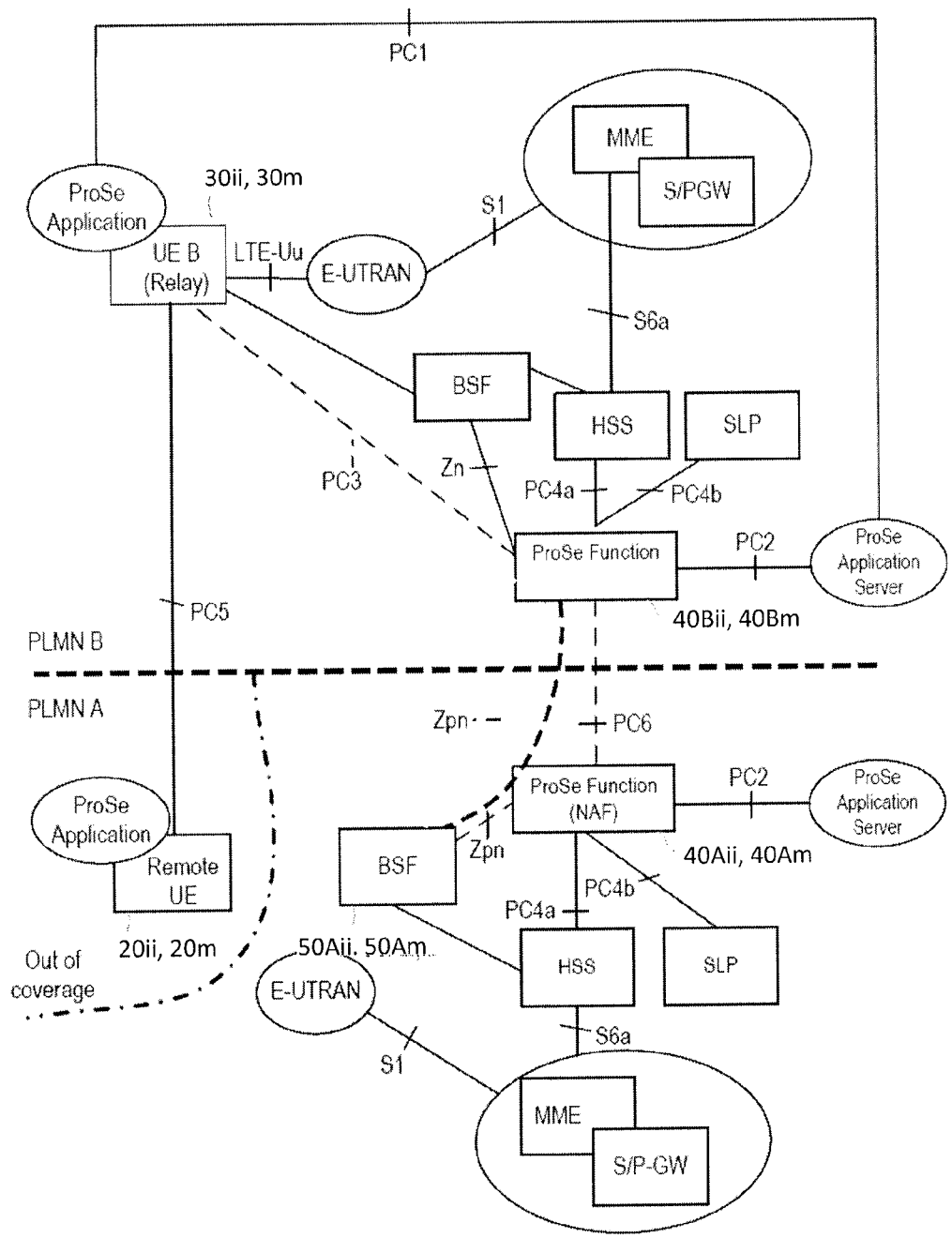
FIG. 11 is a representation of another example architecture for conducting the methods of FIGS. 5a to 6 and 14 to 16 over ProSe, wherein the UE and the device are comprised within different communication networks.

The ProSe architecture for Example ii is illustrated in FIG. 11. The PLMN of the UE 20*ii* (Remote UE) is designated as PLMN A, with BSF 50A*ii* and ProSe Function 40A*ii*, which acts as NAF 40A*ii*. The PLMN of the device 30*ii* (Relay) is designated as PLMN B. The DCE comprises two sub-Elements: the Home ProSe Function 40A*ii* of PLMN A, which acts as NAF 40A*ii*, and the Home ProSe Function 40B*ii* of PLMN B, which acts as a relay and shares the process of authorization. The BSF of PLMN B is not involved in the following examples, as the GPI and session shared key are provided by the BSF of the UE Home PLMN, BSF 50A*ii*.

This example is also similar to example i described above, with the exception that the ProSe Functions of two PLMNs are involved. The Prose Function of the UE acts as the NAF for GBA Push and the ProSe Function of the device acts as a proxy conveying messages and also contributes to the authorisation process.

Figure 12:
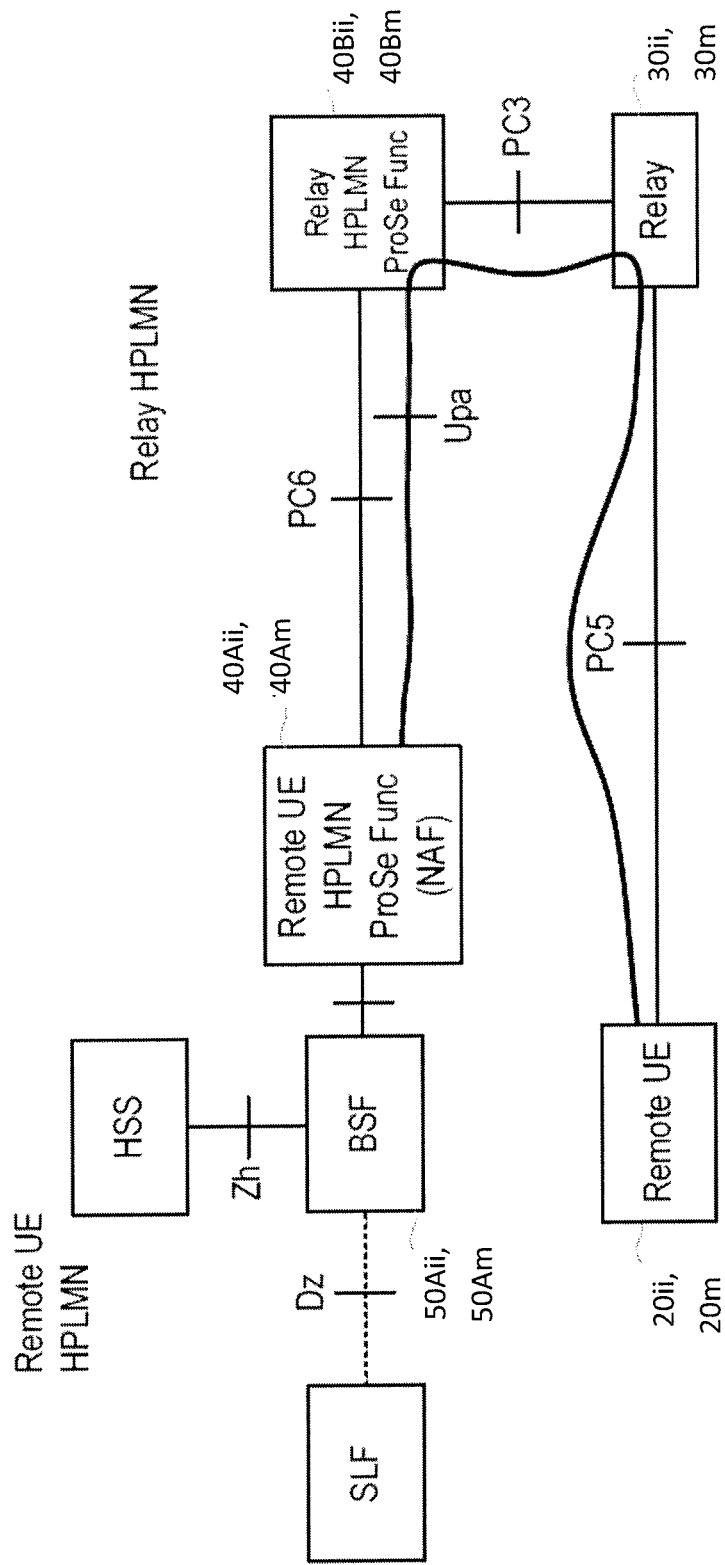
FIG. 12 is a representation of another example architecture for conducting the methods of FIGS. 5a to 6 and 14 to 16, wherein the UE and the device are comprised within different communication networks.

The GBA Push architecture for this example is illustrated in FIG. 12. According to this example, the UE, referred to as Remote UE 20*ii*, and the device, referred to as Relay 30*ii*, belong to different Home PLMNs. The Relay 30*ii* has E-UTRAN network coverage and is connected to the network. The Remote UE 20*ii* initiates GBA bootstrapping whilst in network coverage and receives a B-TID and related session shared keys from the BSF 50A*ii* belonging to the Home PLMN of the Remote UE 20*ii*. It also identifies itself with its ProSe Function acting as a NAF 40A*ii*, for example through a (unillustrated) session, where it sends the B-TID to the ProSe Function 40A*ii*. The ProSe Function 40A*ii* then stores the B-TID and its association with the remote UE 20*ii*.

In the next steps, GBA procedure is no longer available, because the Remote UE may be out of network coverage, or alternatively, GBA push may be a preferred method.

The Relay 30*ii* is using ProSe Direct Discovery procedures to allow UEs in the vicinity to discover it. The Remote UE 20*ii* discovers the Relay 30*iii* using ProSe Direct Discovery procedures on the PC5 interface, for example having moved into the cell in which the Relay 30*ii* is located. In some examples of the invention, discovery may be completed before the methods according to the present invention are carried out. In other examples, certain method steps may take place during the discovery procedure.

The Remote UE 20*ii* sends its B-TID received in the previous GBA procedure to the Relay 30*ii* and requests a direct communication key for use with the Relay 30*ii*. On receipt of this request, the Relay 30*ii* sends a request over the PC3 interface to its own ProSe Function 40B*ii*, which is a sub-Element of the DCE 40 in this example. The Relay Home ProSe Function 40B*ii* passes the request to the ProSe Function in the PLMN of the Remote UE 40A*ii*, which in the present example acts as a NAF 40A*ii* for GBA Push. The NAF 40A*ii* checks whether the B-TID matches one of its stored B-TIDs and if it is valid. If the NAF 40A*ii* finds that the B-TID is invalid but that the B-TID matches one of its stored B-TIDs from previous sessions, then the NAF 40A*ii* uses the B-TID to identify the UE 20*ii*. Having identified the remote UE 20*ii*, the NAF 40A*ii* obtains GBA Push Information (GPI) and a session shared key from the BSF 50A*ii* in the Home PLMN of the Remote UE 20*ii*. The NAF 40A*ii* then derives the required direct communication key, DC_K, from the session shared key Ks_NAF and the identity of the Relay 30*ii*. The NAF 40A*ii* then sends both the GPI and the direct communication key DC_K to the Home ProSe Function 40B*ii* of the Relay 30*ii*, which forwards the GPI and the direct communication key DC_K to the Relay 30*ii*. The Relay 30*ii* stores the direct communication key DC_K and forwards the GPI to the Remote UE 20*ii*. On receipt of the GPI, the Remote UE 20*ii* derives the session shared key Ks_NAF from the GPI and then derives the direct communication key DC_K from the session shared key Ks_NAF and the identity of the Relay 30*ii*. The direct communication key DC_K is then available in both the Remote UE 20*ii* and the Relay 30*ii*.

The above steps are described in greater detail below with reference to the messaging flow diagram in FIG. 13.

Figure 13:
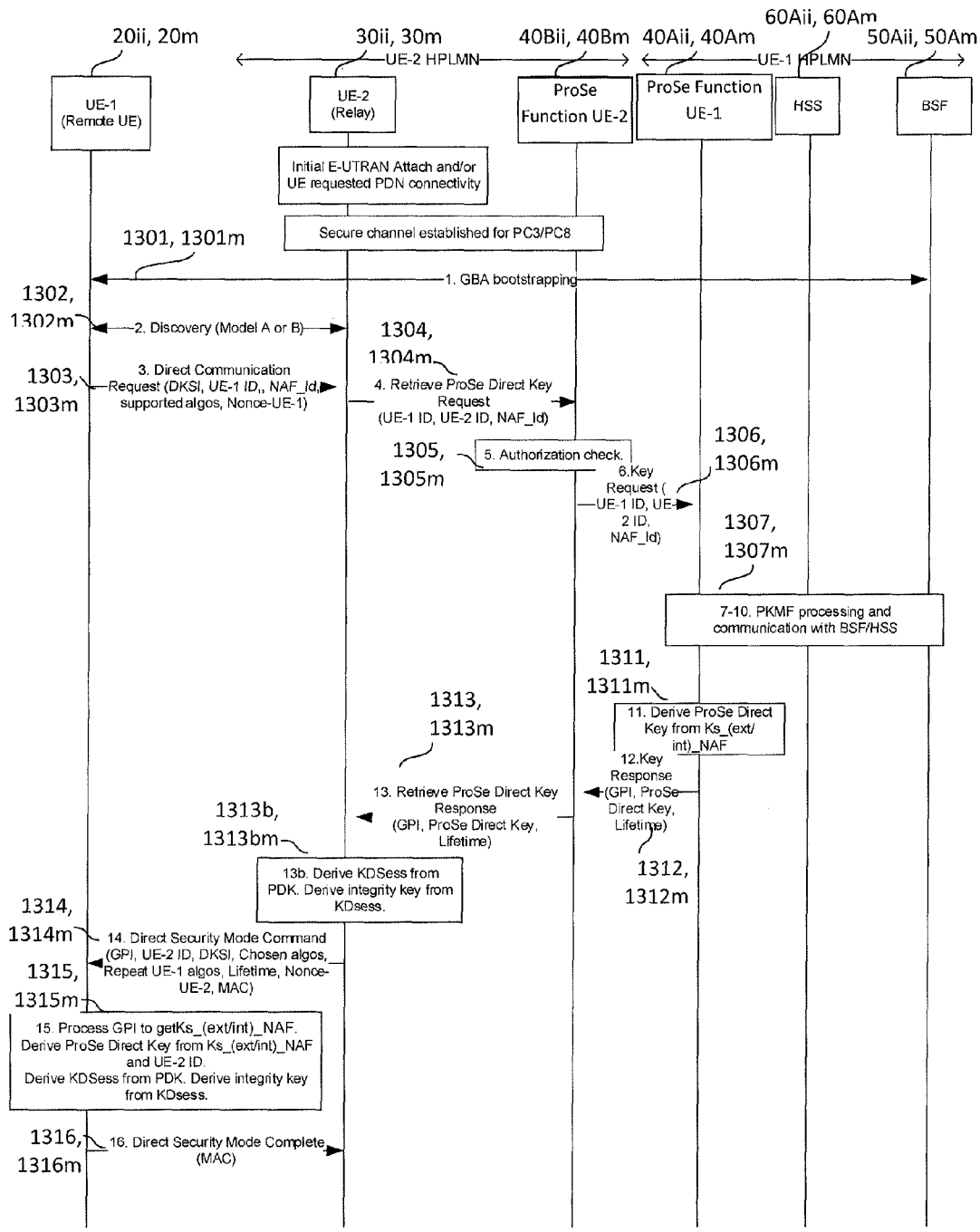
FIG. 13 is a message flow illustrating an example implementation of the methods of FIGS. 5a to 6 and 14 to 16 over ProSe.

Referring to FIG. 13, Relay 30*ii* initially connects to the E-UTRAN, which connection may take place at any time before the following method steps. The Relay 30*ii* establishes a secure channel over PC3 when the ProSe Function (DCE) acts as NAF or over PC8 when the ProSe KMF or ProSe KMS (DCE) acts as NAF. The Remote UE 20*ii* then performs GBA procedure with BSF whilst in network coverage, as represented by message exchange 1301. During the GBA procedure, the Remote UE 20*ii* obtains a shared secret comprising a transaction identifier (B-TID) and a session shared key. It also identifies itself with its ProSe Function 40A*ii*, for example through a (unillustrated) session, where it sends the B-TID to the ProSe Function 40A*ii*. The ProSe Function 40A*ii* then stores the B-TID and its association with the remote UE.

The Remote UE 20*ii* and Relay 30*ii* then discover each other through Direct Discovery procedures using Direct Discovery Model A or Direct Discovery Model B, message exchange 1302.

Discovery may be initiated by either the Remote UE 20*ii* or the Relay 30*ii*. In the illustrated example, discovery is initiated by the Relay 30*ii*. Step 1302 comprises the Relay 30*ii* issuing a discovery procedure message, which may be a Direct Discovery broadcast according to ProSe Model A or a Direct Discovery request message according to ProSe Model B. The discovery procedure message includes an identity of the Relay 30*ii*. The Remote UE 20*ii* receives the discovery procedure message and may respond, for example with discovery procedure message comprising a request message sent in response to a Direct Discovery broadcast according to ProSe Model A or a Direct Discovery response message in response to a Direct Discovery request message according to ProSe Model B. In the illustrated example, the discovery procedure is completed before the subsequent method steps. However, in alternative examples, subsequent method steps may be combined with the discovery procedure, as discussed below.

In the next steps, GBA procedure is no longer available, because the Remote UE may be out of network coverage, or alternatively, GBA push may be a preferred method.

In step 1303, the Remote UE 20*ii* sends a direct communication set up request message over PC5 to the Relay 30*ii*. The request includes the B-TID (acting as UE identifier) and a request for secure communication. The request may explicitly request generation of a key for direct communication, or an indication that secure communication is required may be contained within the Remote UE identity. In some embodiments, the request message also comprises direct key set identifier (DKSI) for identifying any keys resulting from the direct communication key, NAF-ID identifying which ProSe Function of the Remote UE 20*ii* that is acting as NAF, a list of security algorithms supported by the Remote UE 20*ii* and a nonce generated by the Remote UE 20*i* (Nonce-UE-remote) used for authentication as seen below. A nonce may for example be a sequence number, a random value or a timestamp.

In some examples of the invention (not illustrated) the direct communication set up request message 1303 may be included in a discovery procedure message such as a discovery response message as discussed above.

The Relay 30*ii* receives the request from the Remote UE 20*ii* and then, at step 1304, the Relay sends a Retrieve ProSe Direct Key request over the PC3 interface to the ProSe Function 40Bii of the Relay. The request includes the B-TID and the identity of the Relay 30*ii* and requests the ProSe Function to provide a key for direct communication between the Remote UE 20*ii* and the Relay 30*ii*.

Upon receiving the request, the ProSe Function 40Bii first checks whether or not a UE from the HPLMN associated with the NAF-ID is authorized to set up secure communication over the PC5 interface by checking a database with a list of authorized identities at message exchange 1305. This database may be local and supported by the ProSe Function 40Bii or may be implemented in a different network server. If the authorization is successful, the ProSe Function 40Bii of the Relay 30*ii* sends a ProSe key request over PC6 to ProSe Function 40Aii of Remote UE 20*ii*, message 1306. The request includes the B-TID received from the Remote UE 20*ii* and Relay identifier (Relay ID).

Upon receiving the request from the ProSe Function 40Bii of the Relay, the ProSe Function 40Aii of the Remote UE checks if the B-TID matches one of its stored B-TIDs and associated session shared keys, and if they are valid. Here, there are a few possible outcomes as represented by message exchange 1307;

If the B-TID and the session shared key are found at the ProSe Function and are valid, then the ProSe Function 40Aii checks if the Remote UE 20*ii* associated with the B-TID is authorized to set up security over PC5 with a UE belonging to a different HPLMN, HPLMN B. If authorization is successful, the ProSe Function proceeds with step 1311 as described below.

If the B-TID and associated session shared key are found, but they are invalid, (i.e. a match is found between an invalid B-TID and a stored B-TID from a previous GBA session), the ProSe Function 40*ii* proceeds with identifying the Remote UE 20*i* based on the B-TID and then checks if it authorized to set up security over PC5 with a UE belonging to a different HPLMN, HPLMN B. If authorization is successful, the process continues and the ProSe Function 40Aii sends a GPI request to the BSF 50Aii. The identity of the Remote UE 20*ii* is included in the message, as this identity will be used as the public identity to obtain the correct subscription and GPI according to the GBA push procedures defined in TS 33.223. Upon receiving the GPI and the session shared key, the ProSe Function 40Aii proceeds with step 1311 as described below.

If the ProSe Function cannot find the B-TID and associated session shared key, (i.e. a match between an invalid B-TID and a stored B-TID as not been successful), then the ProSe Function sends the B-TID to the BSF 50Aii of the same HPLMN and requests a session shared key. If the BSF 50Aii can identify the Remote UE 20*ii* based on the B-TID, then the BSF sends a session shared key and GPI to the ProSe Function 40Aii. The ProSe Function 40Aii then checks if the Remote UE 20*i* is authorized to set up security over PC5 with a UE belonging to the a different HPLMN, HPLMN B. The ProSe Function 40Aii then proceeds with step 1311. Should the BSF 50Aii not successfully identify the Remote UE 20*ii*, then it notifies the ProSe Function 40Aii which in turn sends a bootstrapping renegotiation request to the Remote UE. The Remote UE 20*ii* may in return provide a new B-TID or a new UE identifier such as a ProSe UE ID, international mobile subscriber identity (IMSI), mobile station international subscriber directory number (MSISDN), ProSe Relay UE ID, ProSe Discovery UE ID, ProSe Application code or ProSe Restricted code as described below. However, briefly, should the ProSe Function 40Aii receive a ProSe UE-ID, IMSI, MSISDN, ProSe Relay UE ID, ProSe Discovery UE ID, ProSe Application code or ProSe Restricted code then the ProSe Function 40Aii checks either of these against a list to identify the Remote UE 20*ii*. The ProSe UE-ID, IMSI, MSISDN, ProSe Relay UE ID, ProSe Discovery UE ID, ProSe Application code or ProSe Restricted code is then translated or mapped to an appropriate public user identity if needed. The ProSe Function 40Aii then proceeds with requesting session shared key and GPI from the BSF 50Aii.

In any of the above scenarios wherein the Remote UE 20*ii* has been successfully authorized, the BSF 50Aii contacts the HSS 60Aii of the same HPLMN as the Remote UE to fetch appropriate authentication vectors and GBA User Security Settings (GUSS) according to TS 33.223, this is also represented by step 1307 in FIG. 13. The BSF 50Aii prepares the GPI and session shared key Ks_NAF according to the GBA push procedures defined in TS 33.223 and sends the GPI and Ks_NAF to the ProSe Function 40Aii.

Upon receiving the GPI and Ks_NAF, the ProSe Function 40Aii derives the direct communication key DC_K to be provisioned to the Relay 30i. The ProSe Function 40Aii may further derive a lifetime for the direct communication key. The ProSe Function 40Aii calculates the direct communication key DC_K at message exchange 1311 from the session shared key Ks_NAF and the Relay 30ii identity as follows:

DC_K=KDF(Ks_NAF, Relay ID, . . . )

As discussed above, KDF is a key derivation function having as inputs at least Ks_NAF (session shared key) and the Relay 30ii identity. Additional inputs may be included such as the Remote UE identity, and processing of the inputs before inputting to the KDF may take place.

The ProSe Function 40Aii then sends the direct communication key DC_K, GPI, and the lifetime if generated, to the ProSe Function 40Bii of the Relay in a ProSe key response over PC6 interface, message 1312.

In message 1313, the ProSe Function 40Bii sends a retrieve ProSe direct key response comprising the GPI and the direct communication key DC_K to the Relay 30ii over the PC3 interface. The ProSe Function 40Bii may also send the lifetime of the direct communication key if generated in message exchange 1311.

The Relay 30ii stores the direct communication key DC_K and sends a direct security mode command message to the Remote UE 20ii over PC5, message 1314. This message comprises at least the GPI and the identity of the Relay 30ii. In a preceding message exchange 1313b the Relay may also generate a session key (SK) from the direct communication key DC_K, Nonce-UE-remote and a nonce generated by the Relay 30i (Nonce-UE-relay) as follows;

SK=KDF(DC_K, Nonce-UE-remote, Nonce-UE-relay, . . . )

The Relay 30ii may then further generate confidentiality key CK and integrity key IK from session key KS and store them together with the DKSI and lifetime in message exchange 1313b. The confidentiality key CK and the integrity key IK may be calculated as follows;

CK=KDF(SK, . . . )

IK=KDF(SK, . . . )

In this case, the direct security mode command message 1314 may further comprise the DKSI, lifetime, security algorithms chosen from the list of security algorithms received from the Remote UE 20ii, the list of security algorithms initially received from the Remote UE 20ii, and Nonce-UE-remote. In the illustrated example, the message also contains a Message Authentication Code (MAC). The method 200 performed at the Relay may thus further comprise a step of generating a MAC using the integrity key. In an alternative embodiment, the MAC is generated using the direct communication key or another key derived from the direct communication key.

Having received the GPI and Relay 30ii identity and optionally the DKSI, lifetime, security algorithms chosen from the list of security algorithms supported by the Remote UE 20ii, the list of security algorithms itself, and Nonce-UE-remote protected by the MAC, the Remote UE 20ii derives the direct communication key DC_K in message exchange 1315. This comprises processing the GPI to obtain the session shared key Ks_NAF before then deriving the direct communication key DC_K from the session shared key Ks_NAF and the Relay 30ii identity in a similar manner to the ProSe Function 40Aii. The Remote UE 20ii thus calculates the direct communication key according to:

DC_K=KDF(Ks_NAF, Relay ID, . . . )

As discussed above, KDF is a key derivation function having as inputs at least Ks_NAF and Relay ID. Additional inputs may be included, and processing of the inputs before inputting to the KDF may take place.

The Remote UE 20ii further derives session key (SK) from the direct communication, Nonce-UE-remote and Nonce-UE-relay, and confidentiality and integrity keys from session key KS, similarly to the Relay 30ii. Again, additional inputs may be included, and processing of the inputs before inputting to the KDF may take place. The Remote UE 20ii thus calculate the session key SK and the confidentiality key CK and integrity key IK as follows;

SK=KDF(DC_K, Nonce-UE-remote, Nonce-UE-relay, . . . )

CK=KDF(SK, . . . )

IK=KDF(SK, . . . )

In message exchange 1315, the Remote UE 20i checks the MAC received from the Relay 30ii in the direct security mode command message 1314. If the MAC was generated using the integrity key IK, then the MAC may be checked by the Remote UE 20ii using the integrity key IK which the Remote UE 20i has just derived. If the MAC was generated using a different key, for example the key direct communication key DC_K, then that key may be used to check the MAC. If the check is successful, then the Remote UE 20ii responds with a direct security mode complete message (or a confirmation message) to the Relay 30ii indicating that the check was successful and protects the response message with a MAC using integrity key IK, message exchange 1316.

Although not illustrated in FIG. 10, the Relay 30ii checks the MAC received in message 1316 using integrity key IK. If the check is successful, then the Relay 30ii knows that the Remote UE 20ii shares the same direct communication key DC_K as the Relay 30i. The Relay 30ii can now use the direct communication key DC_K for direct communication on the PC5 interface with the Remote UE 20ii.

As described in previous examples, Nonce-UE-remote and Nonce-UE-relay may be included in generation of the session key KS. The Nonce-UE-remote and Nonce-UE-relay are generated by the Remote UE 20i and the Relay 30i, respectively, and are used for mutual authentication. A nonce may for example be a sequence number, a random value or a timestamp. As the MACs described above are generated using integrity key IK based on at least the Nonce-UE-remote and Nonce-UE-relay, in practice this means that Remote UE 20i and the Relay 30i authenticate one another.

As described above, the ProSe Function 50Aii of the Remote UE acts as a NAF, however it should be understood that it is also in the scope of the present invention for the ProSe Function 50Bii of the Relay 30ii to act as the NAF instead of the ProSe Function 50Aii of the Remote UE.

Another aspect of the invention will now be described. Similarly to the embodiments described above, also this aspect of the present invention employ the reference GBA Push architecture, with enhanced functionality in the NAF, to establish a shared key between a UE and a device, which key may be used over a direct communication interface such as a ProSe PC5 interface. In this case, GBA Push may be used as a fall back option when the UE does not have a valid shared secret for establishing a shared key and GBA is not available for the UE to retrieve a valid shared secret from the BSF. An example of when GBA is not available may be when the UE is out of network coverage. However, this aspect as will now be described may also be employed as a preferred option over GBA procedure.

In brief, in this embodiment the UE may or may not have previously run GBA with its BSF, however regardless of whether it has, the UE uses any of its ProSe UE ID, international mobile subscriber identity (IMSI), mobile station international subscriber directory number (MSISDN), ProSe Relay UE ID, ProSe Discovery UE ID, ProSe Application code or ProSe Restricted code to initiate GBA Push. This is achieved by the UE first contacting the device and indicating its identity in the form of its ProSe UE ID, IMSI, MSISDN, ProSe Relay UE ID, ProSe Discovery UE ID, ProSe Application code or ProSe Restricted code. The device then contacts a Direct Communication Element, which may be a ProSe Function, ProSe Key Management Function (KMF) or ProSe Key Management Server (KMS), which then acts as a NAF for the purposes of GBA Push. The device indicates the ProSe UE ID, IMSI, MSISDN, ProSe Relay UE ID, ProSe Discovery UE ID, ProSe Application code or ProSe Restricted code received from the UE and its own identity to the NAF. The NAF identifies the UE based on the ProSe UE ID, IMSI, MSISDN, ProSe Relay UE ID, ProSe Discovery UE ID, ProSe Application code or ProSe Restricted code and then translates or maps it to an appropriate public user identity if needed. The NAF then contacts a BSF in the UE's home PLMN to retrieve GPI and a session shared key (NAF key which may be Ks_NAF, Ks_int_NAF or Ks_ext_NAF) corresponding to the UE identity from the BSF. The NAF then derives a Direct Communication key K_DC (ProSe Direct Key) from the NAF key and provisions both the Direct Communication key K_DC and the GPI to the device.

The device then sends the GPI and its own identity to the UE. The UE processes the GPI to obtain the session shared key (NAF specific key), which may for example be a Ks_NAF, Ks_int_NAF or Ks_ext_NAF. The UE then derives the Direct Communication key K_DC (ProSe Direct Key) in the same manner as the NAF. The Direct Communication key K_DC is then available in both the UE and the device for use on a direct communication interface such as the ProSe PC5 interface between the UE and the device.

In the above embodiment, it may be that the UE cannot run a GBA procedure and does not have a valid B-TID, and so sends either its ProSe UE ID, IMSI, MSISDN, ProSe Relay UE ID, ProSe Discovery UE ID, ProSe Application code or ProSe Restricted code to the device as a UE identifier. Alternatively, it may be that the UE has received bootstrapping renegotiation request in response to trying to establish a direct communication key but is not able to re-run the GBA procedure and so instead sends ProSe UE ID, IMSI, MSISDN, ProSe Relay UE ID, ProSe Discovery UE ID, ProSe Application code or ProSe Restricted code to identify itself.

The ProSe UE ID, ProSe Relay UE ID, ProSe Discovery UE ID, ProSe Application code and ProSe restricted code are assigned to each ProSe enabled UE by its ProSe Function, ProSe KMF or ProSe KMS. The ProSe UE ID, ProSe Relay UE ID, ProSe Discovery UE ID, ProSe Application code and ProSe restricted code are described in TS 23.303. However, they will now be briefly described.

ProSe UE ID is a link layer identifier that is used as a source Layer-2 ID in all packets a UE sends for ProSe direct communication. The ProSe UE ID is assigned by the ProSe Key Management function (including KMS and ProSe function) as defined in TS33.303. The ProSe Key Management Function ensures that the ProSe UE ID is unique in the context of one-to-many ProSe direct communication for a group. The ProSe UE ID is not necessarily globally unique and so the UE should be prepared to handle any conflict of ProSe UE IDs should it arise.

The ProSe Relay UE ID is an identifier of the relay and it is also assigned by the ProSe KMF. It is a link layer identifier that is used for direct communication and is associated with a public data network connection the ProSe UE-to Network Relay has established.

ProSe discovery UE ID (PDUID) is a temporary identifier assigned by the ProSe Function (including KMS and KMF) in the HPLMN to the UE for restricted direct discovery service. It includes the PLMN ID and a temporary identifier that uniquely identifies the UE in the HPLMN.

ProSe Application code is associated with ProSe application ID and is used in discovery procedures, and in particular open discovery. (ProSe application ID is an identity used for ProSe direct discovery, identifying application related information for the ProSe enabled UE.)

ProSe restricted code is allocated by the ProSe Function (including KMS and KMF) in the HPLMN for Restricted Direct Discovery and is associated with one or more Restricted ProSe App User IDs based on the policy of the ProSe Function that allocates it.

The ProSe UE ID, ProSe relay UE ID, ProSe discovery UE ID and ProSe application code and ProSe restricted code can also be referred herein as ProSe ID. As these identifiers are assigned by the ProSe function, they do not form part of the hardware in the UE.

IMSI is used to identify the user of a cellular network and is a unique identification associated with all cellular networks. It uniquely identifies the UE, its home wireless network, and the home country of the home wireless network. It is stored as a 64 bit field and is sent by the phone to the network.

MSISDN is a number uniquely identifying a subscription in a mobile network.

Similar to the above, the NAF involved in the provisioning of the Direct Communication key may be operated by a 3GPP operator or a third party operator, for example a National Security or Public Safety organisation having an agreement with the 3GPP operator running the BSF. The device with which the UE communicates may be another UE for one-to-one communication or may be a UE-to-Network Relay.

Figure 14:
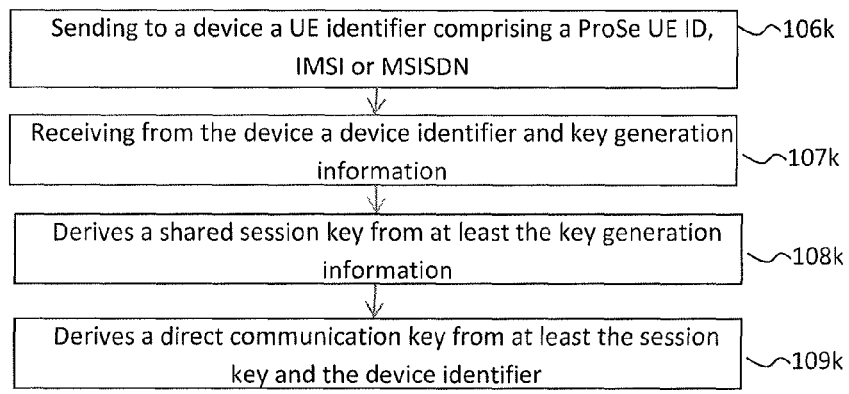
FIG. 14 is a flow chart illustrating process steps in a method performed by a UE for obtaining a key for direct communication with a device over an interface.
Figure 15:
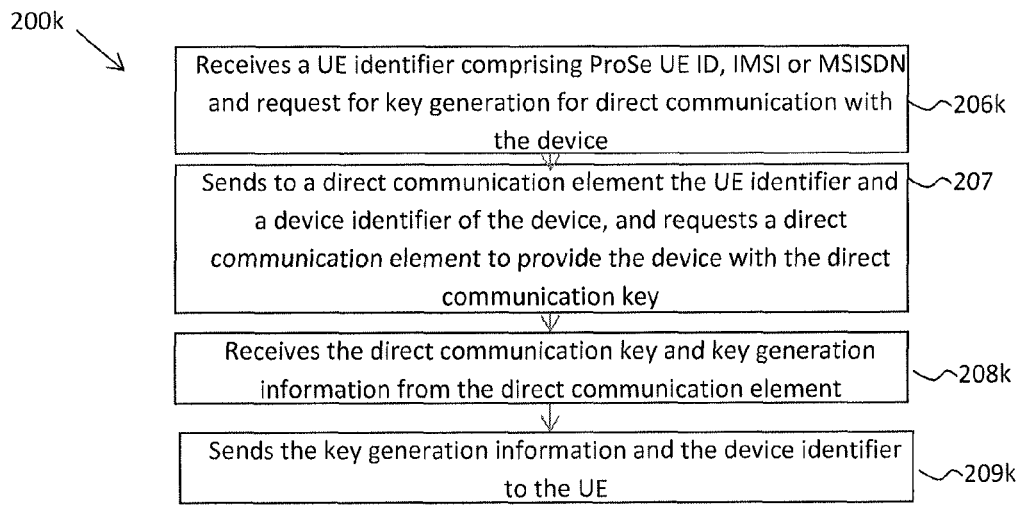
FIG. 15 is a flow chart illustrating process steps in a method performed by a device for obtaining a key for direct communication with a UE over an interface.
Figure 16:
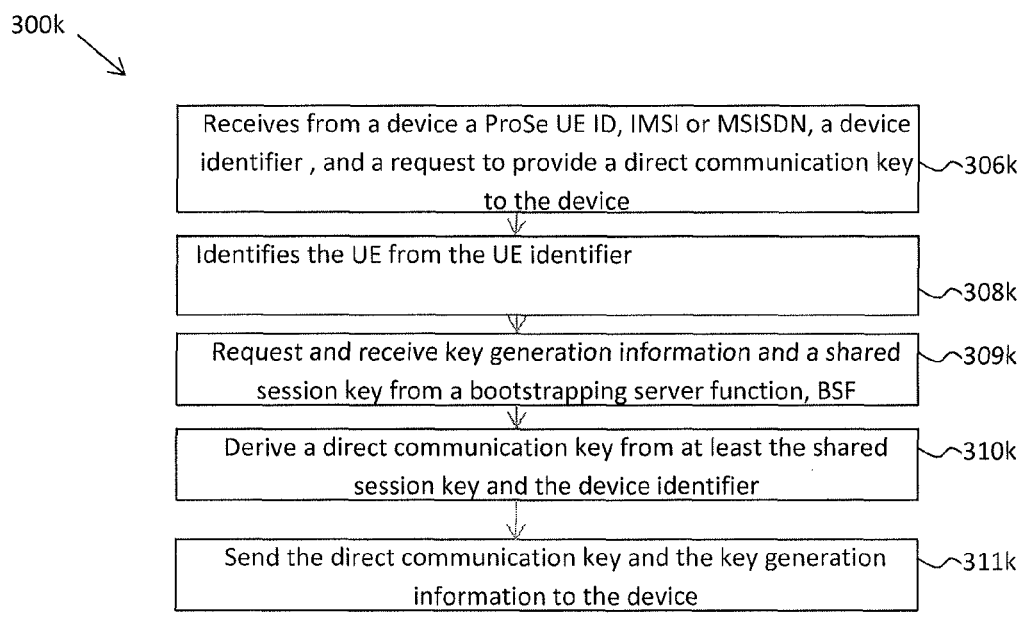
FIG. 16 is a flow chart illustrating process steps in a method performed by a Direct Communication Element for establishing a key for direct communication over an interface between a UE and a device.

FIGS. 14, 15 and 16 illustrate methods according to aspects of the present invention performed in each of the UE, the device and the Direct Communication Element. Actions at each entity are described below with reference to FIGS. 14, 15 and 16.

FIG. 14 illustrates steps in a method 100k carried out at a UE for obtaining a key for direct communication with a device, which device may be another UE or may be a UE-to-Network Relay. Referring to FIG. 14, in a first step 106k, the UE sends to a device a UE identifier comprising any of ProSe UE ID, IMSI, MSISDN, ProSe Relay UE ID, ProSe Discovery UE ID, ProSe Application code or ProSe Restricted code. In the next step, 107k, the UE receives from the device a device identifier and key generation information. The key generation information may for example be GBA Push Information, (GPI). The UE then derives a session shared key from at least the key generation information in step 108k, and derives a direct communication key K_DC from at least the session shared key and the device identifier in step 109k.

Optional steps of method 100 will now be described. The method may comprise discovering the device through a discovery procedure. At least one of the UE identifier, the device identifier or the request for key generation may be comprised within a discovery procedure message. The UE may further send to the device, a direct communication element identifier, direct key set identifier, DKSI, a list of security algorithms supported by the UE, and a nonce generated by the UE. The UE may receive a Message Authentication Code, MAC, with the device identifier and key generation information, wherein the MAC is generated using the direct communication key or a key derived from the direct communication key. The UE may also receive the DKSI, a lifetime, at least one security algorithm chosen by the device from the list of security algorithms, said list of security algorithms supported by the UE, together with the MAC, device identifier and key generation information. The UE may also send a confirmation message to the device indicating that the UE has derived the direct communication key. The UE may also check the MAC with the derived direct communication key or a key derived from the direct communication key, generate a confirmation MAC using the direct communication key or a key derived from the direct communication key; and send the confirmation MAC with the confirmation message; wherein, if the check is successful, the confirmation message further indicates that the UE has successfully checked the MAC.

The method may further comprising, as a preceding step, requesting key generation for direct communication with the device, and in response receiving from the device a Generic Bootstrapping Architecture, GBA, renegotiation request. The method may also comprise as a preceding step, sending a temporary key to the device and receiving in response a request for a new temporary key, and then sending the UE identifier instead of a new temporary key. In another preceding step, the method may comprise receiving the ProSe UE ID, ProSe Relay UE ID, ProSe Discovery UE ID, ProSe Application code or ProSe Restricted code from the Direct Communication element.

The interface may comprise a Proximity Services, ProSe, interface. The UE may not be able to initiate a Generic bootstrapping architecture, GBA, procedure. Furthermore, the UE may not comprise a valid shared secret with a Bootstrapping Server Function, BSF.

FIG. 15 illustrates steps in a method 200k performed by a device for obtaining a key for direct communication with a UE. The device may be a UE, a UE-to-network Relay, or may be network node. Referring to FIG. 15, in a first step 206k, the device receives a UE identifier comprising any of ProSe UE ID, IMSI, MSISDN, ProSe Relay UE ID, ProSe Discovery UE ID, ProSe Application code or ProSe Restricted code and request for key generation for direct communication with the device. The device then sends to a Direct Communication Element the UE identifier and an identifier of the device, and requests the Direct Communication Element to provide the device with a direct communication key in step 207k. The Direct Communication Element may for example be a ProSe Function or ProSe KMS or ProSe KMF. In step 208k, the device receives from the Direct Communication Element the direct communication key and key generation information. Finally in step 209k, the device sends the key generation information and the device identifier to the UE.

A method as claimed in claim 48, wherein the interface comprises a Proximity Services, ProSe, interface, and the Direct Communication Element comprises at least one of ProSe Function, ProSe Key Management Server, a ProSe Key Management Function.

Optional steps of method 200k will now be described. The method may further comprise discovering the UE through a discovery procedure. At least one of the UE identifier, device identifier and the request for key generation may be comprised within a discovery procedure message. The device may receiving a direct communication element identifier, a direct key set identifier, a list of security algorithms supported by the UE and a nonce generated by the UE. The device may also send to the UE the DKSI, a lifetime, at least one security algorithm chosen by the device from the list of security algorithms supported by the UE, said list of algorithms supported by the UE, and a nonce generated by the device. The method may further comprise generating a Message Authentication Code, MAC, using the direct communication key or a key derived from the direct communication key and sending the MAC to the UE with the key generation information and the device identifier. The device may also receive a confirmation message from the UE indicating that the UE has derived the direct communication key. The confirmation message may indicate that the UE has successfully checked the MAC.

FIG. 16 illustrates steps in a method 300k performed by a Direct Communication Element (DCE) for establishing a key for direct communication over an interface between a UE and a device. The DCE may be a ProSe Function or a ProSe KMS or ProSe KMF, and the device may be a UE, a UE-to-network Relay, or a Network node. Referring to FIG. 16, in a first step 306k, the DCE receives from the device a UE identifier comprising any of ProSe UE ID, IMSI, MSISDN, ProSe Relay UE ID, ProSe Discovery UE ID, ProSe Application code or ProSe Restricted code, an identifier of the device and a request to provide a direct communication key to the device. In step 308k, the DCE identifies the UE from the UE identifier. The DCE then fetches key generation information and a session shared key from a bootstrapping server function, BSF, step 309k. In the next step, 310k, the DCE derives a direct communication key from at least the session shared key and the device identifier. Then in a final step, 311k, the DCE sends the direct communication key and the key generation information to the device.

Optional features of method 300k will now be described. The method may further comprise mapping the identified UE to a public UE identifier and sending the public UE identifier to the BSF. The method may also further comprise checking that at least one of the device or the UE is authorised to establish direct communication. The method may as a preceding step, comprise generating a ProSe UE ID, ProSe Relay UE ID, ProSe Discovery UE ID, ProSe Application code or ProSe Restricted code and providing it to the UE.

The interface may comprise a Proximity Services, ProSe, interface, and the Direct Communication Element comprises at least one of a ProSe Function, a ProSe Key Management Function or a ProSe Key Management Server.

In any of methods 100k, 200k and 300k the device comprises at least one of a UE or a UE-to-Network Relay. The key generation information may comprise Generic Bootstrapping Architecture Push Information, GPI.

The step of deriving the direct communication key, performed in the UE according to method 100k and in the DCE according to method 300k, may be achieved in a range of different ways. In some examples, the direct communication key may be derived using a Key Derivation Function (KDF), which may be any standard function such as the KDF defined in 3GPP TS 33.220. Additional parameters to the session shared key and the device ID mentioned above may be input to the KDF. Example additional input parameters include B-TID, NAF-ID, KMS-ID, ProSe UE-ID, CK∥IK and other inputs. The order of the input parameters may also be varied. The selection of additional parameters and the variation in their order may in some examples result in a more secure generation function. In addition, the input parameters may be transformed, hashed or otherwise processed before they are input to the KDF to derive the direct communication key. For example, a Ks_NAF could be transformed by first being run through another (or the same) key derivation function and the result input to the KDF, or another character sting could be used as input. In the following description, references to the derivation of a direct communication key include the above disclosed options for additional inputs and KDFs.

The above described methods 100k, 200k, 300k may be performed by elements cooperating to form a system for securing direct communication between a UE and a device over an interface. Such a system can also be illustrated in FIG. 7 and comprises a UE 20k, a device 30k and a Direct Communication Element (DCE) 40k. The UE comprises means for sending a UE identifier comprising a ProSe UE ID, international mobile subscriber identity, IMSI, or mobile station international subscriber directory number, MSISDN to the direct communication element via the device. The direct communication element comprises means for identifying the UE using the UE identifier, obtaining a session shared key and Generic Bootstrapping Architecture Push Information, GPI, deriving a direct communication key from at least the session shared key, and sending the direct communication key and the GPI to the device. The device comprises means for sending the GPI to the UE and the UE comprises means for deriving the session shared key from at least the GPI and to derive the direct communication key from the session shared key.

The following discussion illustrates further examples of the invention with reference to ProSe communication as supported by a 3GPP network. However it will be appreciated that the invention is equally applicable to other direct communication technologies.

As previously discussed, aspects of the invention are particularly suited to establishing a shared key for use by a UE and a device over the PC5 interface. This is achieved using ProSe UE ID, IMSI, MSISDN, ProSe Relay UE ID, ProSe Discovery UE ID, ProSe Application code or ProSe Restricted code as a UE identifier and this may be employed when GBA is not available, for example when the UE is out of network coverage. However it should be understood that the UE may not be limited to a remote UE that is out of network coverage that wishes to secure one-to-one communication with another UE, or secure E-UTRAN access via a device acting as a UE-to-Network Relay. The present invention may also be applied to establish a shared key for use by a UE which is within network coverage, but where GBA procedure is not available for some other reason or GBA Push is preferred over GBA.

As also discussed above, the device, at which the method 200k is performed, may be a UE, a UE-to-network Relay, or may be a network node. Furthermore, any reference herein to remote UE which is out of network coverage may use direct communication protocols to communicate not only with a dedicated UE-to-Network Relay but also with a direct communication enabled UE which may act as a UE-to-Network Relay. It will therefore be appreciated that while a device in the form of a UE-to-Network Relay is discussed in the following examples for the purposes of illustration, aspects of the invention are applicable to use for key establishment between a UE and other forms of device, for example a device in the form of a second UE. In either case it is assumed that both the UE and the device have a UICC and are enabled for ProSe.

Regardless of the nature of the device, it is possible that the UE and device may belong to the same Home PLMN or may belong to different Home PLMNs. Example applications of methods according to the present invention are described below for both these scenarios. The following example applications illustrate different ways in which the steps of the methods 100k, 200k, 300k described above may be implemented to achieve the above discussed functionality.

EXAMPLE iii

UE and Device in Same HPLMN

The GBA Push and ProSe architecture for this example are illustrated in FIGS. 8 and 9 as discussed above. According to this example, the UE, referred to as Remote UE 20k, and the device, referred to as Relay 30k, both belong to the same Home PLMN (HPLMN). This example describes the device as a ProSe UE-to-Network Relay however the example is also applicable to one-to-one communication. Furthermore, in the following examples, the DCE is a ProSe function acting as a NAF, but it will be appreciated that this is merely for the purposes of illustration. The DCE may alternatively be a ProSe KMS or a ProSe KMF.

The Relay 30k has E-UTRAN network coverage and is connected to the network. The Relay 30k uses ProSe Direct Discovery procedures to allow UEs in the vicinity to discover it. The Remote UE 20k discovers the Relay 30k using ProSe Direct Discovery procedures on the PC5 interface, for example having moved into the cell in which the Relay 30k is located. In some examples of the invention, discovery may be completed before the methods according to the present invention are carried out. In other examples, certain method steps may take place during the discovery procedure.

Although not illustrated in FIGS. 8 and 9, the Remote UE 20k may have received a bootstrapping renegotiation request in response to an outbound direct communication set up request, and it is unable to run a GBA procedure to obtain a new shared secret and so proceeds with the following steps below. Alternatively, the Remote UE 20k proceeds with the steps below regardless of whether it has received a bootstrapping renegotiation request.

The Remote UE 20k sends a UE identifier comprising any of ProSe UE ID, IMSI, MSISDN, ProSe Relay UE ID, ProSe Discovery UE ID, ProSe Application code or ProSe Restricted code to the Relay 30k and requests a direct communication key for use with the Relay 30k. On receipt of this request, the Relay 30k sends a request over the PC3 interface to its ProSe Function 40k, which in the present example is the ProSe Function in the Home PLMN of both the Remote UE 20k and the Relay 30k. The ProSe Function acts as a NAF 40k for GBA Push. The ProSe Function 40k identifies the UE from the UE identifier which may be any of ProSe UE ID, IMSI, MSISDN, ProSe Relay UE ID, ProSe Discovery UE ID, ProSe Application code or ProSe Restricted code. Having identified the remote UE 20k, the ProSe Function 40k obtains GBA Push Information (GPI) and a session shared key from the BSF 50k in the Home PLMN. The session shared key is referred to in the present and following examples as a Ks_NAF for the purposes of illustration. However it will be appreciated that the session shared key may also or alternatively comprise other NAF specific keys such as Ks_int_NAF and Ks_ext_NAF. The ProSe Function 40k then derives the required direct communication key, DC_K, from the session shared key Ks_NAF and the identity of the Relay 30k. The ProSe Function 40k then sends both the GPI and the direct communication key DC_K to the Relay 30k. The Relay 30k stores the direct communication key DC_K and forwards the GPI to the Remote UE 20k. On receipt of the GPI, the Remote UE 20k derives the session shared key Ks_NAF from the GPI and then derives the direct communication key DC_K from the session shared key Ks_NAF and the identity of the Relay 30k. The direct communication key DC_K is then available in both the Remote UE 20k and the Relay 30k.

The above steps are described in greater detail below with reference to the messaging flow diagram in FIG. 10.

Referring to FIG. 10, Relay 30k initially connects to the E-UTRAN, which connection may take place at any time before the following method steps. The Relay 30k establishes a secure channel over PC3 when the ProSe Function (DCE) acts as NAF or over PC8 when the ProSe KMF or ProSe KMS (DCE) acts as NAF. The Remote UE 20k may or may not then perform GBA procedure with the BSF whilst in network coverage, step 1001k. The Remote UE 20k and Relay 30k then discover each other through Direct Discovery procedures using Direct Discovery Model A or Direct Discovery Model B, step 1002k.

Discovery may be initiated by either the Remote UE 20k or the Relay 30k. In the illustrated example, discovery is initiated by the Relay 30k. Step 1002k comprises the Relay 30k issuing a discovery procedure message, which may be a Direct Discovery broadcast according to ProSe Model A or a Direct Discovery request message according to ProSe Model B. The discovery procedure message includes an identity of the Relay 30k. The Remote UE 20k receives the discovery procedure message and may respond, for example with a discovery procedure message comprising a request message sent in response to a Direct Discovery broadcast according to ProSe Model A or a Direct Discovery response message in response to a Direct Discovery request message according to ProSe Model B. In the illustrated example, the discovery procedure is completed before the subsequent method steps. However, in alternative examples, subsequent method steps may be combined with the discovery procedure, as discussed below.

Although not illustrated in FIG. 10, the Remote UE 20k may have received a bootstrapping renegotiation request 1001k in response to an outbound direct communication set up request, and it is unable to run a GBA procedure to obtain a new shared secret and so proceeds with the following steps below. Alternatively, the Remote UE 20k proceeds with the steps below regardless of whether it has received a bootstrapping renegotiation request.

In message 1003k, the Remote UE 20k sends a direct communication set up request message over PC5 to the Relay 30k. The request includes the UE identifier comprising any of ProSe UE ID, IMSI, MSISDN, ProSe Relay UE ID, ProSe Discovery UE ID, ProSe Application code or ProSe Restricted code and a request for secure communication. The request may explicitly request generation of a key for direct communication, or an indication that secure communication is required may be contained within the Remote UE identity. In some embodiments, the request message also comprises direct key set identifier (DKSI) for identifying any keys resulting from the direct communication key, NAF-ID identifying which ProSe Function of the Remote UE 20k that is acting as NAF, a list of security algorithms supported by the Remote UE 20k and a nonce generated by the Remote UE 20k (Nonce-UE-remote) used for authentication as seen below. A nonce may for example be a sequence number, a random value or a timestamp.

In some examples of the invention (not illustrated) the direct communication set up request message 1003k may be included in a discovery procedure message such as a discovery response message as discussed above.

The Relay 30k receives the request from the Remote UE 20k and then, at step 1004k, the Relay sends a Retrieve ProSe Direct Key request over the PC3 or PC8 interface to the ProSe Function 40k acting as a NAF. In the present example, both the Remote UE 20k and the Relay 30k are in the same PLMN and so the ProSe Function is the Home ProSe Function for the Relay 30k. The request to the ProSe Function includes at least the UE identifier comprising any of ProSe UE ID, IMSI, MSISDN, ProSe Relay UE ID, ProSe Discovery UE ID, ProSe Application code or ProSe Restricted code and the identity of the Relay 30k and requests to provide a key for direct communication between the Remote UE 20k and the Relay 30k.

Upon receiving the request, the ProSe function 40k checks whether or not a UE associated with the NAF-ID is authorized to set up secure communication over the PC5 interface by checking a database with a list of authorized identities at message exchange 1005k. This database may be local and supported by the DCE 40i or may be implemented in a different network server. If the authorization is successful, the ProSe Function 40k identifies the Remote UE 20k based on any of ProSe UE ID, IMSI, MSISDN, ProSe Relay UE ID, ProSe Discovery UE ID, ProSe Application code or ProSe Restricted code, step 1007k. If the UE is identified, the ProSe Function 40k translates or maps the ProSe UE ID, IMSI, MSISDN, ProSe Relay UE ID, ProSe Discovery UE ID, ProSe Application code or ProSe Restricted code to an appropriate public user identity if needed.

Identifying the UE in step 1007k may comprise the following steps; if the ProSe UE ID is used as a UE identifier, then the ProSE UE ID is also previously stored in the ProSe Function 40k such that the ProSe function 40k can match the received ProSe UE ID with one of its stored ProSe UE IDs. If the IMSI or MSISDN is used as a UE identifier, the ProSe Function may check one of its stored lists for a match or alternatively it may contact another server such as the HSS 60k to identify the UE.

Once the Remote UE 20k is identified, the ProSe Function 40k also checks if the Remote UE 20k is authorized to set-up security over PC5 with a UE belonging to the same HPLMN as the Relay 30k.

When the Remote UE 20k has been successfully authorized, the BSF 50k contacts the HSS 60k to fetch appropriate authentication vectors and GBA User Security Settings (GUSS) according to TS 33.223, this is also represented by step 1007k in FIG. 10. The BSF 50k prepares the GPI and session shared key Ks_NAF according to the GBA push procedures defined in TS 33.223 and sends the GPI and Ks_NAF to the ProSe Function 40k.

Upon receiving the GPI and Ks_NAF, the ProSe Function 40k derives the direct communication key DC_K to be provisioned to the Relay 30k. The ProSe Function 40k may further derive a lifetime for the direct communication key. The ProSe Function 40k calculates the direct communication key DC_K at message exchange 1011k from the session shared key Ks_NAF and the Relay 30k identity as follows:

DC_K=KDF(Ks_NAF, Relay ID, . . . )

As discussed above, KDF is a key derivation function having as inputs at least Ks_NAF (session shared key) and the Relay 30k identity. Additional inputs may be included such as the Remote UE identity, and processing of the inputs before inputting to the KDF may take place.

In message 1013k, the ProSe Function sends a retrieve ProSe direct key response comprising the GPI and the direct communication key DC_K to the Relay 30k over the PC3 interface. The ProSe Function 40k may also send the lifetime of the direct communication key if generated in message exchange 1011k.

The Relay 30k stores the direct communication key DC_K and sends a direct security mode command message to the Remote UE 20k over PC5, message 1014k. This message comprises at least the GPI and the identity of the Relay 30k. In a preceding message exchange 1013bk the Relay may also generate a session key (SK) from the direct communication key DC_K, Nonce-UE-remote and a nonce generated by the Relay 30k (Nonce-UE-relay) as follows;

SK=KDF(DC_K, Nonce-UE-remote, Nonce-UE-relay, ... )

The Relay 30k may then further generate confidentiality key CK and integrity key IK from session key KS and store them together with the DKSI and the lifetime in message exchange 1013bk. The confidentiality key CK and the integrity key IK may be calculated as follows;

CK=KDF(SK, ... )
IK=KDF(SK, ... )

In this case, the direct security mode command message 1014k may further comprise the DKSI, lifetime, security algorithms chosen from the list of security algorithms received from the Remote UE 20k, the list of security algorithms initially received from the Remote UE 20k, and Nonce-UE-remote. In the illustrated example, the message also contains a Message Authentication Code (MAC). The method 200k performed at the Relay may thus further comprise a step of generating a MAC using the integrity key. In an alternative embodiment, the MAC is generated using the direct communication key or another key derived from the direct communication key.

Having received the GPI and Relay 30k identity and optionally the DKSI, lifetime, security algorithms chosen by the Relay 30k from the list of security algorithms supported by the Remote UE 20k, the list of security algorithms itself, and Nonce-UE-remote protected by the MAC, the Remote UE 20k derives the direct communication key DC_K in message exchange 1015k. This comprises processing the GPI to obtain the session shared key Ks_NAF before then deriving the direct communication key DC_K from the session shared key Ks_NAF and the Relay 30k identity in a similar manner to the ProSe Function 40k. The Remote UE 20k thus calculates the direct communication key according to:

DC_K=KDF(Ks_NAF, Relay ID, ... )

As discussed above, KDF is a key derivation function having as inputs at least Ks_NAF and Relay ID. Additional inputs may be included, and processing of the inputs before inputting to the KDF may take place.

The Remote UE 20k further derives session key (SK) from the direct communication, Nonce-UE-remote and Nonce-UE-relay, and confidentiality and integrity keys from session key KS, similarly to the Relay 30k. Again, additional inputs may be included, and processing of the inputs before inputting to the KDF may take place. The Remote UE 20k thus calculate the session key SK and the confidentiality key CK and integrity key IK as follows;

SK=KDF(DC_K, Nonce-UE-remote, Nonce-UE-relay, ... )
CK=KDF(SK, ... )
IK=KDF(SK, ... )

In message exchange 1015k, the Remote UE 20k checks the MAC received from the Relay 30k in the direct security mode command message 1014k. If the MAC was generated using the integrity key IK, then the MAC may be checked by the Remote UE 20k using the integrity key IK which the Remote UE 20k has just derived. If the MAC was generated using a different key, for example the key direct communication key DC_K, then that key may be used to check the MAC. If the check is successful, then the Remote UE 20k responds with a direct security mode complete message (or a confirmation message) to the Relay 30k indicating that the check was successful and protects the response message with a MAC using integrity key IK, message exchange 1016k.

Although not illustrated in FIG. 10, the Relay 30k checks the MAC received in message 1016k using integrity key IK. If the check is successful, then the Relay 30k knows that the Remote UE 20k shares the same direct communication key DC_K as the Relay 30k. The Relay 30k can now use the direct communication key DC_K for direct communication on the PC5 interface with the Remote UE 20k.

As described above Nonce-UE-remote and Nonce-UE-relay are included in generation of the session key KS. The Nonce-UE-remote and Nonce-UE-relay are generated by the Remote UE 20k and the Relay 30k, respectively, and are used for mutual authentication. A nonce may for example be a sequence number, a random value or a timestamp. As the MACs described above are generated using integrity key IK based on at least the Nonce-UE-remote and Nonce-UE-relay, in practice this means that Remote UE 20k and the Relay 30k authenticate one another.

EXAMPLES iv

UE and Device in Different HPLMNs

This embodiment is similar to that wherein the UE and Device belong to the same HPLMN, however additional messages are exchanged between the DCE of the Remote E and the Relay. The DCE 40Am of the Remote UE and the DCE 40Bm of the Relay may comprise a ProSe function, a ProSe KMS or ProSe KMF of the relevant PLMN. The DCE 40Am of the Remote UE acts as a NAF. In the following examples, the DCE is a ProSe function, but it will be appreciated that this is merely for the purposes of illustration. In some examples, the DCE may comprise a ProSe Function in each of the PLMNs, each Function or server acting as a sub-Element of the Direct Communication Element. For example, a ProSe Function in the Remote UE PLMN may act as a NAF for the bootstrapping procedure, as a first sub-Element, with a ProSe Function in the device PLMN delivering messages to and from the Relay, as a second sub-Element. Each ProSe Function may also authorize the entity (Remote UE or Relay) in its own PLMN.

The ProSe architecture for Example iv is also illustrated in FIG. 11. The PLMN of the UE 20m (Remote UE) is designated as PLMN A, with BSF 50Am and ProSe Function 40Am, which acts as NAF 40Am. The PLMN of the device 30m (Relay) is designated as PLMN B. The DCE comprises two sub-Elements: the Home ProSe Function 40Am of PLMN A, which acts as NAF 40Am, and the Home ProSe Function 40Bm of PLMN B, which acts as a relay and shares the process of authorisation. The BSF of PLMN B is not involved in the following examples, as the GPI and session shared key are provided by the BSF of the UE Home PLMN, BSF 50Am.

This example is also similar to example iii described above, with the exception that the ProSe Functions of two PLMNs are involved. The Prose Function of the UE acts as the NAF for GBA Push and the ProSe Function of the device acts as a proxy conveying messages and also contributes to the authorisation process.

The GBA Push architecture for this example is also illustrated in FIG. 12. According to this example, the UE, referred to as Remote UE 20m, and the device, referred to as Relay 30m, belong to different Home PLMNs. The Relay 30m has E-UTRAN network coverage and is connected to the network.

The Relay 30m is using ProSe Direct Discovery procedures to allow UEs in the vicinity to discover it. The Remote UE 20m discovers the Relay 30m using ProSe Direct Discovery procedures on the PC5 interface, for example having moved into the cell in which the Relay 30m is located. In some examples of the invention, discovery may be completed before the methods according to the present invention are carried out. In other examples, certain method steps may take place during the discovery procedure.

Although not illustrated in FIG. 12, the Remote UE 20m may have received a bootstrapping renegotiation request in response to an outbound direct communication set up request, and it is unable to run a GBA procedure to obtain a new shared secret and so proceeds with the following steps below. Alternatively, the Remote UE 20k proceeds with the steps below regardless of whether it has received a bootstrapping renegotiation request.

The Remote UE 20m sends a UE identifier comprising any of ProSe UE ID, IMSI, MSISDN, ProSe Relay UE ID, ProSe Discovery UE ID, ProSe Application code or ProSe Restricted code to the Relay 30m and requests a direct communication key for use with the Relay 30m. On receipt of this request, the Relay 30m sends a request over the PC3 interface to its own ProSe Function 40Bm, which is a sub-Element of the DCE 40 in this example. The Relay Home ProSe Function 40Bm passes the request to the ProSe Function in the PLMN of the Remote UE 40Am, which in the present example acts as a NAF 40Am for GBA Push. The ProSe Function 40Am identifies the UE from the UE identifier which may be any of ProSe UE ID, IMSI, MSISDN, ProSe Relay UE ID, ProSe Discovery UE ID, ProSe Application code or ProSe Restricted code. Having identified the remote UE 20m, the NAF 40Am obtains GBA Push Information (GPI) and a session shared key from the BSF 50Am in the Home PLMN of the Remote UE 20m. The NAF 40Am then derives the required direct communication key, DC_K, from the session shared key Ks_NAF and the identity of the Relay 30m. The NAF 40Am then sends both the GPI and the direct communication key DC_K to the Home ProSe Function 40Bm of the Relay 30m, which forwards the GPI and the direct communication key DC_K to the Relay 30m. The Relay 30m stores the direct communication key DC_K and forwards the GPI to the Remote UE 20m. On receipt of the GPI, the Remote UE 20m derives the session shared key Ks_NAF from the GPI and then derives the direct communication key DC_K from the session shared key Ks_NAF and the identity of the Relay 30m. The direct communication key DC_K is then available in both the Remote UE 20m and the Relay 30m.

The above steps are described in greater detail below with reference to the messaging flow diagram in FIG. 13.

Referring to FIG. 13, Relay 30m initially connects to the E-UTRAN, which connection may take place at any time before the following method steps. The Relay 30m establishes a secure channel over PC3 when the ProSe Function (DCE) acts as NAF or over PC8 when the ProSe KMF or ProSe KMS (DCE) acts as NAF. The Remote UE 20m may or may not then perform GBA procedure with BSF whilst in network coverage, message exchange 1301m.

The Remote UE 20m and Relay 30m then discover each other through Direct Discovery procedures using Direct Discovery Model A or Direct Discovery Model B, message exchange 1302m.

Discovery may be initiated by either the Remote UE 20m or the Relay 30m. In the illustrated example, discovery is initiated by the Relay 30m. Step 1302m comprises the Relay 30m issuing a discovery procedure message, which may be a Direct Discovery broadcast according to ProSe Model A or a Direct Discovery request message according to ProSe Model B. The discovery procedure message includes an identity of the Relay 30m. The Remote UE 20m receives the discovery procedure message and may respond, for example with a discovery procedure message comprising a request message sent in response to a Direct Discovery broadcast according to ProSe Model A or a Direct Discovery response message sent in response to a Direct Discovery request message according to ProSe Model B. In the illustrated example, the discovery procedure is completed before the subsequent method steps. However, in alternative examples, subsequent method steps may be combined with the discovery procedure, as discussed below.

Although not illustrated in FIG. 13, the Remote UE 20m may have received a bootstrapping renegotiation request in response to an outbound direct communication set up request, and it is unable to run a GBA procedure to obtain a new shared secret and so proceeds with the following steps below. Alternatively, the Remote UE 20m proceeds with the steps below regardless of whether it has received a bootstrapping renegotiation request.

In step 1303m, the Remote UE 20m sends a direct communication set up request message over PC5 to the Relay 30m. The request includes a UE identifier comprising any one of ProSe UE ID, IMSI, MSISDN, ProSe Relay UE ID, ProSe Discovery UE ID, ProSe Application code or ProSe Restricted code and a request for secure communication. The request may explicitly request generation of a key for direct communication, or an indication that secure communication is required may be contained within the Remote UE identity. In some embodiments, the request message also comprises direct key set identifier (DKSI) for identifying any keys resulting from the direct communication key, NAF-ID identifying which ProSe Function of the Remote UE 20m that is acting as NAF, a list of security algorithms supported by the Remote UE 20m and a nonce generated by the Remote UE 20m (Nonce-UE-remote) used for authentication as seen below. A nonce may for example be a sequence number, a random value or a timestamp.

In some examples of the invention (not illustrated) the direct communication set up request message 1303m may be included in a discovery response message as discussed above.

The Relay 30m receives the request from the Remote UE 20m and then, at step 1304m, the Relay sends a Retrieve ProSe Direct Key request over the PC3 interface to the ProSe Function 40Bm of the Relay. The request includes the UE identifier and the identity of the Relay 30m and requests the ProSe Function to provide a key for direct communication between the Remote UE 20m and the Relay 30m.

Upon receiving the request, the ProSe Function 40Bm first checks whether or not a UE associated with the NAF-ID is authorized to set up secure communication over the PC5 interface by checking a database with a list of authorized identities at message exchange 1305m. This database may be local and supported by the ProSe Function 40Bii or may be implemented in a different network server. If the authorization is successful, the ProSe Function 40Bm of the Relay 30m sends a ProSe key request over PC6 to ProSe Function 40Am of Remote UE 20m, message 1306m. The request includes the UE identifier received from the Remote UE 20m and Relay identifier (Relay ID).

Upon receiving the request from the ProSe Function 40Bm of the Relay, the ProSe Function 40m identifies the Remote UE 20m based on any of ProSe UE ID, IMSI, MSISDN, ProSe Relay UE ID, ProSe Discovery UE ID, ProSe Application code or ProSe Restricted code, step 1007m. If the UE is identified, the ProSe Function 40m translates or maps the ProSe UE ID, IMSI, MSISDN, ProSe Relay UE ID, ProSe Discovery UE ID, ProSe Application code or ProSe Restricted code to an appropriate public user identity if needed.

Identifying the UE in step 1007m may comprise the following steps; if the ProSe UE ID is used as a UE identifier, then the ProSE UE ID is also previously stored in the ProSe Function 40Am such that the ProSe function 40Am can match the received ProSe UE ID with one of its stored ProSe UE IDs. If the IMSI or MSISDN is used as a UE identifier, the ProSe Function may check one of its stored lists for a match or alternatively it may contact another server such as the HSS 60m to identify the UE.

Once the Remote UE 20m is identified, the ProSe Function 40Am of the Remote UE also checks if the Remote UE 20m is authorized to set-up security over PC5 with a UE belonging to the same HPLMN as the Relay 30m.

When the Remote UE 20m has been successfully authorized, the BSF 50Am contacts the HSS 60Am of the same HPLMN as the Remote UE to fetch appropriate authentication vectors and GBA User Security Settings (GUSS) according to TS 33.223, this is also represented by step 1307m in FIG. 13. The BSF 50Am prepares the GPI and session shared key Ks_NAF according to the GBA push procedures defined in TS 33.223 and sends the GPI and Ks_NAF to the ProSe Function 40Am.

Upon receiving the GPI and Ks_NAF, the ProSe Function 40Am derives the direct communication key DC_K to be provisioned to the Relay 30m. The ProSe Function 40Am may further derive a lifetime for the direct communication key. The ProSe Function 40Am calculates the direct communication key DC_K at message exchange 1311m from the session shared key Ks_NAF and the Relay 30m identity as follows:

$DC\_K=KDF(Ks\_NAF, Relay\ ID, \ldots)$

As discussed above, KDF is a key derivation function having as inputs at least Ks_NAF (session shared key) and the Relay 30m identity. Additional inputs may be included such as the Remote UE identity, and processing of the inputs before inputting to the KDF may take place.

The ProSe Function 40Am then sends the direct communication key DC_K, GPI, and the lifetime if generated, to the ProSe Function 40Bm of the Relay in a ProSe key response over PC6 interface, message 1312m.

In message 1313m, the ProSe Function 40B sends a retrieve ProSe direct key response comprising the GPI and the direct communication key DC_K to the Relay 30m over the PC3 interface. The ProSe Function 40Bm may also send the lifetime of the direct communication key if generated in message exchange 1311m.

The Relay 30m stores the direct communication key DC_K and sends a direct security mode command message to the Remote UE 20m over PC5, message 1314m. This message comprises at least the GPI and the identity of the Relay 30m. In a preceding message exchange 1313bm the Relay may also generate a session key (SK) from the direct communication key DC_K, Nonce-UE-remote and a nonce generated by the Relay 30m (Nonce-UE-relay) as follows;

$SK=KDF(DC\_K,\ Nonce\text{-}UE\text{-}remote,\ Nonce\text{-}UE\text{-}relay,\ \ldots)$ The Relay 30m may then further generate confidentiality key CK and integrity key IK from session key KS and store them together with the DKSI and lifetime in message exchange 1313bm. The confidentiality key CK and the integrity key IK may be calculated as follows;

$CK=KDF(SK,\ \ldots)$ $IK=KDF(SK,\ \ldots)$

In this case, the direct security mode command message 1314m may further comprise the DKSI, lifetime, security algorithms chosen from the list of security algorithms received from the Remote UE 20m, the list of security algorithms initially received from the Remote UE 20m, and Nonce-UE-remote. In the illustrated example, the message also contains a Message Authentication Code (MAC). The method 200m performed at the Relay may thus further comprise a step of generating a MAC using the integrity key. In an alternative embodiment, the MAC is generated using the direct communication key or another key derived from the direct communication key.

Having received the GPI and Relay 30m identity and optionally the DKSI, lifetime, security algorithms chosen from the list of security algorithms supported by the Remote UE 20m, the list of security algorithms itself, and Nonce-UE-remote protected by the MAC, the Remote UE 20m derives the direct communication key DC_K in message exchange 1315m. This comprises processing the GPI to obtain the session shared key Ks_NAF before then deriving the direct communication key DC_K from the session shared key Ks_NAF and the Relay 30m identity in a similar manner to the ProSe Function 40Am. The Remote UE 20m thus calculates the direct communication key according to:

$DC\_K=KDF(Ks\_NAF, Relay\ ID, \ldots)$

As discussed above, KDF is a key derivation function having as inputs at least Ks_NAF and Relay ID. Additional inputs may be included, and processing of the inputs before inputting to the KDF may take place.

The Remote UE 20m further derives session key (SK) from the direct communication, Nonce-UE-remote and Nonce-UE-relay, and confidentiality and integrity keys from session key KS, similarly to the Relay 30m. Again, additional inputs may be included, and processing of the inputs before inputting to the KDF may take place. The Remote UE 20m thus calculate the session key SK and the confidentiality key CK and integrity key IK as follows;

$SK=KDF(DC\_K,\ Nonce\text{-}UE\text{-}remote,\ Nonce\text{-}UE\text{-}relay,\ \ldots)$ $CK=KDF(SK,\ \ldots)$ $IK=KDF(SK,\ \ldots)$ In message exchange 1315m, the Remote UE 20m checks the MAC received from the Relay 30m in the direct security mode command message 1314m. If the MAC was generated using the integrity key IK, then the MAC may be checked by the Remote UE 20m using the integrity key IK which the Remote UE 20i has just derived. If the MAC was generated using a different key, for example the key direct communication key DC_K, then that key may be used to check the MAC. If the check is successful, then the Remote UE 20m responds with a direct security mode complete message (or a confirmation message) to the Relay 30m indicating that the check was successful and protects the response message with a MAC using integrity key IK, message exchange 1316m.

Although not illustrated in FIG. 10, the Relay 30m checks the MAC received in message 1316m using integrity key IK. If the check is successful, then the Relay 30m knows that the Remote UE 20m shares the same direct communication key DC_K as the Relay 30m. The Relay 30m can now use the direct communication key DC_K for direct communication on the PC5 interface with the Remote UE 20m.

As described in previous examples, Nonce-UE-remote and Nonce-UE-relay may be included in generation of the session key KS. The Nonce-UE-remote and Nonce-UE-relay are generated by the Remote UE 20m and the Relay 30m, respectively, and are used for mutual authentication. A nonce may for example be a sequence number, a random value or a timestamp. As the MACs described above are generated using integrity key IK based on at least the Nonce-UE-remote and Nonce-UE-relay, in practice this means that Remote UE 20m and the Relay 30m authenticate one another.

As described above, the ProSe Function 50Am of the Remote UE acts as a NAF, however it should be understood that it is also in the scope of the present invention for the ProSe Function 50Bm of the Relay 30m to act as the NAF instead of the ProSe Function 50Aii of the Remote UE.

Another aspect of the invention will now be described. Similarly to the embodiments described above, also this aspect of the present invention employ the parts of the reference GBA Push architecture, namely a BSF, to establish a shared key between a UE and a device, which key may be used over a direct communication interface such as a ProSe PC5 interface. In this case, the GBA Push is employed as a fall back option when the UE does not have a valid shared secret for establishing a shared key and the UE cannot fetch a new key from its ProSe Key Management Function (KMF) because the UE is out of network coverage.

This embodiment employs the security set-up for UE-Network Relay as described in SA3 TR 33.833 in section 8.1.7. In this embodiment the UE also uses ProSe UE ID, IMSI, MSISDN, ProSe Relay UE ID, ProSe Discovery UE ID, ProSe Application code or ProSe Restricted code as a UE identifier in order to establish a shared key between a remote UE 20n and a device, Relay 30n, which key may be used over a direct communication interface such as a ProSe PC5 interface.

In brief, in this embodiment the UE fetches a ProSe User Relay Key (PRUK) from its KMF (also corresponding to a direct communication element) and associated PRUK ID (key ID). The KMF acts as a NAF and may also be a ProSe Function or KMS. The UE 20n and a Relay 30n then initiate a discovery procedure. The Remote UE 20n then contacts the Relay 30n indicating the PRUK ID. The Relay 30n forwards the request to the KMF 40n and its Relay ID to the KMF. If the KMF 40n does not recognize the PRUK ID, it sends an error message to the UE 20n via the Relay 30n. The Remote UE 20n tries to retrieve a new PRUK however if it is out of network coverage or cannot contact the KMF for any other reason, the Remote UK 20n sends a UE identifier comprising any of ProSe UE ID, IMSI, MSISDN, ProSe Relay UE ID, ProSe Discovery UE ID, ProSe Application code or ProSe Restricted code to the Relay 30n which the Relay forwards, together with its Relay ID, to the KMF in order to fetch a ProSe Relay Key. When the KMF 40n receives the UE identifier it identifies the UE 20n and then fetches GPI and a session shared key (NAF key which may be Ks_NAF, Ks_int_NAF or Ks_ext_NAF) from a BSF. Then the KMF 40n derives a ProSe Relay Key or a direct communication key DC_K using the session shared key and the Relay ID as input. The KMF 40n then sends the direct communication key DCD_K and GPI to the Relay 30n. The Relay 30n then sends the GPI to and the Relay ID to the UE. The UE derives the session shared key (NAF key which may be Ks_NAF, Ks_int_NAF or Ks_ext_NAF), and then derives the direct communication key from the session shared key and the Relay ID. The Direct Communication key K_DC is then available in both the UE and the device for use on a direct communication interface such as the ProSe PC5 interface between the UE and the device.

Similar to the above, the KMF 40n involved in the provisioning of the Direct Communication key may be operated by a 3GPP operator or a third party operator, for example a National Security or Public Safety organisation having an agreement with the 3GPP operator running the BSF. The device with which the UE communicates may be another UE for one-to-one communication or may be a UE-to-Network Relay.

The following discussion illustrates further examples of the invention with reference to ProSe communication as supported by a 3GPP network. However it will be appreciated that the invention is equally applicable to other direct communication technologies.

As previously discussed, aspects of the invention are particularly suited to establishing a shared key for use by a UE and a device over the PC5 interface. This is achieved using ProSe UE ID, IMSI, MSISDN, ProSe Relay UE ID, ProSe Discovery UE ID, ProSe Application code or ProSe Restricted code as a UE identifier and this may be employed when the UE cannot fetch a new valid PRUK, for example when the UE is out of network coverage. However it should be understood that the UE 20 may not be limited to a remote UE that is out of network coverage that wishes to secure one-to-one communication with another UE, or secure E-UTRAN access via a device acting as a UE-to-Network Relay. The present invention may also be applied to establish a shared key for use by a UE which is within network coverage, but a PRUK cannot be fetched from the KMF 40n for a reason or another.

It is possible that the UE and device may belong to the same Home PLMN or may belong to different Home PLMNs. Example applications of methods according to the present invention are described below where the UE and the device belong to the same Home PLMN, however it should be understood that it is also applicable when the UE and device belong to different Home PLMN. The following example applications illustrate different ways in which the steps of the methods 100k, 200k, 300k described above may be implemented to achieve the above discussed functionality.

Figure 17:
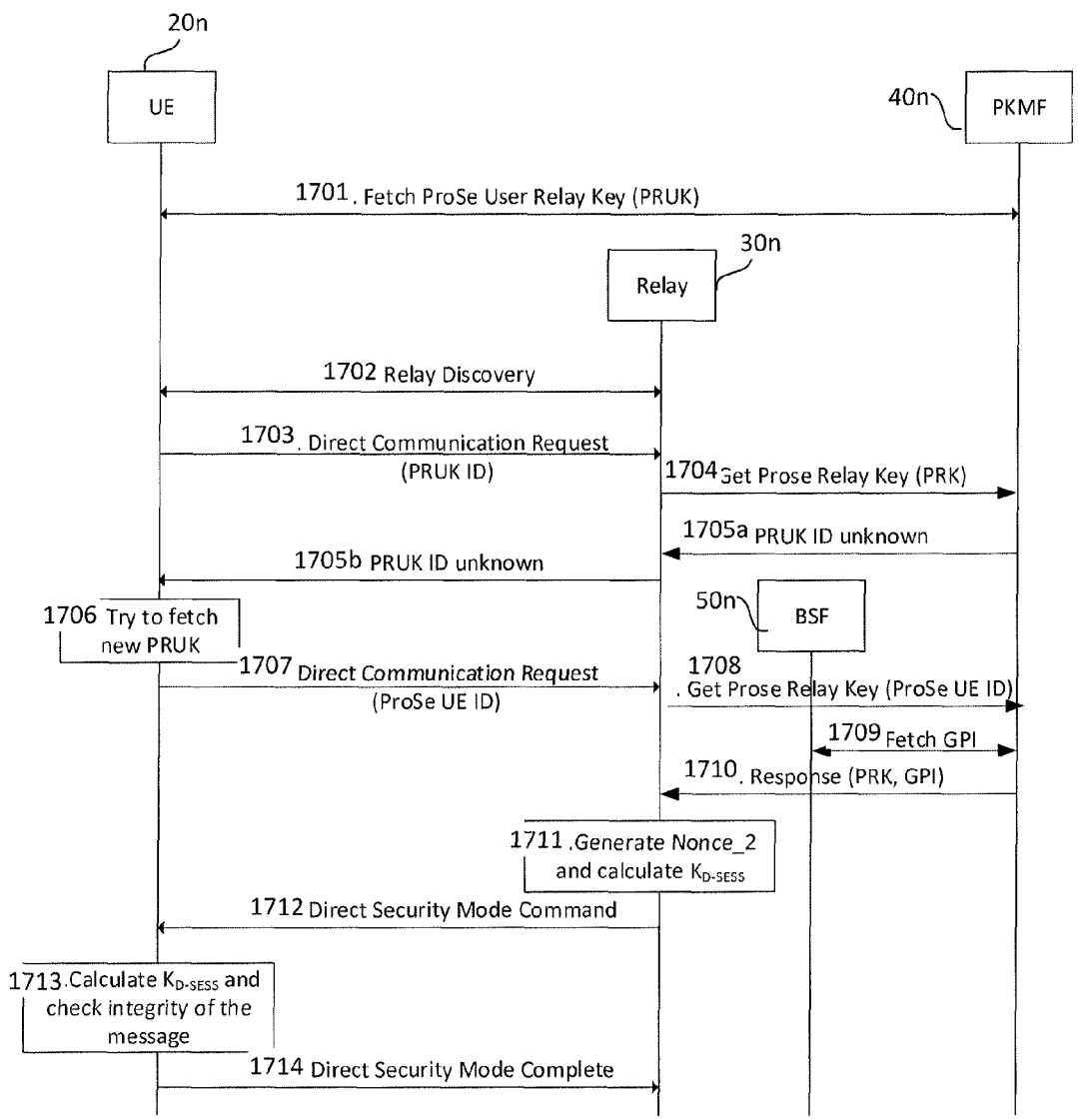
FIG. 17 is a message flow illustrating an example of implementation of the methods of FIGS. 14 to 16.

Referring to FIG. 17, a detail description of the message flow will be described. The Remote UE 20n and the Relay 30n initially connect to the E-UTRAN, which connection may take place at any time before the following method steps. The Relay 30m establishes a secure channel with the KMF (DCE) which has functionalities of a NAF. The Remote UE 20n then contacts the KMF 40n requesting PRUK, direct communication key DC_K, and the KMF 40n sends the PRUK and the PRUK ID to the Remote UE 20n, message exchange 1701.

The Remote UE 20n and Relay 30n then discover each other through Direct Discovery procedures using Direct Discovery Model A or Direct Discovery Model B, message exchange 1702 as described in TR 23.713[33]. In one embodiment, discovery may be initiated by either the Remote UE 20*n* or the Relay 30*n*. In the illustrated example, discovery may be initiated by the Relay 30*n*. Thus, step 1702 comprises the Relay 30*n* issuing a discovery procedure message, which may be a Direct Discovery broadcast according to ProSe Model A or a Direct Discovery request message according to ProSe Model B. The discovery procedure message includes an identity of the Relay 30*n*. The Remote UE 20*n* receives the discovery procedure message and may respond, for example with a discovery procedure message comprising a request message sent in response to a Direct Discovery broadcast according to ProSe Model A or a Direct Discovery response message sent in response to a Direct Discovery request message according to ProSe Model B. In the illustrated example, the discovery procedure is completed before the subsequent method steps. However, in alternative examples, subsequent method steps may be combined with the discovery procedure, as discussed below.

In step 1703, the Remote UE 20*m* sends a direct communication request message to the Relay 30*m*. The message comprises the PRUK ID or the PRUK, a nonce generated by the UE (Nonce-remote-UE_ and a DKSI (this gives the values of the Key Set Identifier for a security context created from the PRUK). The Relay 30*m* in turn sends the received PRUK ID and its Relay ID to the KMF 40*n*, step 1704.

(In some examples of the invention (not illustrated) the direct communication request message 1703, 1707 may be included in a discovery procedure message such as a discovery response message as discussed above.)

If the KMF 40*n* does not recognize the PRUK ID, it sends an error message to the Relay 30*n* indicating that the PRUK ID is unknown, step 1705*a*. The Relay 30*n* forwards the message to the Remote UE 20*n* in step 1705*b*. When the Remote UE 20*n* receives the error message, it tries to fetch a new PRUK from the KMF 40*n*, if unsuccessful (e.g. the UE is out of network coverage), the Remote UE 20*n* sends a direct communication request with a UE identifier comprising any one of its ProSe UE ID, IMSI, MSISDN, ProSe Relay UE ID, ProSe Discovery UE ID, ProSe Application code or ProSe Restricted code to the Relay 30*n*. Thus the Remote UE 20*n* does not send a PRUK ID, message 1707.

Upon receiving the direct communication request comprising the UE identifier, the Relay 30*n* sends a request to the KMF for the direct communication key, the request comprising the UE identifier and the relay ID, step 1708.

The KMF then identifies the Remote UE 20*n* based on any of ProSe UE ID, IMSI, MSISDN, ProSe Relay UE ID, ProSe Discovery UE ID, ProSe Application code or ProSe Restricted code used as a UE identifier. If the UE is identified, the KMF 40*n* translates or maps the ProSe UE ID, IMSI, MSISDN, ProSe Relay UE ID, ProSe Discovery UE ID, ProSe Application code or ProSe Restricted code to an appropriate public user identity if needed.

Identifying the Remote UE 20*n* may comprise the following steps; if the ProSe UE ID is used as a UE identifier, then the ProSe UE ID is also previously stored in the KMF 40*n* such that the KMF 40*n* can match the received ProSe UE ID with one of its stored ProSe UE IDs. If the IMSI or MSISDN is used as a UE identifier, the ProSe Function may check one of its stored lists for a match or alternatively it may contact another server such as a HSS to identify the UE.

In the next step 1709, the KMF 40*n* checks if the Relay 30*n* is authorized to server the Remote UE by checking a database with a list of authorized. This database may be local and supported by the KMF 40*n* or may be implemented in a different network server. If the authorization is successful, the KMF 40*n* sends a request to a BSF 50*n* requesting GPI and a session shared key (referred herein as Ks_NAF but can also be a more specific NAF key for example Ks_ext_NAF or Ks_int_NAF). The BSF 50*n* contacts a HSS (not shown) to fetch appropriate authentication vectors and GBA User Security Settings (GUSS) according to TS 33.223. The BSF 50*n* prepares the GPI and session shared key according to the GBA push procedures defined in TS 33.223 and sends the GPI and session shared key to the KMF 40*n*, step 1709.

Upon receiving the GPI and session shared key Ks_NAF, the KMF 40*n* derives the direct communication key DC_K to be provisioned to the Relay 30*n*. The KMF 40*n* calculates the direct communication key DC_K from the session shared key Ks_NAF and the Relay 30*n* identity (Relay ID) as follows:

DC_K=KDF(Ks_NAF, Relay ID, . . . )

As discussed above, KDF is a key derivation function having as inputs at least Ks_NAF (session shared key) and the Relay 30*n* identity. Additional inputs may be included such as the Remote UE identity, and processing of the inputs before inputting to the KDF may take place.

The KMF 40*n* then sends the direct communication key DC_K, and GPI to the Relay 30*n* in a ProSe key response over PC6 interface, message 1710.

The Relay 30*n* stores the direct communication key DC_K and sends a direct security mode command message to the Remote UE 20*m* over PC5, message 1712. This message comprises at least the GPI and the identity of the Relay 30*n*. In a preceding message exchange 1711 the Relay may also generate a session key (SK) from the direct communication key DC_K, Nonce-UE-remote and a nonce generated by the Relay 30*m* (Nonce-UE-relay) as follows;

SK=KDF(DC_K, Nonce-UE-remote, Nonce-UE-relay, . . . )

The Relay 30*m* may then further generate confidentiality key CK and integrity key IK from session key KS and store them together with the DKSI in message exchange 1711. The confidentiality key CK and the integrity key IK may be calculated as follows;

CK=KDF(SK, . . . )

IK=KDF(SK, . . . )

In this case, the direct security mode command message 1712 may in addition to the GPI and Relay ID further comprise the DKSI received in step 1707, and Nonce-UE-relay. In the illustrated example, the message is protected using the integrity key, for example by using a Message Authentication Code (MAC). The method 200*n* performed at the Relay may thus further comprise a step of generating a MAC using the integrity key. In an alternative embodiment, the MAC is generated using the direct communication key or another key derived from the direct communication key.

Having received the GPI and Relay 30*n* identity and optionally the DKSI, and Nonce-UE-remote protected by the integrity key, the Remote UE 20*n* derives the direct communication key DC_K in message exchange 1713. This comprises processing the GPI to obtain the session shared key Ks_NAF before then deriving the direct communication key DC_K from the session shared key Ks_NAF and the Relay 30*n* identity in a similar manner to the KMF 40*n*. The Remote UE 20*n* thus calculates the direct communication key according to:

DC_K=KDF(Ks_NAF, Relay ID, . . . )

As discussed above, KDF is a key derivation function having as inputs at least Ks_NAF and Relay ID. Additional inputs may be included, and processing of the inputs before inputting to the KDF may take place.

The Remote UE 20*n* further derives session key (SK) from the direct communication, Nonce-UE-remote and Nonce-UE-relay, and confidentiality and integrity keys from session key KS, similarly to the Relay 30*n*. Again, additional inputs may be included, and processing of the inputs before inputting to the KDF may take place. The Remote UE 20*n* thus calculate the session key SK and the confidentiality key CK and integrity key IK as follows;

SK=KDF(DC_K, Nonce-UE-remote, Nonce-UE-relay, . . . )
CK=KDF(SK, . . . )
IK=KDF(SK, . . . )

In message exchange 1713, the Remote UE 20*m* checks the integrity of the direct security mode command message by for example by using integrity algorithm indicated in the message and the integrity key. Alternatively, if a MAC was used the Remote UE checks the MAC received from the Relay 30*n* together with said message. If the MAC was generated using the integrity key IK, then the MAC may be checked by the Remote UE 20*n* using the integrity key IK which the Remote UE 20*n* has just derived. If the MAC was generated using a different key, for example the key direct communication key DC_K, then that key may be used to check the MAC.

If the check is successful, then the Remote UE 20*n* responds with a direct security mode complete message (or a confirmation message) to the Relay 30*m* indicating that the check was successful and protects the response message with the integrity key or a MAC using integrity key IK, message exchange 1714.

Although not illustrated in FIG. 17, the Relay 30*n* checks the integrity or the MAC received in message 1714. If the check is successful, then the Relay 30*n* knows that the Remote UE 20*n* shares the same direct communication key DC_K as the Relay 30*m*. The Relay 30*b* can now use the direct communication key DC_K for direct communication on the PC5 interface with the Remote UE 20*n*.

As described in previous examples, Nonce-UE-remote and Nonce-UE-relay may be included in generation of the session key KS. The Nonce-UE-remote and Nonce-UE-relay are generated by the Remote UE 20*n* and the Relay 30*n*, respectively, and are used for mutual authentication. A nonce may for example be a sequence number, a random value or a timestamp. As the MACs described above are generated using integrity key IK based on at least the Nonce-UE-remote and Nonce-UE-relay, in practice this means that Remote UE 20*n* and the Relay 30*n* authenticate one another.

Figure 18:
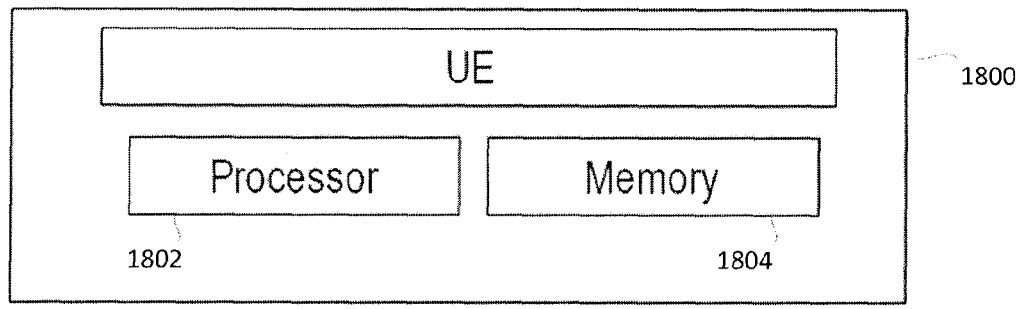
FIG. 18 is a block diagram illustrating a UE.
Figure 19:
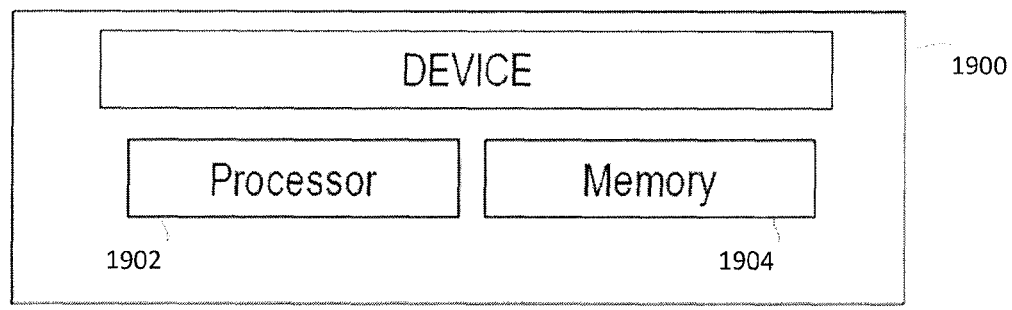
FIG. 19 is a block diagram illustrating a device.
Figure 20:
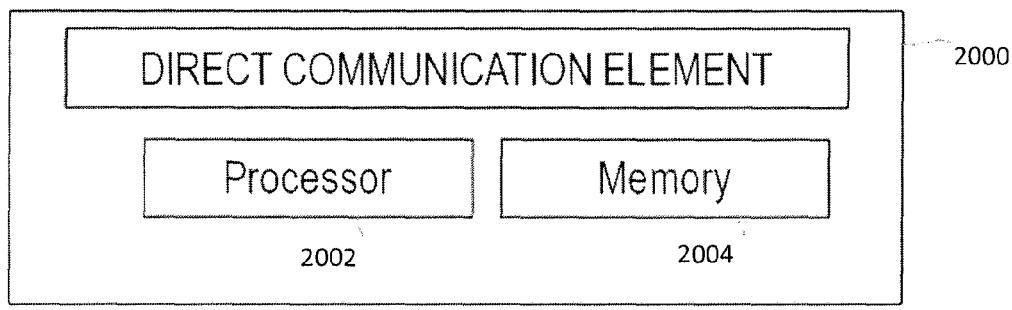
FIG. 20 is a block diagram illustrating a direct communication element.

The methods of the present invention, as illustrated by the above examples, may be conducted in a UE, a device which may be a UE, a UE-to-network Relay, or a network node such, or a Direct Communication Element (DCE) such as a ProSe Function, a ProSe KMF or a KMS. The methods may be conducted on receipt of suitable computer readable instructions, which may be embodied within a computer program running on the UE, device or DCE. FIGS. 18 to 20 illustrate first examples of a UE, device and DCE which may execute the methods of the present invention, for example on receipt of suitable instructions from a computer program. Referring to FIGS. 18 to 20, each of the UE 1800, device 1900 and DCE 2000 comprises a processor 1802, 1902, 2002 and a memory 1804, 1904, 2004. The memory 1804, 1904, 2004 contains instructions executable by the processor 1802, 1902, 2002 such that the UE 1800 is operative to carry out the method 100 and 100*k*, the device 1900 is operative to carry out the method 200 and 200*k* and the DCE 2000 is operative to carry out the method 300 and 300*k*.

Figure 21:
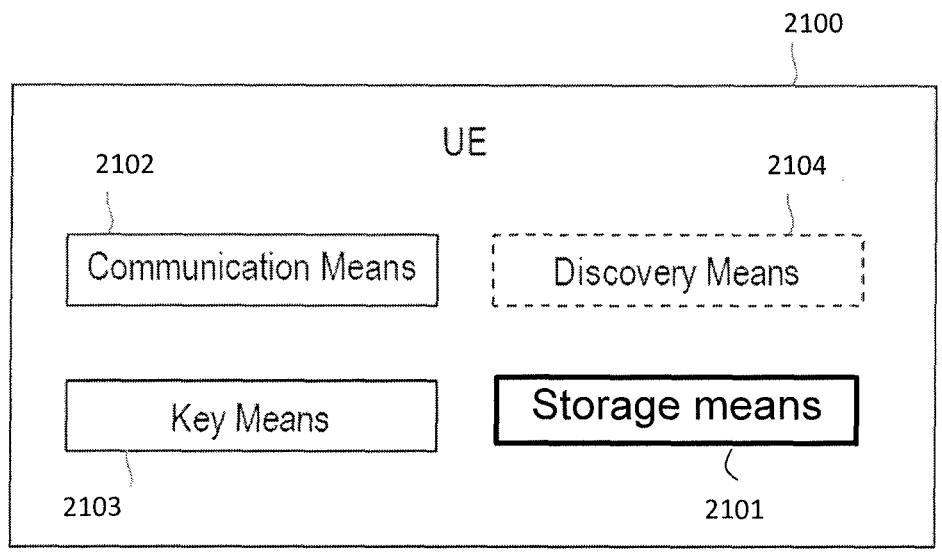
FIG. 21 is a block diagram illustrating another example of a UE.

FIG. 21 illustrates functional units in another embodiment of UE 2100 which may execute the method 100, for example according to computer readable instructions received from a computer program. It will be understood that the units illustrated in FIG. 21 are software implemented functional units, and may be realised in any appropriate combination of software modules.

Referring to FIG. 21, the UE 2100 comprises storage means for storing a transaction identifier obtained from a previous GBA, communication means 2102 for sending to the transaction identifier and requesting key generation for direct communication with the device. If the transaction identifier is invalid, the communication means 2102 also comprises means for receiving from the device a device identifier and key generation information. The UE 2100 also comprises key means 2103 for deriving a session shared key from at least the key generation information and for deriving a direct communication key from at least the session shared key and the identifier of the device.

The communication means 2102 may further comprise means for sending to the device direct communication element identifier, direct key set identifier, DKSI, a list of security algorithms supported by the UE, and a nonce generated by the UE. The communication means 2102 may also comprise means for receiving a Message Authentication Code (MAC). The communication means 2102 may further comprise means for receiving the DKSI, a lifetime, at least one security algorithm chosen by the device from the list of security algorithms previously sent, said list of security algorithms supported by the UE and a nonce generated by the device. The communication means 2102 may additionally comprise means for sending a confirmation message to the device indicating that the UE 2100 has derived the direct communication key.

The key means 2103 may further comprise means for checking the MAC received from the device using the derived direct communication key or a key derived from the direct communication key and for generating a confirmation MAC using the direct communication key or a key derived from the direct communication key. The communication means 2102 may further comprise means for sending the confirmation MAC with the confirmation message; wherein, if the check is successful, the first confirmation message further indicates that the UE has successfully checked the MAC The UE 2100 may further comprise discovery means 2104 for discovering the device through a discovery procedure. The communication means 2102 may comprise means for receiving a discovery procedure message comprising a discovery message from the device and for passing the message to the discovery means 2104, the discovery message including the identifier of the device. The communication means 2102 may also comprise means for sending a discovery procedure message comprising a discovery response message responding to the received discovery message, the discovery response message including the transaction identifier and the request for key generation for direct communication and being assembled by the discovery means 2104.

Additionally, the invalid transaction identifier may be used as an identifier of the UE. The interface may comprise a proximity Service, ProSe Service, interface.

Furthermore, the UE may not be able to initiate another GBA bootstrapping procedure. In one embodiment, the UE does not comprise a valid shared secret with a Bootstrapping Server Function (BSF).

The device may comprise a UE or a UE-to-Network Relay and the key generation information may comprise Generic Bootstrapping Architecture Push Information, GPI.

In one example, the storage means 2101, the communication means 2102, key means 2103 and discovery means 2104 may be implemented with help from a computer program which, when run on a processor, causes the storage means 2101, communication means 2102, key means 2103 and discovery means 2104 to cooperate to carry out examples of the method 100 as described above.

Figure 22:
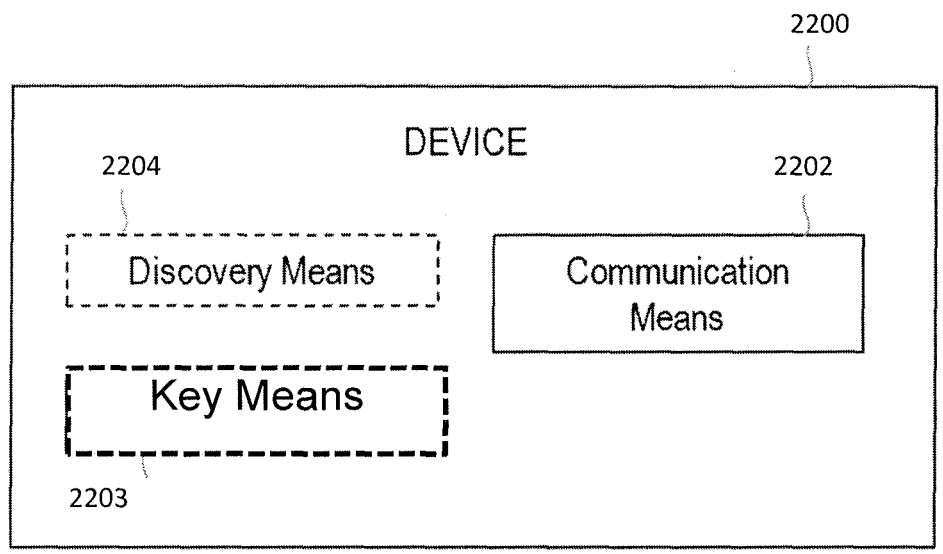
FIG. 22 is a block diagram illustrating another example of a device.

FIG. 22 illustrates functional units in another embodiment of device 2200 which may execute the method 200 of the present invention, for example according to computer readable instructions received from a computer program. It will be understood that the units illustrated in FIG. 20 are software implemented functional units, and may be realised in any appropriate combination of software modules.

Referring to FIG. 22, the device 2200 comprises communication means 2202 for receiving from an invalid transaction identifier of the UE and a request for key generation for direct communication with the device. The communication means 2202 also comprise means for sending to a Direct Communication Element the transaction identifier and a device identifier, and for requesting the Direct Communication Element to provide the device with a direct communication key. The communication means 2202 also comprise means for receiving from the Direct Communication Element the direct communication key and key generation information, and for sending the key generation information and the device identifier to the UE. The device may also comprise key means 2203 for storing the direct communication key.

The communication means 2202 may further comprise means for receiving from the UE a direct communication element identifier, a direct key set identifier, DKSI, a list of security algorithms supported by the UE and a nonce generated by the UE. The communication means 2202 may additionally comprise means for sending DKSI, a lifetime, at least one security algorithm chosen from the list of security algorithms supported by the UE, said list of security algorithms supported by the UE and a nonce generated by the device.

The key means 2203 may further comprise means for generating a Message Authentication Code, MAC, using the direct communication key or a key derived from the direct communication key and the communication means 2202 may further comprise means for sending the MAC to the UE with the key generation information and the device identifier. The communication means 2202 may further comprise means for receiving a confirmation message from the UE indicating that the UE has derived the direct communication key. The confirmation message may further indicate that the UE has successfully checked the MAC.

The communication means 1202 may further comprise means for receiving a confirmation MAC with the confirmation message, and for passing the MAC to the key means 2203. The key means 2203 may further comprise means for checking the confirmation MAC using the direct communication key or a key derived from the direct communication key.

The device may further comprise discovery means 2204 for discovering the UE through a discovery procedure. The communication means 2202 may further comprise means for sending a discovery procedure message comprising a discovery message to the UE, wherein the discovery message includes the device identifier and is assembled by the discovery means 2204. The communication means 2202 may further comprise means for receiving a discovery procedure message comprising a discovery response message responding to the sent discovery message, and for passing the discovery response message to the discovery means 2204, the discovery response message including the transaction identifier and the request for key generation for direct communication.

The interface may comprise a Proximity services, ProSe, interface, and the Direct Communication Element may comprise at least one of a ProSe Function or a ProSe Key Management server, KMS, or ProSe Key Management Function KMF. The invalid transaction identifier may be used as an identifier of the UE.

The device 2200 may comprise a UE or a UE-to-Network Relay and the key generation information may comprise Generic Bootstrapping Architecture Push Information, GPI. In some examples, the communication means 2202, key means 2203 and discovery means 2204 may be implemented with help from a computer program which, when run on a processor, causes the communication means 2202, key means 2203 and discovery means 2204 to cooperate to carry out examples of the method 200 as described above.

Figure 23:
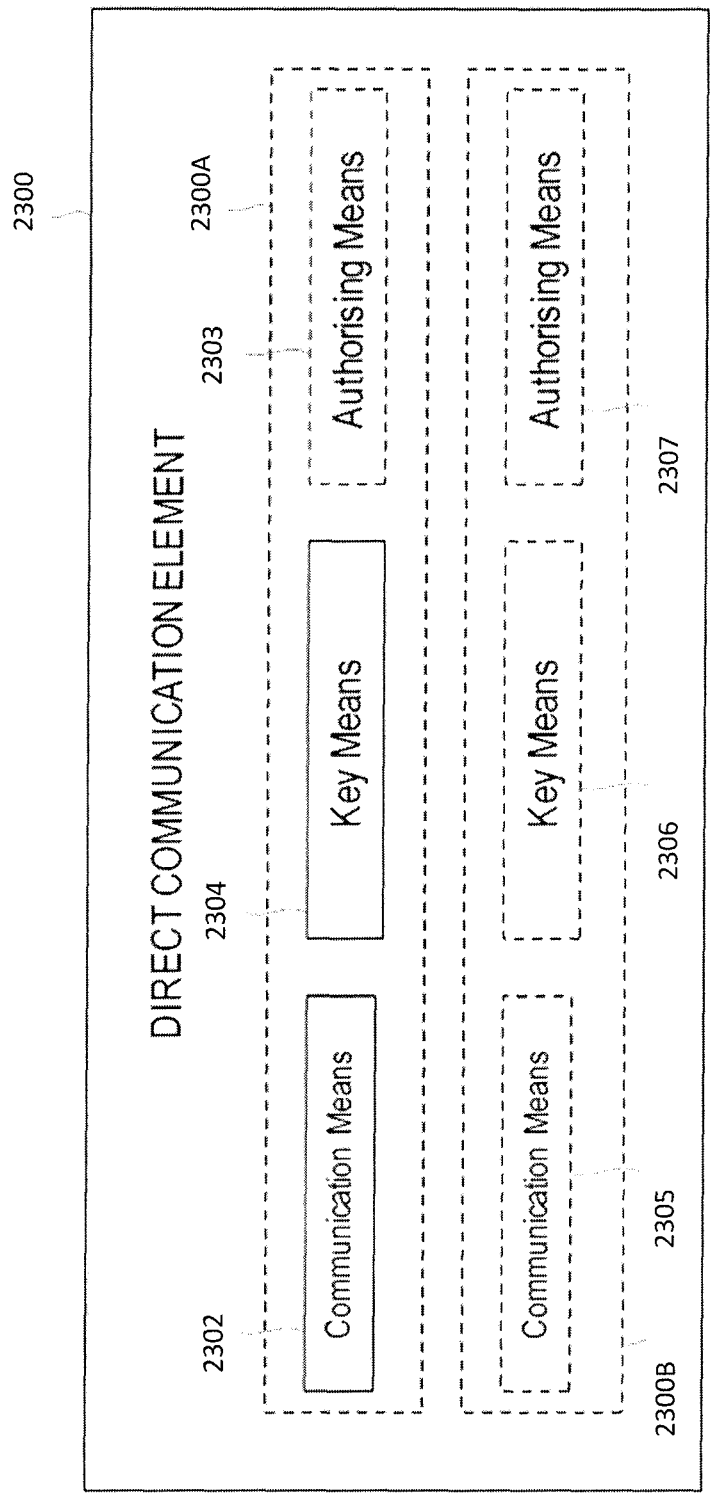
FIG. 23 is a block diagram illustrating another example of a direct communication element.

FIG. 23 illustrates functional units in another embodiment of DCE 2300 which may execute the method 300 of the present invention, for example according to computer readable instructions received from a computer program. It will be understood that the units illustrated in FIG. 23 are software implemented functional units, and may be realised in any appropriate combination of software modules.

Referring to FIG. 23, the DCE 2300 comprises communication means 2302 for receiving from a device a transaction identifier, a device identifier and a request to provide a direct communication key to the device. The DCE 2300 also comprises authorizing means 2303 for determining if the transaction identifier is invalid. If the transaction identifier is invalid, the communication means 2302 further comprise means for requesting key generation information and a session shared key from a Bootstrapping Server Function (BSF). The communication means 2302 also comprise means for receiving from the BSF the session shared key and key generation information. The DCE 2300 also comprises key means 2304 for deriving a direct communication key from at least the session shared key and the device identifier. The communication means 2302 further comprises means for sending the direct communication key and the key generation information to the device.

The DCE 2300 may comprise at least one of a ProSe Function, a ProSe Key Management Server or a ProSe Key Management Function. The device may comprise a UE or UE-to-Network Relay. The key generation information may comprise Generic Bootstrapping Architecture Push Information, GPI. The transaction identifier may be a bootstrapping transaction identifier (B-TID).

The authorizing means may further comprise means for matching the transaction identifier with a stored transaction identifier from a previous Generic Bootstrapping Architecture procedure (GBA procedure) so as to identify the UE.

The authorizing means 2304 may further comprise means for mapping the matched transaction identifier to a public UE identifier and the communication means 2302 may further comprise means for sending the public UE identifier to the BSF.

If the DEC cannot match the transaction identifier with a stored transaction identifier, DCE identifies the UE by its communication means 2302 further comprising means for sending the transaction identifier to the BSF and receiving the session shared key and the key generation information from the BSF. The DCE will receive the session shared key and the key generation information from the BSF if the BSF has successfully identified the UE using the transaction identifier.

The authorising means 2303 may further comprise means for checking that at least one of the device or the UE is authorised to establish direct communication.

The DCE 2303 may comprise a first sub-Element 2300A in a first communication network and a second sub-Element 2300B in a second communication network. The first and second sub elements may each comprise communication means 2302, 2305, key means 2304, 2306 and authorizing means 2303, 2307.

The communication means 2302 or 2305 in one of the first or second sub-Elements 2300A, 2300B may comprise means for sending to and receiving from at least one of the BSF or the device by sending to and receiving from the communication means 2302 or 2303 in the other of the first or second sub-Elements 2300A, 2300B.

The authorizing means 2303 in the first sub-Element 2300A may comprise means for authorizing a first one of the UE or the device and the authorizing means 2307 in the second sub-Element 2300B may comprise means for authorizing a second one of the UE or the device.

In some examples, the communication means 2302, 2305 key means 2304, 2306 and authorizing means 2303, 2307 may be implemented with help from a computer program which, when run on a processor, causes the communication means 2302, 2305, key means 2304, 2306 and authorising means 2303, 2307 to cooperate to carry out examples of the method 300 as described above.

Figure 24:
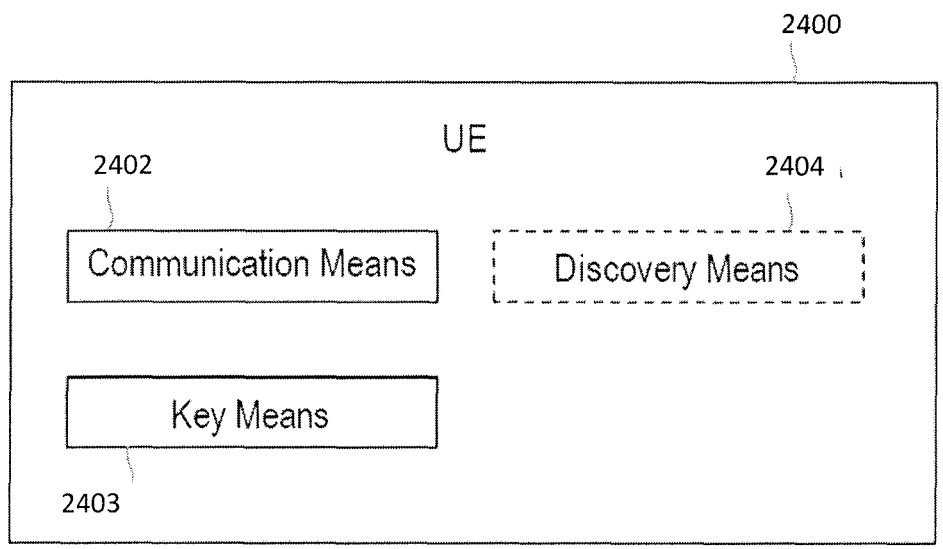
FIG. 24 is a block diagram illustrating another example of a UE.

FIG. 24 illustrates functional units in another embodiment of UE 2400 which may execute the method 100k, for example according to computer readable instructions received from a computer program. It will be understood that the units illustrated in FIG. 24 are software implemented functional units, and may be realised in any appropriate combination of software modules.

Referring to FIG. 24, the UE 2400 comprises communication means 2402 for sending to the device a UE identifier comprising any of a ProSe UE ID, international mobile subscriber identity (IMSI), mobile station international subscriber directory number (MSISDN), ProSe Relay UE ID, ProSe Discovery UE ID, ProSe Application code, ProSe Restricted code, and requesting key generation for direct communication with the device. The communication means 2402 further comprises means for receiving from the device a device identifier and key generation information. The UE 2400 also comprises key means 2403 for deriving a session shared key from at least the key generation information and for deriving a direct communication key from at least the session shared key and the identifier of the device.

The communication means 2402 may further comprise means for sending to the device direct communication element identifier, direct key set identifier, DKSI, a list of security algorithms supported by the UE, and a nonce generated by the UE. The communication means 2402 may also comprise means for receiving a Message Authentication Code (MAC). The communication means 2402 may further comprise means for receiving the DKSI, a lifetime, at least one security algorithm chosen by the device from the list of security algorithms previously sent, said list of security algorithms supported by the UE and a nonce generated by the device. The communication means 2402 may additionally comprise means for sending a confirmation message to the device indicating that the UE 2400 has derived the direct communication key.

The key means 2403 may further comprise means for checking the MAC received from the device using the derived direct communication key or a key derived from the direct communication key and for generating a confirmation MAC using the direct communication key or a key derived from the direct communication key. The communication means 2402 may further comprise means for sending the confirmation MAC with the confirmation message; wherein, if the check is successful, the first confirmation message further indicates that the UE has successfully checked the MAC The UE 2400 may further comprise discovery means 2404 for discovering the device through a discovery procedure. The communication means 2402 may comprise means for receiving a discovery procedure message comprising a discovery message from the device and for passing the message to the discovery means 2404, the discovery message including the device identifier. The communication means 2402 may also comprise means for sending a discovery procedure message comprising a discovery response message responding to the received discovery message, the discovery response message including the UE identifier and the request for key generation for direct communication and being assembled by the discovery means 2404.

The communication means 2402 may further comprise means for, as preceding step, requesting key generation for direct communication with the device and in response receiving from the device a Generic Bootstrapping Architecture (GBA) renegotiation request.

Alternatively, the communication means 2402 may further comprise means for, as a preceding step, sending a temporary key to the device and receiving in response a request for a new temporary key, and then sending the UE identifier instead of a new temporary key.

The communication means may further comprise means for, as a preceding step, for receiving the ProSe UE ID, ProSe Relay UE ID, ProSe Discovery UE ID, ProSe Application code or the ProSe restricted code from the direct communication element.

Additionally, the interface may comprise a proximity Service, ProSe Service, interface. Furthermore, the UE may not be able to initiate another GBA bootstrapping procedure. In one embodiment, the UE does not comprise a valid shared secret with a Bootstrapping Server Function (BSF).

The device may comprise a UE or a UE-to-Network Relay and the key generation information may comprise Generic Bootstrapping Architecture Push Information, GPI.

In one example, the communication means 2402, key means 2403 and discovery means 2404 may be implemented with help from a computer program which, when run on a processor, causes the communication means 2402, key means 2403 and discovery means 2404 to cooperate to carry out examples of the method 100k as described above.

Figure 25:
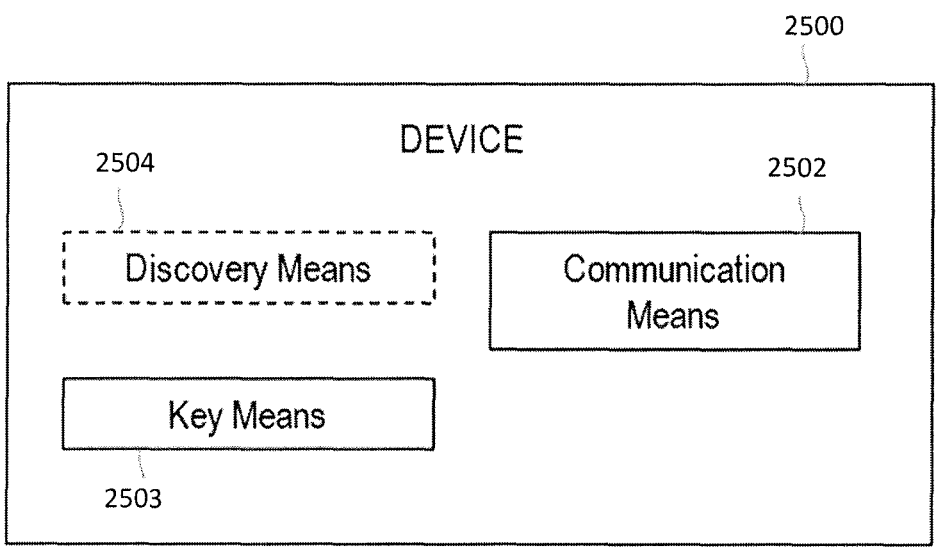
FIG. 25 is a block diagram illustrating another example of a device.

FIG. 25 illustrates functional units in another embodiment of device 2500 which may execute the method 200k of the present invention, for example according to computer readable instructions received from a computer program. It will be understood that the units illustrated in FIG. 25 are software implemented functional units, and may be realised in any appropriate combination of software modules.

Referring to FIG. 25, the device 2500 comprises communication means 2502 for receiving from a UE a UE identifier comprising any of ProSe UE ID, international mobile subscriber identity, IMSI, or mobile station international subscriber directory number, MSISDN, ProSe Relay UE ID, ProSe Discovery UE ID, ProSe Application code or ProSe Restricted code, and a request for key generation for direct communication with the device. The communication means 2502 also comprise means for sending to a Direct Communication Element the UE identifier and a device identifier, and for requesting the Direct Communication Element to provide the device with a direct communication key. The communication means 2502 also comprise means for receiving from the Direct Communication Element the direct communication key and key generation information, and for sending the key generation information and the device identifier to the UE. The device may also comprise key means 2503 for storing the direct communication key.

The communication means 2502 may further comprise means for receiving from the UE a direct communication element identifier, a direct key set identifier, DKSI, a list of security algorithms supported by the UE and a nonce generated by the UE. The communication means 2502 may additionally comprise means for sending DKSI, a lifetime, at least one security algorithm chosen from the list of security algorithms supported by the UE, said list of security algorithms supported by the UE and a nonce generated by the device.

The key means 2503 may further comprise means for generating a Message Authentication Code, MAC, using the direct communication key or a key derived from the direct communication key and the communication means 2502 may further comprise means for sending the MAC to the UE with the key generation information and the device identifier. The communication means 2502 may further comprise means for receiving a confirmation message from the UE indicating that the UE has derived the direct communication key. The confirmation message may further indicate that the UE has successfully checked the MAC.

The communication means 2502 may further comprise means for receiving a confirmation MAC with the confirmation message, and for passing the MAC to the key means 2503. The key means 2503 may further comprise means for checking the confirmation MAC using the direct communication key or a key derived from the direct communication key.

The device may further comprise discovery means 2504 for discovering the UE through a discovery procedure. The communication means 2502 may further comprise means for sending a discovery procedure message comprising a discovery message to the UE, wherein the discovery message includes the device identifier and is assembled by the discovery means 2204. The communication means 2202 may further comprise means for receiving a discovery procedure message comprising a discovery response message responding to the sent discovery message, and for passing the discovery response message to the discovery means 2204, the discovery response message including the UE identifier and the request for key generation for direct communication.

The interface may comprise a Proximity services, ProSe, interface, and the Direct Communication Element may comprise at least one of a ProSe Function or a ProSe Key Management server, KMS, or ProSe Key Management Function KMF. The UE identifier may be used as an identifier of the UE.

The device 2500 may comprise a UE or a UE-to-Network Relay and the key generation information may comprise Generic Bootstrapping Architecture Push Information, GPI.

In some examples, the communication means 2502, key means 2503 and discovery means 2504 may be implemented with help from a computer program which, when run on a processor, causes the communication means 2502, key means 2503 and discovery means 2504 to cooperate to carry out examples of the method 200k as described above.

Figure 26:
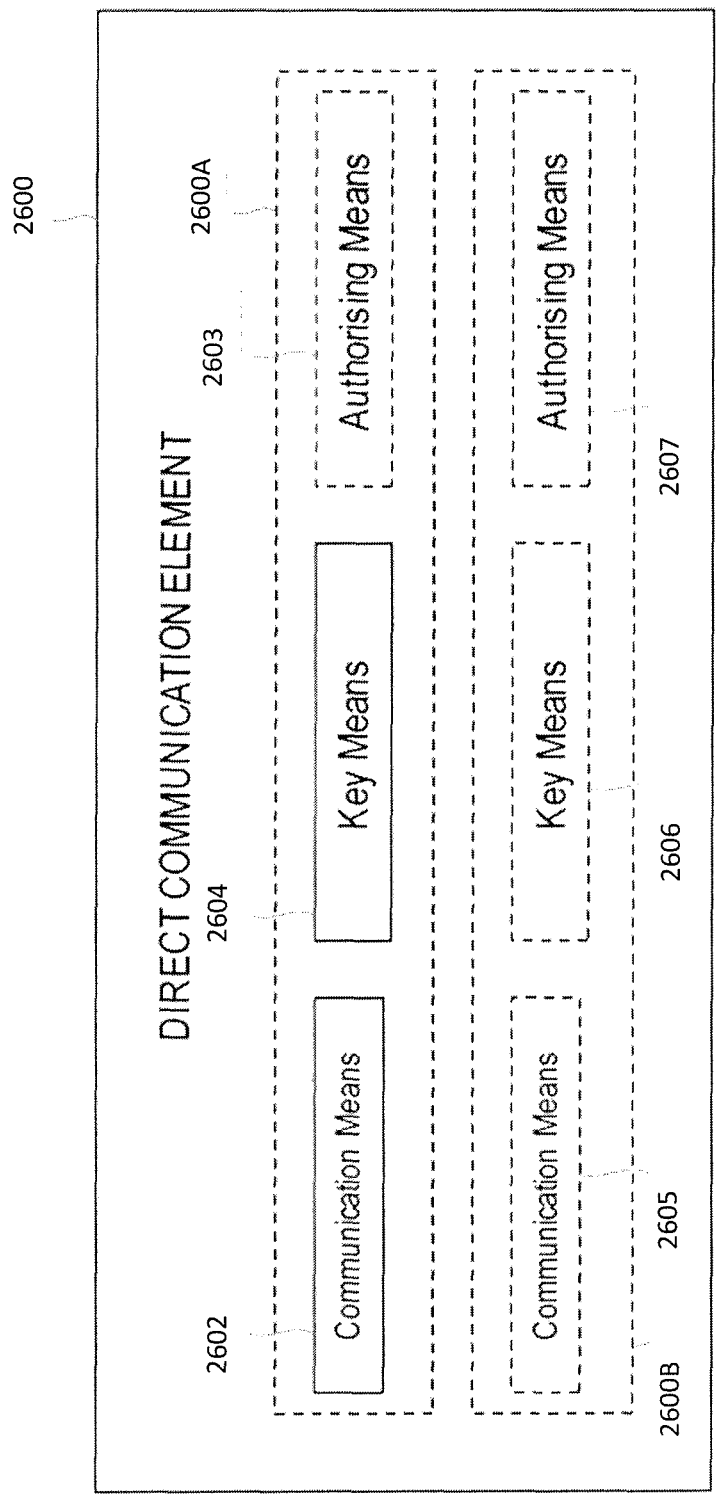
FIG. 26 is a block diagram illustrating another example of a direct communication element.

FIG. 26 illustrates functional units in another embodiment of DCE 2600 which may execute the method 300k of the present invention, for example according to computer readable instructions received from a computer program. It will be understood that the units illustrated in FIG. 26 are software implemented functional units, and may be realised in any appropriate combination of software modules.

Referring to FIG. 26, the DCE 2600 comprises communication means 2602 for receiving from a device a UE identifier comprising any of ProSe UE ID, international mobile subscriber identity, IMSI, or mobile station international subscriber directory number, MSISDN, ProSe Relay UE ID, ProSe Discovery UE ID, ProSe Application code or ProSe Restricted code, a device identifier and a request to provide a direct communication key to the device. The DCE 2600 also comprises authorizing means 2603 for identifying the UE using the UE identifier. The communication means 2602 further comprise means for requesting key generation information and a session shared key from a Bootstrapping Server Function (BSF). The communication means 2602 also comprise means for receiving from the BSF the session shared key and key generation information. The DCE 2600 also comprises key means 2604 for deriving a direct communication key from at least the session shared key and the device identifier. The communication means 2602 further comprises means for sending the direct communication key and the key generation information to the device.

The DCE 2600 may comprise at least one of a ProSe Function, a ProSe Key Management Server or a ProSe Key Management Function. The device may comprise a UE or UE-to-Network Relay. The key generation information may comprise Generic Bootstrapping Architecture Push Information, GPI.

The authorizing means 2603 may further comprise means for matching the UE identifier with a UE identifier stored with the DCE. Alternatively, the authorizing means 2603 may pass to the communication means 2602 instructions to send to a server to identify the UE, wherein the server may be a home subscriber server, HSS.

The authorizing means 2604 may further comprise means for mapping the identified UE to a public UE identifier and the communication means 2602 may further comprise means for sending the public UE identifier to the BSF.

The authorising means 2603 may further comprise means for checking that at least one of the device or the UE is authorised to establish direct communication.

The DCE 2603 may comprise a first sub-Element 2600A in a first communication network and a second sub-Element 2600B in a second communication network. The first and second sub elements may each comprise communication means 2602, 2605, key means 2604, 2606 and authorizing means 2603, 2607.

The communication means 2602 or 2605 in one of the first or second sub-Elements 2600A, 2600B may comprise means for sending to and receiving from at least one of the BSF or the device by sending to and receiving from the communication means 2602 or 2603 in the other of the first or second sub-Elements 2600A, 2600B.

The authorizing means 2603 in the first sub-Element 2600A may comprise means for authorizing a first one of the UE or the device and the authorizing means 2607 in the second sub-Element 2600B may comprise means for authorizing a second one of the UE or the device.

In some examples, the communication means 2602, 2605 key means 2604, 2606 and authorizing means 2603, 2607 may be implemented with help from a computer program which, when run on a processor, causes the communication means 2602, 2605, key means 2604, 2606 and authorising means 2603, 2607 to cooperate to carry out examples of the method 300k as described above.

Aspects of the present invention thus provide methods, apparatus, computer programs and systems enabling the establishment of a key for direct communication between a UE and a device. The key is established using GBA Push procedures and aspects of the present invention enable a shared key to be established between a UE and another device without the need for pre-configuring in the UE or device and without the need for network coverage for the UE.

Aspects of the present invention thus provide methods, apparatus, computer programs and systems enabling the establishment of a key for direct communication between a UE and a device. The key is established using GBA Push procedures and aspects of the present invention enable a shared key to be established between a UE and another device without the need for pre-configuring in the UE or device and without the need for network coverage for the UE.

The above methods, apparatus, computer programs and system provide the advantage of employing GBA Push when there is no valid shared secret and GBA push is unavailable. Using GBA Push reduces the number of messages sent and so less load on the network.

Advantageously, some of the embodiments reuse an invalid transaction identifier and other embodiments use UE identifiers such as ProSe UE ID, international mobile subscriber identity, IMSI, mobile station international subscriber directory number, MSISDN, ProSe Relay UE ID, ProSe Discovery UE ID, ProSe Application code or ProSe Restricted code, where at least ProSe UE ID, ProSe Relay UE ID, ProSe Discovery UE ID, ProSe Application code and ProSe Restricted code are temporary UE identifiers.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a User Equipment device (UE) for obtaining a key for direct communication with a device over an air interface, the method comprising:
    sending a temporary key to the device;
    receiving a request for a new temporary key;
    instead of sending the new temporary key, sending to the device a UE identifier comprising any of Proximity Services (ProSe) UE ID, international mobile subscriber identity (IMSI), mobile station international subscriber directory number (MSISDN), ProSe Relay UE ID, ProSe Discovery UE ID, ProSe Application code or ProSe Restricted code and requesting key generation for direct communication with the device;
    receiving from the device a device identifier and key generation information,
    deriving a session shared key from at least the key generation information, and
    deriving a direct communication key from at least the session key and the device identifier; and
    using the direct communication key to establish direct communication with the device over the air interface.

2. A method as claimed in claim 1, wherein the interface comprises a ProSe interface.

3. A method as claimed in claim 1, further comprising discovering the device through a discovery procedure.

4. A method as claimed in claim 1, wherein the UE further sends to the device, a direct communication element identifier, direct key set identifiers (DKSI), a list of security algorithms supported by the UE, and a nonce generated by the UE.

5. A method as claimed in claim 4, further comprising receiving a Message Authentication Code (MAC), with the device identifier and key generation information, wherein the MAC is generated using the direct communication key or a key derived from the direct communication key.

6. A method as claimed in claim 5, further comprising receiving the DKSI, a lifetime, at least one security algorithm chosen by the device from the list of security algorithms, said list of security algorithms supported by the UE, together with the MAC, device identifier and key generation information.

7. A method according to claim 1, further comprising:
    prior to receiving key generation information, requesting key generation for direct communication with the device, and
    in response to request key generation, receiving from the device a Generic Bootstrapping Architecture (GBA) renegotiation request.

8. A method as claimed in claim 1, wherein the UE cannot initiate a Generic bootstrapping architecture (GBA) procedure.

9. A method as claimed in claim 1, wherein the UE does not comprise a valid shared secret with a Bootstrapping Server Function (BSF).

10. A method according to claim 1, further comprising prior to sending the UE identifier to the device, receiving the ProSe UE ID, ProSe Relay UE ID, ProSe Discovery UE ID, ProSe Application code or ProSe Restricted code from a Direct Communication element.

11. A method as claimed in claim 1, wherein the device comprises at least one of:
    a UE;
    a UE-to-Network Relay.

12. A method as claimed in claim 1, wherein the key generation information comprises Generic Bootstrapping Architecture Push Information (GPI).

13. The method as claimed in claim 1, wherein by sending the UE identifier to the device, the UE, which may not have previously run a Generic Bootstrapping Architecture procedure with a Direct Communication Element operating as Network Application Function (NAF), is able to establish direct communication with the device via a device communicating with the NAF.

14. A method, performed by a device, for obtaining a key for direct communication with a User Equipment device (UE) over an air interface, the method comprising:
receiving a temporary key from the UE;
sending a request for a new temporary key;
instead of receiving the new temporary key, receiving from the UE a UE identifier comprising any of Proximity Services (ProSe) UE ID, international mobile subscriber identity (IMSI), mobile station international subscriber directory number (MSISDN), ProSe Relay UE ID, ProSe Discovery UE ID, ProSe Application code or ProSe Restricted code and a request to obtain a direct communication key;
sending to a Direct Communication Element the UE identifier and a device identifier of the device, and requesting the Direct Communication Element to provide the device with the direct communication key; and
receiving the direct communication key and key generation information from the Direct Communication Element; and
sending the key generation information and the device identifier to the UE to cause the UE to derive the direct communication key and establish direct communication with the device over the air interface.

15. A method as claimed in claim 14, wherein the interface comprises a ProSe interface, and the Direct Communication Element comprises at least one of a ProSe Function, a ProSe Key Management Server, and a ProSe Key Management Function.

16. A method as claimed in claim 14, further comprising receiving a direct communication element identifier, a direct key set identifier, a list of security algorithms supported by the UE and a nonce generated by the UE.

17. A method as claimed in claim 16, further comprising sending to the UE a direct key set identifier (DKSI), a lifetime, at least one security algorithm chosen by the device from the list of security algorithms supported by the UE, said list of algorithms supported by the UE, and a nonce generated by the device.

18. A method, performed by a Direct Communication Element, for establishing a key for direct communication over an interface between a User Equipment device (UE), and a device, the method comprising:
receiving from the device a UE identifier comprising any of Proximity Services (ProSe) UE ID, international mobile subscriber identity, IMSI (IMSI), mobile station international subscriber directory number (MSISDN), ProSe Relay UE ID, ProSe Discovery UE ID, ProSe Application code or ProSe Restricted code, a device identifier, and a request to provide a direct communication key to the device;
identifying the UE from the UE identifier,
mapping the identified UE to a public UE identifier,
sending a request to a bootstrapping server function, BSF, for key generation information and a session shared key, the request comprising the public UE identifier,
receiving from the BSF said key generation information and session shared key,
deriving the direct communication key from at least the session shared key and the device identifier, and
sending the direct communication key and the key generation information to the device to cause the device to forward the direct communication key or the key generation information to the UE which establishes direct communication between the device and the UE over the interface.

19. A method as claimed in claim 18, wherein the interface comprises a ProSe interface, and the Direct Communication Element comprises at least one of a ProSe Function, a ProSe Key Management Function or a ProSe Key Management Server.

20. A method as claimed in claim 18, further comprising:
prior to receiving the UE identifier from the device, generating the ProSe UE ID, the ProSe Relay UE ID, the ProSe Discovery UE ID, the ProSe Application code or the ProSe Restricted codes; and
providing the ProSe UE ID, the ProSe Relay UE ID, the ProSe Discovery UE ID, the ProSe Application code or the ProSe Restricted code to the UE.

21. A system for securing direct communication between a User Equipment device (UE), and a device over an interface, the system comprising the UE, the device and a Direct Communication Element; wherein
the UE is operable to send a UE identifier comprising any of Proximity Services (ProSe) UE ID, international mobile subscriber identity (IMSI), mobile station international subscriber directory number (MSISDN), ProSe Relay UE ID, ProSe Discovery UE ID, ProSe Application code or ProSe Restricted code, to the direct communication element via the device, and
the direct communication element is operable to identify the UE using the UE identifier, map the identified UE to a public UE identifier, send a request comprising the public UE identifier to a bootstrapping server function, BSF, for key generation information and a session shared key, obtain the session shared key and Generic Bootstrapping Architecture Push Information (GPI), derive a direct communication key from at least the session shared key, and send the direct communication key and the GPI to the device,
wherein the device is operable to send the GPI to the UE, and wherein the UE is operable to derive the session shared key from at least the GPI and derive the direct communication key from the session shared key and use the direct communication key to establish direct communication with the device over the interface.

22. A User equipment device (UE), for obtaining a key for direct communication with a device over an interface, the UE comprising a processor and a memory, said memory containing instructions that when executed cause the UE to:
send a temporary key to the device;
receive a request for a new temporary key;
instead of sending the new temporary key, send to the device a UE identifier comprising any of Proximity Services (ProSe) UE ID, international mobile subscriber identity, IMSI, mobile station international subscriber directory number (MSISDN), ProSe Relay UE ID, ProSe Discovery UE ID, ProSe Application code or ProSe Restricted code and request key generation for direct communication with the device;
receive from the device a device identifier and key generation information,
derive a session shared key from at least the key generation information,
derive a direct communication key from at least the session key and the device identifier; and
use the direct communication key to establish direct communication with the device over the interface.

23. A device configured for obtaining a key for direct communication with a User Equipment (UE) over an interface, the device comprising a processor and a memory, said memory containing instructions that when executed cause the device to receive a temporary key from the UE;

send a request for a new temporary key;

instead of receiving the new temporary key, receive from the UE a UE identifier comprising any of Proximity Services (ProSe) UE ID, international mobile subscriber identity (IMSI), mobile station international subscriber directory number (MSISDN), ProSe Relay UE ID, ProSe Discovery UE ID, ProSe Application code or ProSe Restricted code and a request to obtain a direct communication key;

send to a Direct Communication Element the UE identifier and a device identifier of the device, and requesting the Direct Communication Element to provide the device with the direct communication key; and receive the direct communication key and key generation information from the Direct Communication Element; and send the key generation information and the device identifier to the UE to the UE to derive the direct communication key and establish direct communication with the device over the interface.

24. A non-transitory computer readable storage medium storing a computer program which when executed by a User Equipment device (UE) causes the UE to carry out a method comprising:

sending a temporary key to a device;

receiving a request for a new temporary key;

instead of sending the new temporary key, sending to the device a UE identifier comprising any of Proximity Services (ProSe) UE ID, international mobile subscriber identity (IMSI), mobile station international subscriber directory number (MSISDN), ProSe Relay UE ID, ProSe Discovery UE ID, ProSe Application code or ProSe Restricted code and requesting key generation for direct communication with the device;

receiving from the device a device identifier and key generation information, deriving a session shared key from at least the key generation information, and deriving a direct communication key from at least the session key and the device identifier; and using the direct communication key to establish direct communication with the device over an air interface.

* * * * *

UNITED STATES PATENT AND TRADEMARK OFFICE
CERTIFICATE OF CORRECTION

| | | |
|---|---|---|
| PATENT NO. | : 9,986,431 B2 | |
| APPLICATION NO. | : 14/947041 | |
| DATED | : May 29, 2018 | |
| INVENTOR(S) | : Lehtovirta et al. | |

It is certified that error appears in the above-identified patent and that said Letters Patent is hereby corrected as shown below:

On the Title Page

Item (63), in Column 1, under "Related U.S. Application Data", Line 3, delete "2015." and insert -- 2015, now Pat. No. 9,973,925. --, therefor.

In the Drawings

In Fig. 10, Sheet 11 of 23, for Step "3", in Line 2, delete "UE-1 ID,," and insert -- UE-1 ID, --, therefor.

In Fig. 13, Sheet 14 of 23, for Step "3", in Line 2, delete "UE-1 ID,," and insert -- UE-1 ID, --, therefor.

In Fig. 15, Sheet 16 of 23, delete Step "207" and insert Step -- 207k --, therefor.

In Fig. 17, Sheet 18 of 23, for Tag "40n", delete "PKMF" and insert -- KMF --, therefor.

In the Specification

In Column 1, Line 7, delete "14/892461 filed Nov. 19, 2015," and insert -- 14/892,461 filed Nov. 19, 2015, now Pat. No. 9,973,925, --, therefor.

In Column 2, Line 37, delete "identifier and" and insert -- identifier and key generation information, deriving a session shared key from at least the key --, therefor.

In Column 6, Line 13, delete "to the" and insert -- of the --, therefor.

In Column 14, Line 41, delete "16." and insert -- 16; --, therefor.

In Column 17, Line 13, delete "Information," and insert -- Information --, therefor.

Signed and Sealed this
Twentieth Day of November, 2018

Andrei Iancu
*Director of the United States Patent and Trademark Office*

In Column 20, Line 43, delete "((NAF" and insert -- (NAF --, therefor.

In Column 23, Line 67, delete "follows;" and insert -- follows: --, therefor.

In Column 24, Line 7, delete "follows;" and insert -- follows: --, therefor.

In Column 24, Line 47, delete "follows;" and insert -- follows: --, therefor.

In Column 28, Line 35, delete "the a" and insert -- a --, therefor.

In Column 29, Line 33, delete "follows;" and insert -- follows: --, therefor.

In Column 29, Line 40, delete "follows;" and insert -- follows: --, therefor.

In Column 30, Line 13, delete "follows;" and insert -- follows: --, therefor.

In Column 32, Line 59, delete "Information, (GPI)." and insert -- Information (GPI). --, therefor.

In Column 39, Line 16, delete "follows;" and insert -- follows: --, therefor.

In Column 39, Line 23, delete "follows;" and insert -- follows: --, therefor.

In Column 39, Line 63, delete "follows;" and insert -- follows: --, therefor.

In Column 44, Line 5, delete "follows;" and insert -- follows: --, therefor.

In Column 44, Line 13, delete "follows;" and insert -- follows: --, therefor.

In Column 44, Line 52, delete "follows;" and insert -- follows: --, therefor.

In Column 47, Line 21, delete "(Nonce-remote-UE_" and insert -- (Nonce-UE-remote) --, therefor.

In Column 48, Line 30, delete "follows;" and insert -- follows: --, therefor.

In Column 48, Line 37, delete "follows;" and insert -- follows: --, therefor.

In Column 49, Line 6, delete "follows;" and insert -- follows: --, therefor.

In Column 53, Line 7, delete "DCE 2303" and insert -- DCE 2300 --, therefor.

In Column 56, Line 42, delete "authorizing means 2604" and insert -- authorizing means 2603 --, therefor.

In Column 56, Line 49, delete "DCE 2603" and insert -- DCE 2600 --, therefor.

CERTIFICATE OF CORRECTION (continued)
U.S. Pat. No. 9,986,431 B2

In Column 56, Line 59, delete "communication means 2602 or 2603" and insert -- communication means 2602 or 2605 --, therefor.

In the Claims

In Column 58, Line 7, in Claim 1, delete "information," and insert -- information; --, therefor.

In Column 58, Line 9, in Claim 1, delete "information, and" and insert -- information; --, therefor.

In Column 58, Line 21, in Claim 4, delete "identifiers" and insert -- identifier --, therefor.

In Column 58, Line 40, in Claim 7, delete "request" and insert -- requesting --, therefor.

In Column 59, Line 18, in Claim 14, delete "key; and" and insert -- key; --, therefor.

In Column 59, Line 47, in Claim 18, delete "IMSI (IMSI)," and insert -- (IMSI), --, therefor.

In Column 59, Line 52, in Claim 18, delete "device;" and insert -- device, --, therefor.

In Column 60, Line 10, in Claim 20, delete "codes; and" and insert -- code; and --, therefor.

In Column 60, Line 56, in Claim 22, delete "information," and insert -- information; --, therefor.

In Column 60, Line 58, in Claim 22, delete "information," and insert -- information; --, therefor.

In Column 61, Line 15, in Claim 23, delete "key; and" and insert -- key; --, therefor.

In Column 62, Line 15, in Claim 24, delete "information," and insert -- information; --, therefor.

In Column 62, Line 17, in Claim 24, delete "information, and" and insert -- information; --, therefor.